US012582566B2

(12) United States Patent
Galer et al.

(10) Patent No.: US 12,582,566 B2
(45) Date of Patent: Mar. 24, 2026

(54) PATIENT TURNING DEVICE FOR A PATIENT SUPPORT APPARATUS

(71) Applicant: Stryker Corporation, Kalamazoo, MI (US)

(72) Inventors: James K. Galer, Byron Center, MI (US); Patrick Lafleche, Kalamazoo, MI (US); Prachi Jain Slominski, Frisco, TX (US); Justin Jon Raymond, Jackson, MI (US)

(73) Assignee: Stryker Corporation, Portage, MI (US)

( * ) Notice: Subject to any disclaimer, the term of this patent is extended or adjusted under 35 U.S.C. 154(b) by 323 days.

(21) Appl. No.: 18/213,955

(22) Filed: Jun. 26, 2023

(65) Prior Publication Data

US 2023/0329929 A1 Oct. 19, 2023

Related U.S. Application Data

(60) Continuation of application No. 17/562,254, filed on Dec. 27, 2021, now Pat. No. 11,730,649, which is a (Continued)

(51) Int. Cl.
*A61G 7/00* (2006.01)
*A47C 20/02* (2006.01)
(Continued)

(52) U.S. Cl.
CPC ............. *A61G 7/001* (2013.01); *A61G 7/012* (2013.01); *A61G 7/015* (2013.01); *A61G 7/018* (2013.01);
(Continued)

(58) Field of Classification Search
CPC ........ A61G 7/001; A61G 7/012; A61G 7/015; A61G 7/018; A61G 7/0527;
(Continued)

(56) References Cited

U.S. PATENT DOCUMENTS 3,254,348 A 6/1966 Addario
3,940,811 A 3/1976 Tomikawa et al.
(Continued)

FOREIGN PATENT DOCUMENTS

CN 2251310 Y 4/1997
DE 4440720 C2 8/1997
(Continued)

OTHER PUBLICATIONS

Plexus Medical, "O2 Zoned C4000 Portable Rotation System; CareMedx C5000 Multi-Zoned Low Air Loss Therapy System Service Manual", published at least prior to Sep. 2018, 58 pages.
(Continued)

*Primary Examiner* — Madison Emanski
(74) *Attorney, Agent, or Firm* — Howard & Howard Attorneys PLLC

(57) ABSTRACT

A patient turning device for a patient support apparatus. The patient turning device includes a first and second bladder assembly each including a plurality of layers and seals defining a bladder volume. The bladder volumes are selectively inflatable with fluid to expand the respective bladder assembly, and consequently move a patient support surface of the patient support apparatus. A portion of a lower layer of the first bladder assembly and a portion of an upper layer of the second bladder assembly define an overlapping region of the bladder volumes. The patient turning device is coupled to an underside of a carrier sheet and positioned between a crib assembly and a bottom cover. An augmenting feature is configured to resiliently expand as at least one of the first and second bladder assemblies receives the fluid to move at least a portion of the crib assembly away from a patient support deck.

18 Claims, 24 Drawing Sheets

Related U.S. Application Data division of application No. 16/220,591, filed on Dec. 14, 2018, now Pat. No. 11,246,775.

(60) Provisional application No. 62/738,217, filed on Sep. 28, 2018, provisional application No. 62/611,215, filed on Dec. 28, 2017.

(51) Int. Cl.

| | |
|---|---|
| ***A47C 20/04*** | (2006.01) |
| ***A47C 31/00*** | (2006.01) |
| ***A61G 7/012*** | (2006.01) |
| ***A61G 7/015*** | (2006.01) |
| ***A61G 7/018*** | (2006.01) |
| ***A61G 7/05*** | (2006.01) |
| ***A61G 7/057*** | (2006.01) |
| ***A61G 7/08*** | (2006.01) |
| ***A61G 7/10*** | (2006.01) |

(52) U.S. Cl.

CPC ........ *A61G 7/0527* (2016.11); *A61G 7/05769* (2013.01); *A61G 7/05776* (2013.01); *A61G 7/08* (2013.01); *A47C 20/027* (2013.01); *A47C 20/048* (2013.01); *A47C 31/008* (2013.01); *A61G 7/1021* (2013.01); *A61G 2203/34* (2013.01)

(58) Field of Classification Search

CPC .. A61G 7/05769; A61G 7/05776; A61G 7/08; A61G 7/1021; A61G 2203/34; A61G 7/05784; A61G 7/057; A61G 7/05738; A61G 7/05715; A61G 2200/32; A61G 2203/42; A47C 20/027; A47C 20/048; A47C 31/008; A47C 27/10; A47C 20/08; A47C 27/081; A47C 27/082; A47C 27/083; A47C 27/087; A47C 20/04; A47C 21/044

USPC ... 5/615, 713, 715, 660, 710, 634, 618, 706, 5/610, 644, 722

See application file for complete search history.

(56) References Cited

U.S. PATENT DOCUMENTS

| | | | | |
|---|---|---|---|---|
| 4,336,621 | A | 6/1982 | Schwartz et al. | |
| 4,605,582 | A | 8/1986 | Sias et al. | |
| 4,665,573 | A | 5/1987 | Fiore | |
| 4,947,500 | A | 8/1990 | Seiler | |
| 5,007,124 | A | 4/1991 | Raburn et al. | |
| 5,109,559 | A | 5/1992 | West | |
| 5,179,742 | A | 1/1993 | Oberle | |
| 5,180,619 | A | 1/1993 | Landi et al. | |
| 5,280,657 | A | 1/1994 | Stagg | |
| 5,329,656 | A * | 7/1994 | Leggett | A47C 27/18 5/709 |
| 5,482,355 | A | 1/1996 | Franzen, Jr. | |
| 5,491,854 | A | 2/1996 | Music | |
| 5,611,096 | A | 3/1997 | Bartlett et al. | |
| 5,617,595 | A | 4/1997 | Landi et al. | |
| 5,630,238 | A | 5/1997 | Weismiller et al. | |
| 5,794,289 | A | 8/1998 | Wortman et al. | |
| 6,073,289 | A | 6/2000 | Bolden et al. | |
| 6,115,861 | A | 9/2000 | Reeder et al. | |
| 6,269,504 | B1 | 8/2001 | Romano et al. | |
| 6,286,166 | B1 | 9/2001 | Henley et al. | |
| 6,367,106 | B1 | 4/2002 | Gronsman | |
| 6,387,065 | B1 | 5/2002 | Tumey | |
| 6,430,766 | B1 | 8/2002 | Henley et al. | |
| 6,658,676 | B1 | 12/2003 | Persson et al. | |
| 6,687,937 | B2 | 2/2004 | Harker | |
| 6,701,556 | B2 | 3/2004 | Romano et al. | |
| 6,701,558 | B2 | 3/2004 | VanSteenburg | |
| 6,718,584 | B2 | 4/2004 | Rabaiotti et al. | |
| 6,735,799 | B1 | 5/2004 | Ellis et al. | |
| 6,829,796 | B2 | 12/2004 | Salvatini et al. | |
| 7,060,213 | B2 | 6/2006 | Pearce | |
| 7,191,480 | B2 | 3/2007 | Romano et al. | |
| 7,191,482 | B2 | 3/2007 | Romano et al. | |
| 7,461,425 | B2 | 12/2008 | Chambers et al. | |
| 7,464,425 | B2 | 12/2008 | Chambers et al. | |
| 7,469,432 | B2 | 12/2008 | Chambers | |
| 7,469,436 | B2 | 12/2008 | Meyer et al. | |
| 7,480,953 | B2 | 1/2009 | Romano et al. | |
| 7,617,555 | B2 | 11/2009 | Romano et al. | |
| 7,641,623 | B2 | 1/2010 | Biondo et al. | |
| 7,648,392 | B2 | 1/2010 | Chambers et al. | |
| 7,666,341 | B2 | 2/2010 | Pearce | |
| 7,685,664 | B2 | 3/2010 | Stolpmann et al. | |
| 7,712,164 | B2 | 5/2010 | Chambers | |
| 7,712,171 | B2 * | 5/2010 | Butler | A61G 7/05715 5/81.1 R |
| 7,802,332 | B2 | 9/2010 | Kummer et al. | |
| 7,886,386 | B2 | 2/2011 | Balonick et al. | |
| 7,904,976 | B2 | 3/2011 | Hakamiun et al. | |
| 7,914,611 | B2 | 3/2011 | Vrzalik et al. | |
| 7,966,680 | B2 | 6/2011 | Romano et al. | |
| 8,069,514 | B2 | 12/2011 | Poulos et al. | |
| 8,090,478 | B2 | 1/2012 | Skinner et al. | |
| 8,108,957 | B2 | 2/2012 | Richards et al. | |
| 8,117,701 | B2 | 2/2012 | Bobey et al. | |
| 8,118,920 | B2 | 2/2012 | Vrzalik et al. | |
| 8,196,241 | B2 | 6/2012 | Balonick et al. | |
| 8,201,292 | B2 | 6/2012 | Dionne et al. | |
| 8,235,922 | B2 | 8/2012 | Rowe et al. | |
| 8,260,475 | B2 | 9/2012 | Receveur | |
| 8,332,979 | B2 | 12/2012 | Flick et al. | |
| 8,372,182 | B2 | 2/2013 | Vzalik et al. | |
| 8,397,326 | B2 | 3/2013 | Lafleche et al. | |
| 8,429,778 | B2 | 4/2013 | Receveur et al. | |
| 8,434,748 | B1 | 5/2013 | Pearce et al. | |
| 8,437,876 | B2 | 5/2013 | Receveur et al. | |
| 8,490,233 | B2 | 7/2013 | Essers | |
| 8,572,778 | B2 | 11/2013 | Newkirk et al. | |
| 8,601,620 | B2 | 12/2013 | Romano et al. | |
| 8,620,477 | B2 | 12/2013 | Skinner et al. | |
| 8,628,067 | B2 | 1/2014 | Pearce et al. | |
| 8,689,373 | B2 | 4/2014 | Caines | |
| 8,712,591 | B2 | 4/2014 | Receveur | |
| 8,745,788 | B2 | 6/2014 | Bhai | |
| 8,844,079 | B2 | 9/2014 | Skinner et al. | |
| 8,845,562 | B2 | 9/2014 | Receveur et al. | |
| 8,918,930 | B2 | 12/2014 | Stroh et al. | |
| 8,919,750 | B2 | 12/2014 | Pearce et al. | |
| 9,009,891 | B2 | 4/2015 | Receveur et al. | |
| 9,009,892 | B2 | 4/2015 | Lachenbruch et al. | |
| 9,049,943 | B2 | 6/2015 | Caminade et al. | |
| 9,107,511 | B2 | 8/2015 | Skinner et al. | |
| 9,254,231 | B2 | 2/2016 | Vzalik et al. | |
| 9,315,648 | B2 | 4/2016 | Nilson et al. | |
| 9,320,664 | B2 | 4/2016 | Newkirk et al. | |
| 9,358,168 | B2 | 6/2016 | Williamson et al. | |
| 9,414,977 | B2 | 8/2016 | Ponsi et al. | |
| 9,462,893 | B2 | 10/2016 | Romano et al. | |
| 9,526,348 | B2 | 12/2016 | Richards et al. | |
| 9,526,349 | B2 | 12/2016 | Lafleche et al. | |
| 9,655,457 | B2 | 5/2017 | Meyer et al. | |
| 9,707,141 | B2 | 7/2017 | Bobey et al. | |
| 9,835,344 | B2 | 12/2017 | Vrzalik et al. | |
| 9,849,051 | B2 | 12/2017 | Newkirk et al. | |
| 9,907,408 | B2 | 3/2018 | Vrzalik et al. | |
| 9,907,718 | B2 | 3/2018 | Weitzel et al. | |
| 9,913,770 | B2 | 3/2018 | Lachenbruch et al. | |
| 9,943,172 | B2 | 4/2018 | Lachenbruch et al. | |
| 11,246,775 | B2 | 2/2022 | Galer et al. | |
| 2006/0005314 | A1 | 1/2006 | Lee | |
| 2007/0143928 | A1 * | 6/2007 | Biggie | A61G 7/0525 5/713 |
| 2008/0040860 | A1 | 2/2008 | Price et al. | |
| 2009/0013470 | A1 | 1/2009 | Richards et al. | |
| 2010/0076356 | A1 | 3/2010 | Biondo et al. | |
| 2010/0212087 | A1 | 8/2010 | Leib et al. | |

(56) References Cited

U.S. PATENT DOCUMENTS

| | | | | |
|---|---|---|---|---|
| 2011/0163885 | A1 | 7/2011 | Poulos et al. | |
| 2013/0014324 | A1 | 1/2013 | Receveur et al. | |
| 2013/0231596 | A1 | 9/2013 | Hombach et al. | |
| 2014/0031730 | A1 | 1/2014 | Hornbach et al. | |
| 2015/0074914 | A1 | 3/2015 | Caminade | |
| 2015/0164720 | A1* | 6/2015 | Gibson | A61G 7/05769 5/83.1 |
| 2015/0335507 | A1* | 11/2015 | Emmons | A61G 7/018 5/691 |
| 2016/0157631 | A1 | 6/2016 | Milnes et al. | |
| 2016/0184154 | A1 | 6/2016 | Lafleche et al. | |
| 2016/0326674 | A1 | 11/2016 | Goijarts et al. | |
| 2016/0356676 | A1 | 12/2016 | Sauser et al. | |
| 2016/0361215 | A1 | 12/2016 | Gibson et al. | |
| 2017/0027791 | A1 | 2/2017 | McKnight et al. | |
| 2017/0049647 | A1 | 2/2017 | Rigoni et al. | |
| 2017/0151113 | A1 | 6/2017 | Lachenbruch et al. | |
| 2017/0251824 | A1 | 9/2017 | Pearce | |
| 2017/0251825 | A1 | 9/2017 | Pearce | |
| 2017/0254379 | A1 | 9/2017 | Whatcott | |
| 2018/0104123 | A1 | 4/2018 | Newkirk et al. | |
| 2018/0250180 | A1 | 9/2018 | Phalen et al. | |
| 2018/0369038 | A1 | 12/2018 | Bhimavarapu et al. | |
| 2019/0201262 | A1 | 7/2019 | Galer et al. | |
| 2022/0117809 | A1 | 4/2022 | Galer et al. | |

FOREIGN PATENT DOCUMENTS

| | | | |
|---|---|---|---|
| DE | 20018837 | U1 | 5/2001 |
| EP | 1413280 | A1 | 4/2004 |
| GB | 2405582 | A | 3/2005 |
| JP | H0852180 | A | 2/1996 |
| JP | 2000189470 | A | 7/2000 |
| WO | 9507679 | A2 | 3/1995 |
| WO | 02065877 | A1 | 8/2002 |
| WO | 2013086197 | A1 | 6/2013 |

OTHER PUBLICATIONS

Plexus Medical, "Plexus P1500 Air Express LAL System Service Manual", published at least prior to Sep. 2018, 17 pages.
Sage Products, "Prevalon AirTap Patient Repositioning System Operator's Manual", 2016, 10 pages.
Sage Products, "Prevalon Turn and Position System 2.0 Instructions for Use", 2016, 1 page.
Sage Products, "Sage Product Catalog—Pressure Injury Prevention and Safe Patient Handling", 2018, 4 pages.
Stryker Medical, "Arise 1000 EX Low Air-Loss Bariatric Surface Specification Sheet", Rev. B, 2008, 2 pages.
Stryker Medical, "Arise 1000EX Low Air Loss Therapy Mattress Model 2236 Operations/Maintenance Manual", Rev. B, May 2009, 30 pages.
Stryker Medical, "ComfortGel SE Support Surface Ref 1805 Operations Manual", Rev. C, Sep. 2016, 18 pages.
Stryker Medical, "ComfortGel Support Surface Ref 2850 Operations Manual", Rev. A, Aug. 2017, 22 pages.
Stryker Medical, "ComfortGel Support Surface Specification Sheet", Rev. E.6, Dec. 2011, 2 pages.
Stryker Medical, "EOLE / EOLE DC Pump Ref 2870, Ref 2871 Service Manual", Oct. 2017, 16 pages.
Stryker Medical, "EOLE DC Powered Support Surface Ref 2871 Operations/Maintenance Manual", Dec. 2017, 288 pages.
Stryker Medical, "EOLE Powered Support Surface Ref 2870 Operations/Maintenance Manual", Dec. 2017, 288 pages.
Stryker Medical, "IsoAir Ref 2940 Service Manual", Rev. 1.0, Nov. 2016, 144 pages.
Stryker Medical, "IsoFlex LAL Support Surface Ref 2860 Operations/Maintenance Manual", Rev. C, Aug. 2017, 28 pages.
Stryker Medical, "IsoFlex LAL Support Surface Specification Sheet", Rev. D.3, 2016, 2 pages.
Stryker Medical, "Isoflex Pressure Management Mattress Instructions for Use", Rev. A, Jun. 2010, 2 pages.
Stryker Medical, "IsoFlex SE Support Surface Ref 1806 Operations Manual", Rev. C, Sep. 2016, 20 pages.
Stryker Medical, "IsoGel AIR Support Surface Ref 2860 Operations Manual", Rev. F, May 2015, 25 pages.
Stryker Medical, "IsoGel Support Surface Dimensional Gel Technology Specification Sheet", Dec. 2013, 2 pages.
Stryker Medical, "Isolibrium Support Surface Ref 2971 Operations/Maintenance Manual", Rev. B, Oct. 2014, 202 pages.
Stryker Medical, "Isolibrium Support Surface Ref 2971 Operations/Maintenance Manual", Rev. C, May 2014, 200 pages.
Stryker Medical, "Isolibrium Support Surface Specification Sheet", Rev. E.4, Nov. 2013, 2 pages.
Stryker Medical, "Isolibrium Support Surface Version 4.0, Ref 2971, Ref 2972 Maintenance Manual", Rev. B, May 2017, 88 pages.
Stryker Medical, "Isolibrium Support Surface Version 4.0, Ref 2971, Ref 2972 Maintenance Manual", Rev. C, May 2017, 88 pages.
Stryker Medical, "Isolibrium Support Surface Version 4.0, Ref 2971, Ref 2972 Maintenance Manual", Rev. C.2, Jul. 2017, 88 pages.
Stryker Medical, "Mattress Assembly p. 2235-100-001—Bariatric Bed Model 2230", Rev. A, Nov. 2008, 2 pages.
Stryker Medical, "P100/Sof Care Pump Ref 2880, Ref 2890 Service Manual", Oct. 2017, 8 pages.
Stryker Medical, "Position Pro Therapy Mattress Model 2920 Operations/Maintenance Manual", Rev. A, Feb. 2007, 55 pages.
Stryker Medical, "PositionPro Patient Repositioning Support Surface-Standalone with Pendant or Integrated with FL27 InTouch CC Model Beds Ref 2920 Maintenance Manual", Rev. A, Oct. 2016, 56 pages.
Stryker Medical, "PositionPro Patient Repositioning Support Surface-Standalone with Pendant or Integrated with FL27 InTouch CC Model Beds Ref 2920 Maintenance Manual", Rev. G, Oct. 2016, 42 pages.
Stryker Medical, "Pressure Management Dynamic Mattress System 2500 Operations/Maintenance Manual", published at least prior to Sep. 2018, 17 pages.
Stryker Medical, "Pressure Management Dynamic Mattress System 2500 Operations/Maintenance Manual", published at least prior to Sep. 2018, 23 pages.
Stryker Medical, "ProForm Non-Powered Support Surface Model 2710 Operations/Maintenance Manual", Rev. G, Sep. 14, 2015, 134 pages.
Stryker Medical, "Save Simply Brochure", 2018, 2 pages.
Stryker Medical, "Sof Care Chair Cushion Ref 2770-100-000 Operations Manual", Rev. D, Apr. 2016, 1 page.
Stryker Medical, "Sof Care DuoGard Overlay Brochure", 2015, 3 pages.
Stryker Medical, "SofCare Healthcare Boot, Ref 2760-100-000, Ref 2760-200-000, Ref 2760-300-000 Operations Manual", Rev. C, Mar. 2016, 2 pages.
Stryker Medical, "SofCare HeelCare Boot Series Specification Sheet", Rev. B.3, Aug. 2011, 2 pages.
Stryker Medical, SofCare Stretcher Overlay Ref 2780-400-000, Ref 2780-500-000 Operations Manual, Rev. B, Dec. 2014, 2 pages.
Stryker Medical, "Spr Plus Low Air Loss Overlay 3-Layer Technology Specification Sheet", Rev. D.2, Aug. 2011, 2 pages.
Stryker Medical, "Spr Plus Overlay Ref 2790-100-000 Operations Manual", Rev. B, Dec. 2014, 2 pages.
Stryker Medical, "Stryker Air I, Stryker Air II Low Air Loss Therapy Mattress (LAL), Model 2236 Operations/Maintenance Manual", Rev. B, May 2009, 30 pages.
Stryker Medical, "Stryker Air Pump REF 2861 Operation/Maintenance Manual", Rev. 2.0, Jun. 2016, 24 pages.
Stryker Medical, "Stryker Air Pump Ref 2861 Service Manual", Rev. 2.0, Jun. 2016, 58 pages.
Stryker Medical, "Stryker IsoAir REF 2940" Operation/Maintenance Manual, Rev. 4.00, Dec. 2015, 52 pages.
Stryker Medical, "Ultra Comfort SE Support Surface Ref. 1703; Ref. 1704 Operations Manual", Rev. D, May 2017, 40 pages.

(56) References Cited

OTHER PUBLICATIONS

Stryker Medical, "XPRT Pulmonary Therapy & Wound Care Mattress Model 2950 Operations/Maintenance Manual", Rev. C, Aug. 2007, 114 pages.
Stryker Medical, "XPRT Therapeutic Support Surface Ref 2950 Operations/Maintenance Manual", Rev. B, Jun. 2012, 468 pages.
Stryker Medical, XPRT Therapy Mattress Model 2950 Operations Manual, Rev. A, Jul. 2006, 98 pages.
Stryker Medical, "XPRT Therapy Mattress Model 2950 Operations/Maintenance Manual", Rev. A, May 2006, 98 pages.
Stryker Medical, "XPRT Therapy Mattress Model 2950 Operations/Maintenance Manual", Rev. H, Jun. 2006, 98 pages.
Stryker Medical,"DuoGard Overlay Ref 2780-300-000 Operations Manual", Rev. B, Dec. 2014, 1 page.
The Scenic Life, "Review: Sleep Number AirFit Adjustable Pillow with CoolFit Foam", Mar. 9, 2012, https://web.archive.org/web/20150419050756/http://thesceniclife.com/2012/03/09/review-sleep-number-airfit-adjustable-pillow-coolfit-foam/, 4 pages.
Direct Healthcare Services Ltd., "Dyna-Form Low Air Loss System User Manual", Version 01, Mar. 1, 2013, 16 pages.
Drive, "Med Aire Plus 8" Alternating Pressure and Low Air Loss Mattress Replacement System Operator's Manual, Item #14029, Control Unit 14029XP), Rev. 4, Mar. 15, 2016, 20 pages.
English language abstract and machine assisted English translation for CN 2251310 extracted from espacenet.com database on Feb. 15, 2019, 5 pages.
English language abstract and machine-assisted English translation for DE 44 40 720 extracted from espacenet.com database on Mar. 26, 2020, 4 pages.
English language abstract and machine assisted English translation for EP 1 413 280 extracted from espacenet.com database on Mar. 26, 2020, 8 pages.
English language abstract and machine assisted English translation for JP 2000-189470 extracted from espacenet. com database on Mar. 26, 2020, 4 pages.
English language abstract and machine assisted English translation for JPH 08-52180 extracted from espacenet.com database on Mar. 26, 2020, 8 pages.
Gaymar Industries Inc., "Air Express Alternating Low Pressure Therapy Operator's Manual", Apr. 2012, 113 pages.
Gaymar Industries Inc., "Air Express C1000DF Service Manual", Jul. 2007, 16 pages.
Gaymar Industries Inc., "Air Express LAL P1500 Low Air Loss Therapy System Operator's Manual", Rev. B, Apr. 2010, 32 pages.
Gaymar Industries Inc., "Aire Twin Alternating Pressure and Low-Loss Therapy Mattress Replacement Systems ATC80, ATM500, ATM800, ATW5000, ATW8000 Operator's Manual", May 2005, 8 pages.
Gaymar Industries Inc., "Auto Aire Select Dynamic Low-Air Loss Therapy Service Manual", Rev. A, Apr. 2010, 28 pages.
Gaymar Industries Inc., Auto Aire Select Dynamic Low-Air Loss Therapy With Alternating Pressure and Active Sensor Technology Ref C2500MES Control Unit, Ref M2500S Series Mattress, Ref X3580S Operator's Manual Rev. B, Sep. 2010, 42 pages.
Gaymar Industries Inc., "Auto Aire Select Dynamic Low-Air Loss Therapy With Alternating Pressure and Active Sensor Technology Ref C2500MS Control Unit, Ref M2500S Series Mattress, Ref Auto Aire Select Safety Mattress Service Manual", Rev. B, Sep. 2010, 14 pages.
Gaymar Industries Inc., "Auto Sure-Float Ref C1000MS/C1000MES Control Unit; Ref M1001S/M1002S Series Mattress Operator's Manual", Rev. B, Sep. 2010, 128 pages.
Gaymar Industries Inc., "Clini-Dyne Lateral Rotation System CLP2000 Control Unit, CLM Series Mattress Service Manual", Rev. A, Oct. 2010, 18 pages.
Gaymar Industries Inc., "Clini-Dyne Rotational Therapy System CLP2000 Control Unit, CLM Series Mattress Operator's Manual", Rev. A, Oct. 2010, 8 pages.
Gaymar Industries Inc., "EFF302 Alternating Pad Instructions", Rev. A, Jan. 2010, 1 page.
Gaymar Industries Inc., "Instructions for Use Sof Care Mattress Series", Rev. A, May 2010, 12 pages.
Gaymar Industries Inc., "O2 Zoned Multi-Functional Portable Rotation System P4000, P4001, C4000 Series Control Unit, M4000 Series Mattress Operator's Manual", Rev. B, Oct. 2010, 12 pages.
Gaymar Industries Inc., "Paradise Pump PAR 30 Config F Alternating Pressure Pump Functional Check Instructions", Rev. A, Apr. 2007, 1 page.
Gaymar Industries Inc., "Paradise Pump Series Operator's Manual", Sep. 2005, 8 pages.
Gaymar Industries Inc., "Plexus O2 Zoned Multi-Functional Portable Rotation System C4000 Series Control Unit, M4000 or M4001 Series Mattress Service Manual", Rev. A, Oct. 2010, 40 pages.
Gaymar Industries Inc., "Plexus Ref P102 Plexus Jr. Alternating Pressure System, Ref C102 Plexus Jr. APM Control Unit, Ref M100 Alternating Pressure Mattress Overlay Instructions for Use", Rev. C, Apr. 2012, 20 pages.
Gaymar Industries Inc., "Pressure Pedic Pressure Redistribution Mattress Instructions for Use", Rev. B, Dec. 2009, 2 pages.
Gaymar Industries Inc., "SC505 Sof Care Inflator Operating Instructions and Service Manual", Rev. C, Oct. 2010, 8 pages.
Gaymar Industries Inc., "Sof Care Bed Cushions Instructions for Use", Sep. 1993, 2 pages.
Gaymar Industries Inc., "Sof Matt Low Air Loss Mattress System Operator's Manual/Service Manual", Oct. 2010, 40 pages.
Gaymar Industries Inc., "Symmetric Aire Mattress Ref SYM3000 Series Instructions for Use", Apr. 2012, 3 pages.
Gaymar Industries, "Symmetric Aire Mattress Ref SYM3000 Series Service Document", Rev. A, Jun. 2010, 2 pages.
Hill-Rom, "300 Wound Surface Prevention and Treatment Surfaces Brochure", Rev. 2, May 18, 2010, 2 pages.
Hill-Rom, "Hill-Rom P500 Therapy Surface Product No. P005723 and P005787 User Manual", Rev. 3, 2010, 54 pages.
Hill-Rom, Synergy Air Elite Low Air Loss Therapy Brochure, Rev. 2, Dec. 30, 2008, 4 pages.
Hill-Rom, "Synergy Air Elite Low Air Loss Therapy Webpage", https://homecare.hill-rom.com/en/durable-medical-equipment/therapy-mattresses/therapy-mattresses/synergy-air-elite-low-air-loss-therapy/, 2019, 2 pages.
Invacare Corporation, "MicroAir MA90 Series-Owner's Operator and Maintenance Manual", 2008, 28 pages.
Kap Medical, "Digital Alternating Pressure True LAL System Brochure", 2013, 2 pages.
Machine-assisted English translation for DE 200 18 837 extracted from espacenet.com database on Mar. 26, 2020, 6 pages.
Medline, "Z-Flo Positioner/Covers by Molnlycke", http://www.medline.com/product/Z-Flo-Positioners-by-Sundance-Enterprises-Inc/Z05-PF70265, 2016, 1 page.
Merriam-Webster, "Concertina", www.merriam-webster.com/dictionary/concertina, 2023, 1 page.
Merriam-Webster, "Interleaved", www.merriam-webster.com/dictionary/interleaved, 2023, 1 page.
Molnlycke Health Care AB, "Turning and Positioning Webpage", http://molnlycke.us/products-solutions/turning-and-positioning-system/ formerly known as http://sundancesolutions.com/, 2016, 2 pages.
Oxford English Dictionary, "Concertinaed", www.oed.com/view/Entry/38177?rskey=GR3vaF&result=#eid, 2023, 1 page.
Plexus Medical, "02 Zoned C4000 Portable Rotation System; CareMedx C5000 Multi-Zoned Low Air Loss Therapy System Service Manual", published at least prior to September 2018, 58 pages.
Plexus Medical, "Plexus C1000D Series Control Unit Service Manual", published at least prior to Sep. 2018, 20 pages.
Plexus Medical, "Plexus P1500 Air Express LAL System Service Manual", published at least prior to Sep. 2018, 17 p.
Sage Products, "Pressure Injury and Safe Patient Handling Solutions - Prevalon Mobile Air Transfer Systems; Prevalon Turn & Position Systems; Prevalon Heel Protectors; Prevalon Seated Positioning System Brochure", 2017, 20 pages.
Sage Products, "Prevalon Air Pump Brochure", 2017, 1 page.
Bage Products, "Prevalon AirTap Patient Repositioning System Operator's Manual", 2016, 10 pages.

(56) References Cited

OTHER PUBLICATIONS

Sage Products, "Prevalon AirTap XXL Patient Repositioning System Brochure", 2018, 4 pages.
Sage Products, "Prevalon Standard Turn and Position System Instructions for Use", 2016, 1 page.

* cited by examiner

PATIENT TURNING DEVICE FOR A PATIENT SUPPORT APPARATUS

RELATED APPLICATIONS

The present application is a Continuation of U.S. patent application Ser. No. 17/562,254 filed on Dec. 27, 2021, which is a Divisional of U.S. patent application Ser. No. 16/220,591 filed on Dec. 14, 2018 and issued as U.S. Pat. No. 11,246,775 on Feb. 15, 2022, which claims priority to and all the benefits of U.S. Provisional Patent Application No. 62/611,215 filed Dec. 28, 2017, and U.S. Provisional Patent Application No. 62/738,217 filed Sep. 28, 2018, the disclosures of each of which are hereby incorporated by reference in their entirety.

BACKGROUND

Prolonged bed rest without adequate mobilization is often associated with increased risk of pressure ulcers and/or injuries, increased risk of pulmonary complications including hypoxia and atelectasis, and increased risk of hospital-acquired infections such as ventilator-associated pneumonia. For patients too weak or unstable to be sufficiently mobilized during critical phases of acute illness, treatment has included medical personnel (e.g., nurses) manually turning the patient from side to side for fixed intervals of time. Early manifestations of integrating patient turning with the patient support apparatus included articulating a frame of the patient support apparatus, resulting in especially complicated mechanisms to effectuate the same. Inflatable bladders, for example, a series of elongate inflatable bladders extending longitudinally within a mattress, may subject certain anatomy of the patient to points of localized pressure increase as the elongated bladder is inflated. Moreover, the inflatable bladders disposed within the mattress requires appreciable design considerations to accommodate the expanding volume within the mattress cover. Therefore, a need exists in the art for a patient turning device and patient turning system that overcomes one or more of the aforementioned disadvantages.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
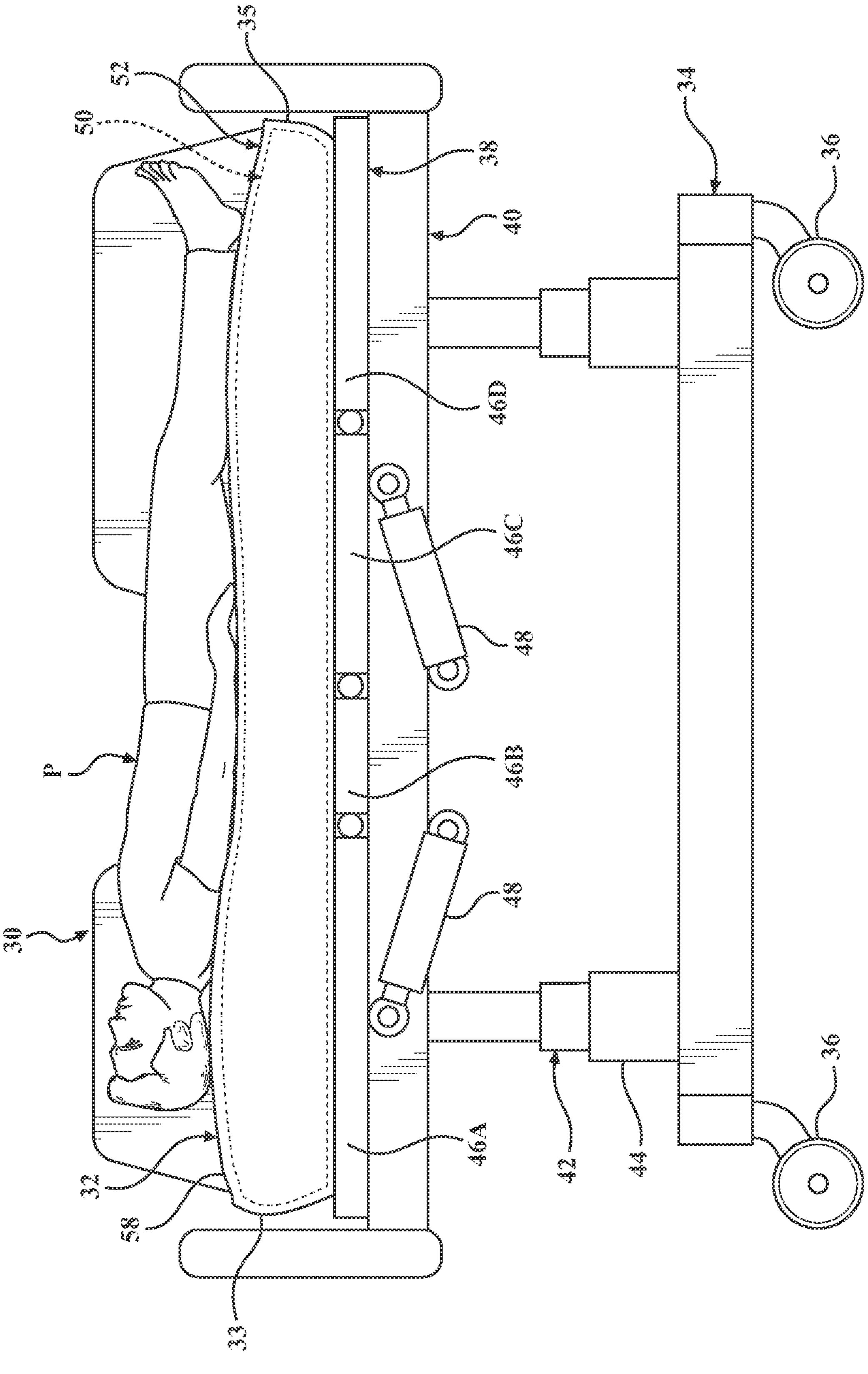
FIG. 1 is an elevational view of a patient support apparatus including a patient support.

FIG. 1 illustrates a patient support apparatus 30 including a patient support 32 in accordance with an exemplary embodiment of the present disclosure. The patient support apparatus 30 shown in FIG. 1 is a hospital bed, but alternatively may be a stretcher, cot, trolley, gurney, wheelchair, recliner, chair, table, or other suitable support or transport apparatus. The patient support apparatus 30 may include a base 34 having wheels 36 adapted to rest upon a floor surface, and a patient support deck 38 supported by the base 34. The illustrated embodiment shows the wheels 36 as casters configured to rotate and swivel relative to the base 34 during transport with each of the wheels 36 disposed at or near an end of the base 34. In some embodiments, the wheels 36 may be non-steerable, steerable, non-powered, powered, or combinations thereof. For example, the patient support apparatus 30 may comprise four non-powered, non-steerable wheels, along with one or more additional powered wheels. The present disclosure also contemplates that the patient support apparatus 30 may not include wheels.

The patient support apparatus 30 may include an intermediate frame 40 spaced above the base 34 with the patient support deck 38 coupled to or disposed on the intermediate frame 40. A lift device 42 may be operably coupled to the intermediate frame 40 and the base 34 for moving the patient support deck 38 relative to the base 34. In the exemplary embodiment illustrated in FIG. 1, the lift device 42 includes a pair of linear actuators 44, but other suitable constructions are contemplated. The illustrated embodiment also shows the patient support deck 38 including articulating sections 46 configured to articulate the patient support 32 between various configurations. The articulating sections 46 may include a fowler section 46A, a seat section 46B, a thigh section 46C, a leg section 46D, and the like, operably coupled to actuators 48. For example, the actuators 48 may move the fowler section 46A between a first position in which the patient P is supine, as illustrated in FIG. 1, and a second position in which the torso of the patient P is positioned at an incline. For another example, a gatch maneuver may be performed in which the positions of the thigh and/or leg sections 46C, 46D are articulated to impart flexion or extension to lower extremities of the patient.

The patient support 32 is supported on the patient support deck 38 of the patient support apparatus 30. The illustrated embodiment shows the patient support 32 as a mattress for supporting the patient P when positioned on the patient support apparatus 30. The patient support 32 includes a crib assembly 50 to be described in detail, and in certain embodiments a cover assembly 52 within which the crib assembly 50 is disposed.

Figure 2:
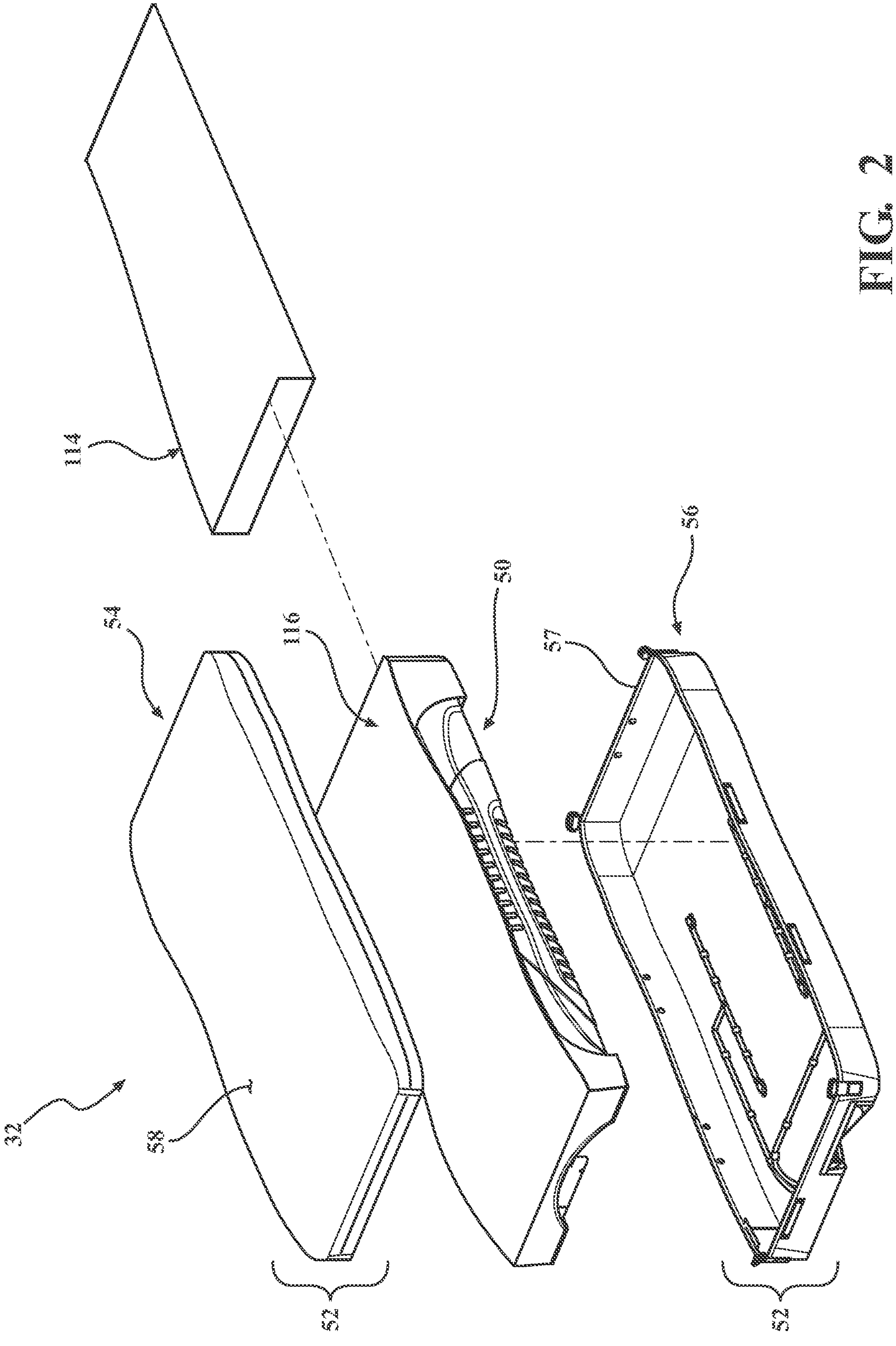
FIG. 2 is an exploded view illustrating a crib assembly, spacer layer, and a cover assembly.
Figure 3:
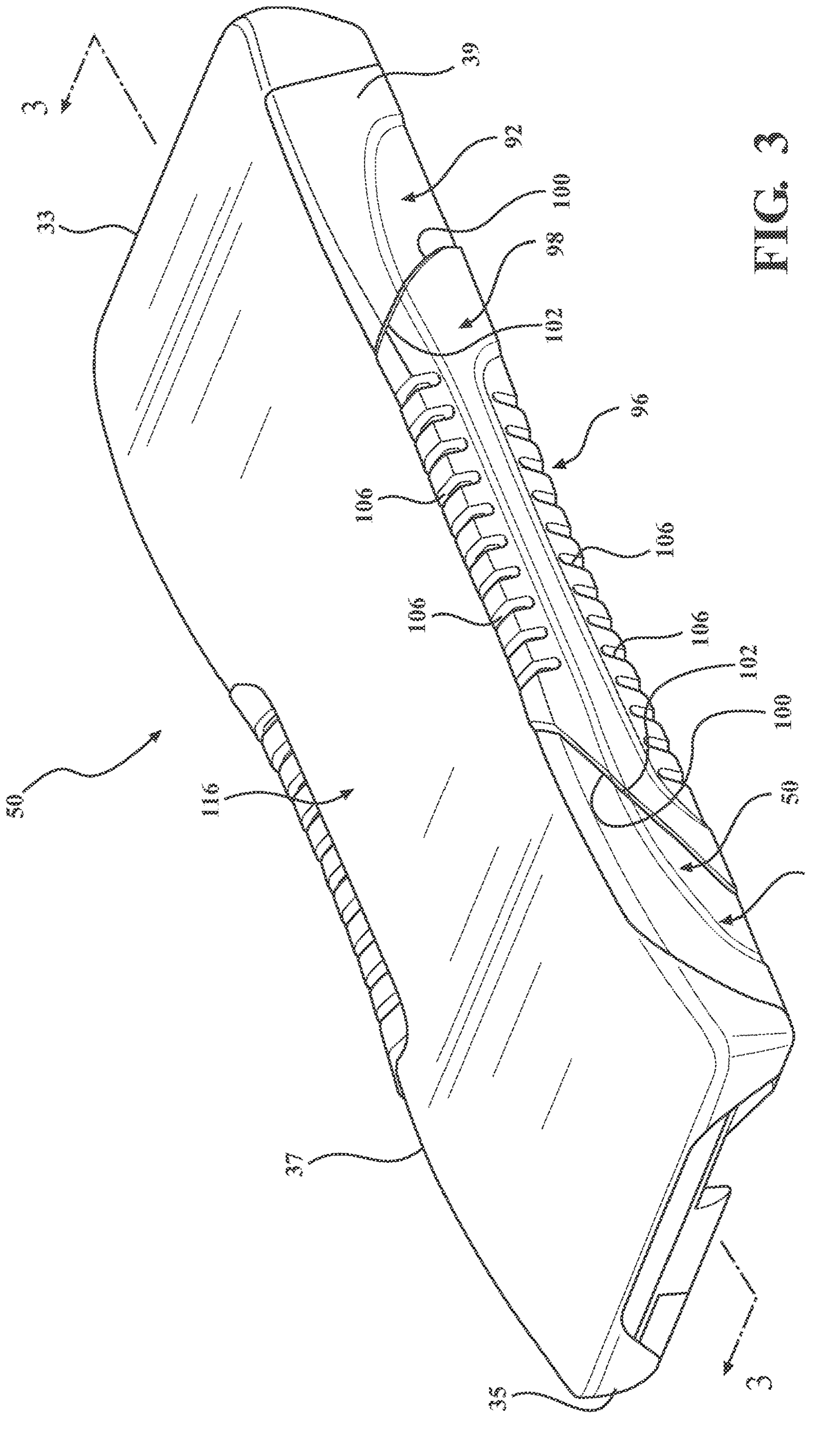
FIG. 3 is a perspective view of the crib assembly and the spacer layer.

Referring to FIG. 2, the cover assembly 52 may include a top cover 54 opposite a bottom cover assembly 56 that cooperate to define an interior sized to receive the crib assembly 50. In certain embodiments, the cover assembly 52 may include a fastening device 57 (see also FIG. 6) for coupling the top cover 54 and the bottom cover assembly 56. In one example, the fastening device 57 is a zipper extending about sides of the cover assembly 52. Other fastening devices may include snaps, clips, tethers, hook and eye connections, adhesive, and the like. In one variant, the top cover 54 and the bottom cover assembly 56 are integrally formed to provide the cover assembly 52 of unitary structure that is not removable from the crib assembly 50. A watershed (not shown) may be coupled to the top cover 54 and/or the bottom cover assembly 56 near the fastening device 57 to prevent ingress of fluid and other substances through the fastening device 57 to within the patient support 32. The crib assembly 50 disposed within the cover assembly 52 may be substantially encased within the cover assembly 52 to define the patient support 32. The crib assembly 50 includes a head end 33 opposite a foot end 35 separated by opposing sides 37, 39 (see FIG. 3).

The patient support 32 defines a patient support surface 58 (FIG. 2) for supporting the patient P. Absent bedding and the like, the patient P may be considered in direct contact with the patient support surface 58 when situated on the patient support 32. Referring now to FIGS. 1 and 2, the patient support surface 58 may be considered an upper surface of the top cover 54 of the cover assembly 52. In a variant without the cover assembly 52, the patient support surface 58 may be considered an upper surface of the crib assembly 50. The patient support surface 58 is sized to support at least a majority of the patient P. Furthermore, during movement therapy to be described, the patient support surface 58 is moved relative to other structures of the patient support 32 and the patient support apparatus 30.

Certain aspects of the crib assembly 50 will now be described with reference to FIGS. 4 and 5. The crib assembly 50, in a most general sense, provides the internal structure of the patient support 32 for supporting and cushioning the patient P on the patient support surface 58. The crib assembly 50 includes at least one, and in the illustrated embodiment more than one, conformable layers to resiliently deform when supporting the weight of the patient P. FIG. 5 shows the crib assembly 50 including an upper conformable layer 60 and a lower conformable layer 62. The upper conformable layer 60 may include a first section 64, a second section 65, and a third section 66 positioned along a length of the crib assembly 50 from the head end 33 to the foot end 35. The first, second, and third sections 64-66 may be arranged (e.g., positioned adjacent to one another) such that the upper conformable layer 60 is disposed beneath at least a majority of the patient support surface 58. In other words, the first section 64 may be disposed near the head end 33 and configured to support at least a portion of the upper body of the patient P, the third section 66 may be disposed near the foot end 35 and positioned to support at least a portion of the lower body of the patient P, and the second section 65 may be disposed between the first and third sections 64, 66 and positioned to support at least a portion of the upper and/or lower body of the patient P. More specifically, the second section 65 may be positioned to support the sacrum, buttocks, and thighs of the patient P, and includes features to be described that accommodate the increased focal pressures often experienced by the patient P in these anatomical areas.

In certain embodiments, the first, second, and/or third sections 64-66 of the upper conformable layer 60 may each include a lattice 68 of cells 70 to be described in greater detail. The lattices 68 of cells 70 may be integrally formed or separately formed lattices 68 that are connected together. Each lattice 68 of cells 70 may be formed of elastic materials, visco-elastic materials, and/or other suitable materials. FIG. 5 shows the first, second, and third sections 64-66 including a head lattice, a torso lattice, and a foot lattice, respectively, with the lattices 68 of an adjacent two of the first, second, and third sections 64-66 positioned in an interlocking arrangement (e.g., a hexagonal tessellation to be described). In other words, the cells 70 at one end of the head lattice 68 are staggered to provide a zig-zag end, and the cells 70 at a complementary end of the torso lattice 68 are staggered to provide a complementary zig-zag end. Likewise, the cells 70 at the other end of the torso lattice 68 are staggered to provide a zig-zag end, and the cells 70 at a complementary end of the foot lattice 68 are staggered to provide a complementary zig-zag end. The complementary zig-zags are positioned in abutting relationship to provide the interlocking arrangement such that, when assembled, the lattices 68 of the first, second, and third sections 64-66 appear integrally formed or continuous.

Figure 4:
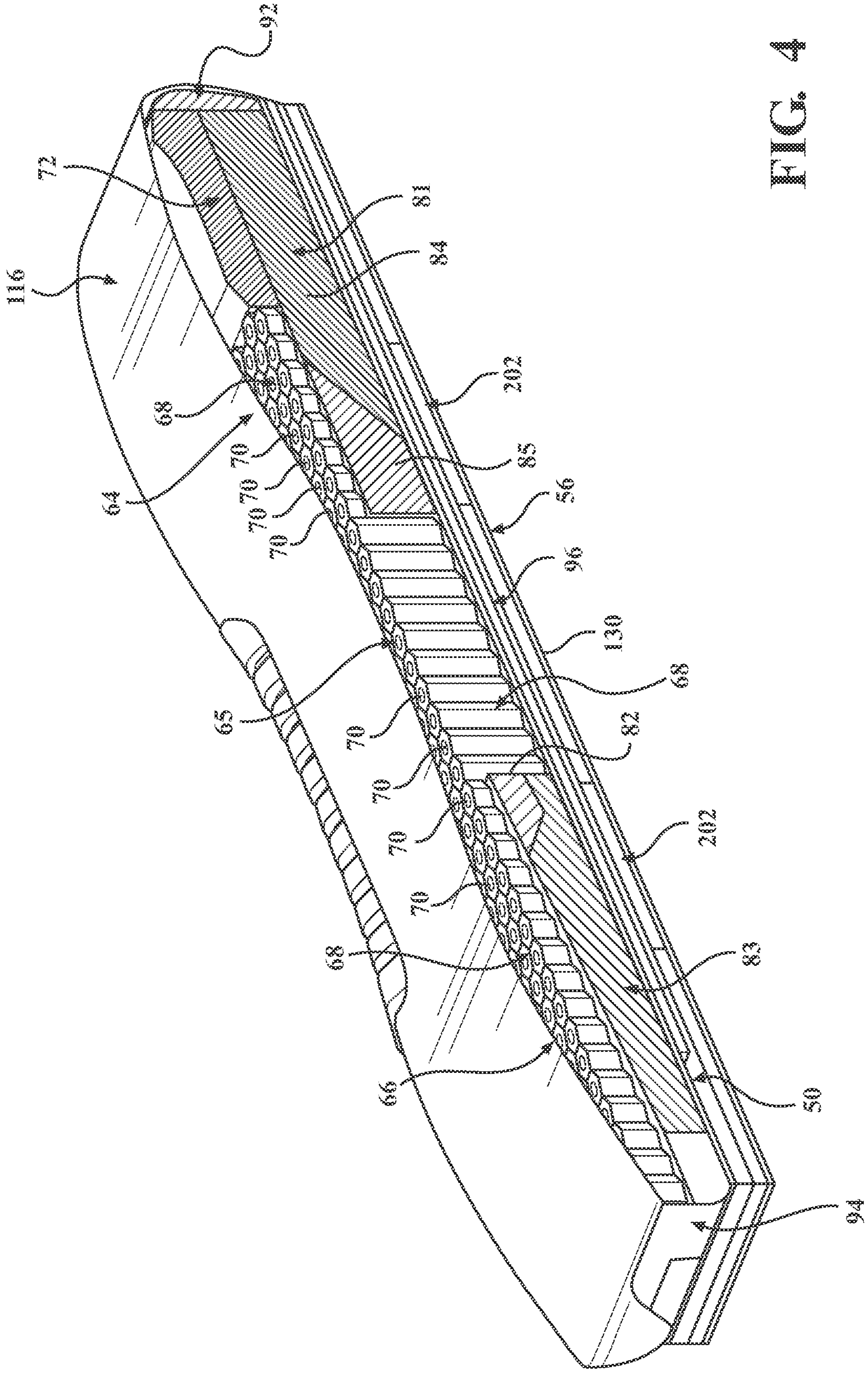
FIG. 4 is a cross-sectional view of the crib assembly and the spacer layer.
Figure 5:
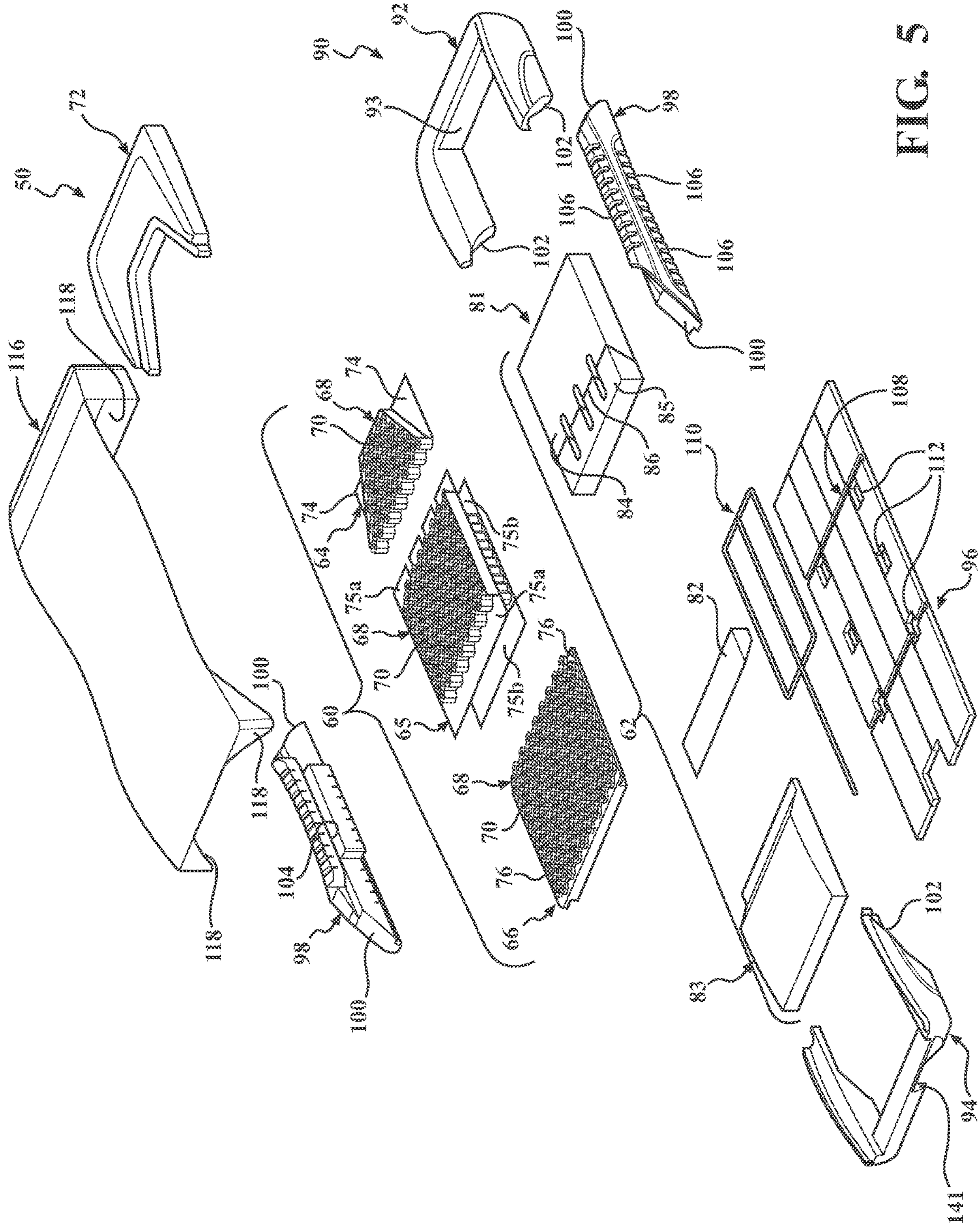
FIG. 5 is an exploded view of the crib assembly and the spacer layer.

With continued reference to FIGS. 4 and 5, the lattice 68 of the first section 64 may include a taper such that the lattice 68 appears generally trapezoidal in shape when viewed in plan. The taper is shaped to accommodate a head end support 72 of the crib assembly 50. In particular, the head end support 72 may be generally U-shaped in construction with opposing legs of the head end support 72 being shaped complementarily to the taper of the lattice 68 of the first section 64. The first section 64 may include coupling features 74 (described further below) extending outwardly from the legs of the trapezoidal-shaped lattice 68 such that the first section 64 appears rectangular when viewed in plan. The coupling features 74 are configured to be coupled with an underside of the legs of the head end support 72 by a suitable joining means, for example an adhesive. A thickness of an end of the head end support 72 adjacent the first section 64 may be approximate a thickness of the lattice 68 of the first section 64 such that, when the head end support 72 and the first section 64 are coupled together, a contoured surface is provided. It is understood from FIGS. 4 and 5 that the head end support 72 may be further contoured in a manner to support the head of the patient P. In certain embodiments, the head end support 72 may be formed from material(s) with less conformability relative to that of the lattice 68 of the first section 64 to accommodate the distinct considerations of supporting the head of the patient P on the patient support 32.

The second section 65 of the upper conformable layer 60 may include the lattice 68 that is generally rectangular in shape when viewed in plan. The second section 65 may include coupling features 75*a*, 75*b* extending outwardly from the rectangular-shaped lattice 68. The coupling features include upper coupling features 75*a*, and lower coupling features 75*b* to be described. The upper coupling features 75*a* on one end of the second section 65 are configured to be coupled with an underside of the first section 64 by a suitable joining means, for example an adhesive, when the head lattice and the torso lattice are positioned in the interlocking arrangement previously described. Likewise, upper coupling features 75*a* on the other end of the second section 65 are configured to be coupled with an underside of the third section 66 with a suitable joining means, for example an adhesive, when the torso lattice and the foot lattice are positioned in the interlocking arrangement previously described. As best shown in FIG. 4, a thickness of the lattice 68 of the second section 65 may be greater than each of the lattices 68 of the first and third sections 64, 66. The increased thickness of the torso lattice, among other advantages, accommodates the increased focal pressures often experienced by the patient P in the anatomical areas mentioned.

The lower conformable layer 62 may include a first section 81, a second section 82, and a third section 83. The first, second, and/or third sections 81-83 of the lower conformable layer 62 may be formed from foam-based material (s) and/or other suitable material(s). The material(s) comprising the first, second, and/or third sections 81-83 may be less conformable relative to that of the lattices 68 of the first, second, and/or third sections 64-66, as it is appreciated that cushioning demands of the lower conformable layer 62 may be relatively less than that of the upper conformable layer 60. The first section 81 may be at least partially positioned beneath at least one of the head end support 72 and the first section 64 of the upper conformable layer 60. In other words, an underside of the head end support 72 and/or the first section 64 is supported upon an upper surface of the first section 81. The first section 81 may include a first portion 84 and a second portion 85 coupled to one another at a joint 86.

As mentioned, the thickness of the lattice 68 of the second section 65 may be greater than the thickness of each of the lattices 68 of the first and third sections 64, 66. With continued reference to FIGS. 4 and 5, an end of the first section 81 of the lower conformable layer 62 may be positioned adjacent a corresponding end of the second section 65 of the upper conformable layer 60. In certain locations of the second section 65, there may not be a structure of the lower conformable layer 62 positioned beneath the second section 65 of the upper conformable layer 60. The second section 82 of the lower conformable layer 62 is positioned adjacent another end of the second section 65 of the upper conformable layer 60 opposite the first section 81, as best shown in FIG. 4. The second section 82 of the lower conformable layer 62 may further be at least partially positioned beneath the third section 66 of the upper conformable layer 60. In other words, an underside of the third section 66 is supported on an upper surface of the second section 82.

The third section 83 of the lower conformable layer 62 may be positioned adjacent the second section 82. The third section 83 may be at least partially positioned beneath at least one of the second and third sections 65, 66 of the upper conformable layer 62. In other words, an underside of the second section 65 and/or the third section 66 of the upper conformable layer 62 is supported upon an upper surface of the third section 83 of the lower conformable layer 62. With continued reference to FIGS. 4 and 5, each of the second and third sections 82, 83 of the lower conformable layer 62 may include complementarily inclined surfaces positioned in an abutting relationship.

As mentioned, the coupling features of the second section 65 may include the upper coupling features 75*a* previously described, and lower coupling features 75*b*. The lower coupling features 75*b* extend outwardly from the rectangular-shaped lattice 68 and are spaced apart from the upper coupling features 75*a* to define gaps therebetween. The lower coupling features 75*b* on one end of the second section 65 are configured to be coupled with an underside of the first section 81 by a suitable joining means, for example an adhesive, and the lower coupling features 75*b* on the other end of the second section 65 are configured to be coupled with an underside of the third section 83 by a suitable joining means, for example an adhesive. In such an arrangement, the gaps between the upper and lower coupling features 75*a*, 75*b* are sized to receive a thickness of the first section 81 and a combined thickness of the second and third sections 82, 83, as best shown in FIG. 4.

The upper conformable layer 60 and the lower conformable layer 62 are configured to be received in a cavity defined by a crib 90 of the crib assembly 50. In a most general sense, the crib 90 provides a framework of the patient support 32. In the illustrated embodiment, the crib 90 may include a head end frame member 92, a foot end frame member 94, a base layer 96, and side frame members 98 with each to be described in turn. The head end frame member 92 may be generally U-shaped in construction with the head end frame member 92 engaging the first section 81 of the lower conformable layer 62 on three sides. The head end frame member 92 may include a recess 93 sized to receive an end of the first section 81. Further, the generally U-shaped head end frame member 92 may at least partially engage the head end support 72 on three sides. In at least some respects, the head end frame member 92 may be considered the head end 33 of the crib assembly 50.

The foot end frame member 94 may be coupled to the upper and lower conformable layers 60, 62 opposite the head end frame member 92. The foot end frame member 94 may be coupled to an end of the third section 66 opposite the second section 65. FIG. 5 shows the foot end frame member 94 being generally U-shaped in construction so that the foot end frame member 94 engages the third section 66 on three sides. In particular, the third section 66 of the upper conformable layer 60 includes coupling features 76 extending from opposing sides of the lattice 68. The coupling features 76 are configured to be coupled with an upper surface of opposing legs of the generally U-shaped foot end frame member 94 by a suitable joining means, for example an adhesive. In at least some respects, the foot end frame member 94 may be considered the foot end 35 of the patient support 32.

Flanking the upper and lower conformable layers 60, 62 are the side frame members 98. The side frame members 98 are coupled to each of the head end frame member 92 and the foot end frame member 94. With concurrent reference to FIG. 3, the illustrated embodiment shows the side frame members 98 including inclined surfaces 100 matingly engaging complementary inclined surfaces 102 of each of the head end frame member 92 and the foot end frame member 94. Further, the side frame members 98 may be coupled to one or both of the upper and lower conformable layers 60, 62. FIG. 5 shows the side frame members 98 including an upper ledge 104 configured to receive the upper coupling features **75*a* extending from opposing sides of the second section 65** with a suitable joining means, for example an adhesive.

Referring to FIG. 5, the side frame members 98 may include slots 106 at least partially extending transversely through the side frame members 98 to define rib-like structures. The slots 106 may be provide for flexion of the side frame members 98 through relative articulation of the rib-like structures secondary to the material forming the side frame members 98. The slots 106 may further include upper and lower slots extending inwardly from upper and lower surfaces, respectively, of the side frame members 98.

The side frame members 98 coupled to each of the head end frame member 92 and the foot end frame member 94 may be considered to define a perimeter of the crib 90. The aforementioned cavity within which the upper and lower conformable layers 60, 62 are received is further defined by the base layer 96. Referring again to FIG. 5, the base layer 96 may be a planar structure to which each of the head end frame member 92, the foot end frame member 94, and the side frame members 98 are coupled. The base layer 96 is positioned beneath the lower conformable layer 62 such that an upper surface the base layer 96 may support the lower conformable layer 62. The base layer 96 may include at least one channel 108 sized to receive a first conduit assembly 110. The first conduit assembly 110 is configured to be in communication with a fluid source 111 (see FIG. 23) to at least partially define a fluid flow path and circulate fluid from the fluid source 111, for example, air or conditioned fluid, through the fluid flow path to supply heat, remove heat, supply moisture, remove moisture, or the like, from the patient support surface 58. In other words, the first conduit assembly 110 circulating fluid may be utilized to control the conditions at or near an interface between the top cover 54 and the skin of the patient, to control the temperature and/or humidity at the interface. The base layer 96 may also define apertures 112 to accommodate structures of a patient turning system 200 to be described in greater detail. In certain embodiments, the crib assembly 50 includes a fire barrier layer 114 (see FIG. 2). Exemplary fire barrier layers suitable for the present application may be provided under the tradename NoMex (DuPont Company, Wilmington, Dela.), and under the tradename Integrity30 (Ventrex Inc., Ashburn, Virg.).

The patient support 32 may include a spacer layer 116 covering substantially an entirety of an upper surface of the crib assembly 50. More particularly, the spacer layer 116 covers the head end support 72 and the upper conformable layer 60. As best shown in FIG. 5, the spacer layer 116 may include coupling features 118 with the coupling features 118 at one end sized to receive the crib assembly 50, and more particularly the head end frame member 92. The coupling features 118 at the opposing end are configured to be coupled to the foot end frame member 94. The coupling features may be gusset-like features, such as elastic gussets conventionally provided on fitted sheets.

As previously mentioned, the top cover 54 is coupled to the bottom cover assembly 56, for example, with the fastening device 57. Components and features of the bottom cover assembly 56 will now be described with reference to FIG. 6. The bottom cover assembly 56 includes a carrier sheet 120. An upper surface of the carrier sheet 120 may be considered the structure in direct contact with an underside of the base layer 96 when the patient support 32 is assembled. At least one coupler 122 may be coupled to and extend from the upper surface of the carrier sheet 120. The couplers 122 are configured to secure a second conduit assembly 124 of the patient turning system 200 to be described. An underside of the base layer 96 may include additional channels (not shown) sized to receive the second conduit assembly 124 such that the underside of the base layer 96 and the upper surface of the carrier sheet 120 are in direct flat-on-flat contact. The carrier sheet 120 may include a base portion 126 and opposing sides 128 extending upwardly from the base portion 126. The fastening device 57 may be coupled to an upper edge of the opposing sides 128.

A bottom cover 130 may be coupled to the carrier sheet 120 to define a bottom of the patient support 32. In other words, an underside of the bottom cover 130 may be considered the surface in direct contact with the patient support deck 38 of the patient support apparatus 30 (see FIG. 1). The bottom cover 130 may include a head end section 132, a middle section 134, and a foot end section 136. The head end section 132, the middle section 134, and the foot end section 136 may be integrally formed or discrete components coupled to one another. The head end, middle, and foot end sections 132-136 collectively define a cavity sized to receive the carrier sheet 120, at least one patient turning device 202 of the patient turning system 200 to be described, and at least a portion of the crib assembly 50 previously described. In particular, an upstanding sidewall of each of the head end section 132 and the foot end section 136 may be arcuate and contoured to the head end frame member 92 and the foot end frame member 94, respectively, of the crib assembly 50. In the illustrated embodiment of FIG. 6, one or more handles 138 are coupled to head end, middle, and/or foot end sections 132-136 to assist caregivers with manipulating the patient support 32 when the patient support 32 is disposed on the patient support deck 38.

The foot end section 136 defines a recess 140 sized to receive a port connector 142 to be described in detail. In short, the port connector 142 includes ports (not shown) configured to be in fluid communication with the fluid source 111 (see FIG. 23), and further configured to be in fluid communication with the first conduit assembly 110 and/or the second conduit assembly 124. The recess 140 of the foot end section 136 may be substantially aligned with a void between the gusset-like coupling features 118 coupled to the foot end frame member 94. The recess 140 of the foot end section 136 may also be substantially aligned with a complementary recess 141 defined within the foot end frame member 94, as shown in FIG. 5. The port connector 142 is positioned within the recesses 140, 141 so as to be accessible by caregivers positioned near the foot end 35 of the patient support 32.

The middle section 134 of the bottom cover 130 includes a base portion 144 and opposing sides 146 extending upwardly from the base portion 144. The fastening device 57 may be coupled to an upper edge of the opposing sides 146 (with or without also being coupled to the upper edge of the opposing sides 128 of the carrier sheet 120). With the carrier sheet 120 received within the middle section 134 of the bottom cover 130, the base portion 126 of the carrier sheet 120 is adjacent the base portion 144 of the bottom cover 130 (other than the presence of the patient turning devices 202), and the opposing sides 128 of the carrier sheet 120 are adjacent the opposing sides 146 of the bottom cover 130. The base portion 144 and/or opposing sides 146 of the bottom cover 130 may define an augmenting feature 148. In short, because the patient turning devices 202 are positioned external to the crib assembly 50 yet within the bottom cover assembly 56, the augmenting features 148 accommodate the expansion of the patient turning devices 202 and prevent "hammocking" of the patient support surface 58 (i.e., localized alteration or stretching of the patient support surface 58 to a generally concave or arcuate contour that results in localized pressure points). For example, the augmenting features 148 may include the opposing sides 146 of the bottom cover 130 to be at least partially formed from Neoprene and/or other suitably elastic material(s).

Figure 6:
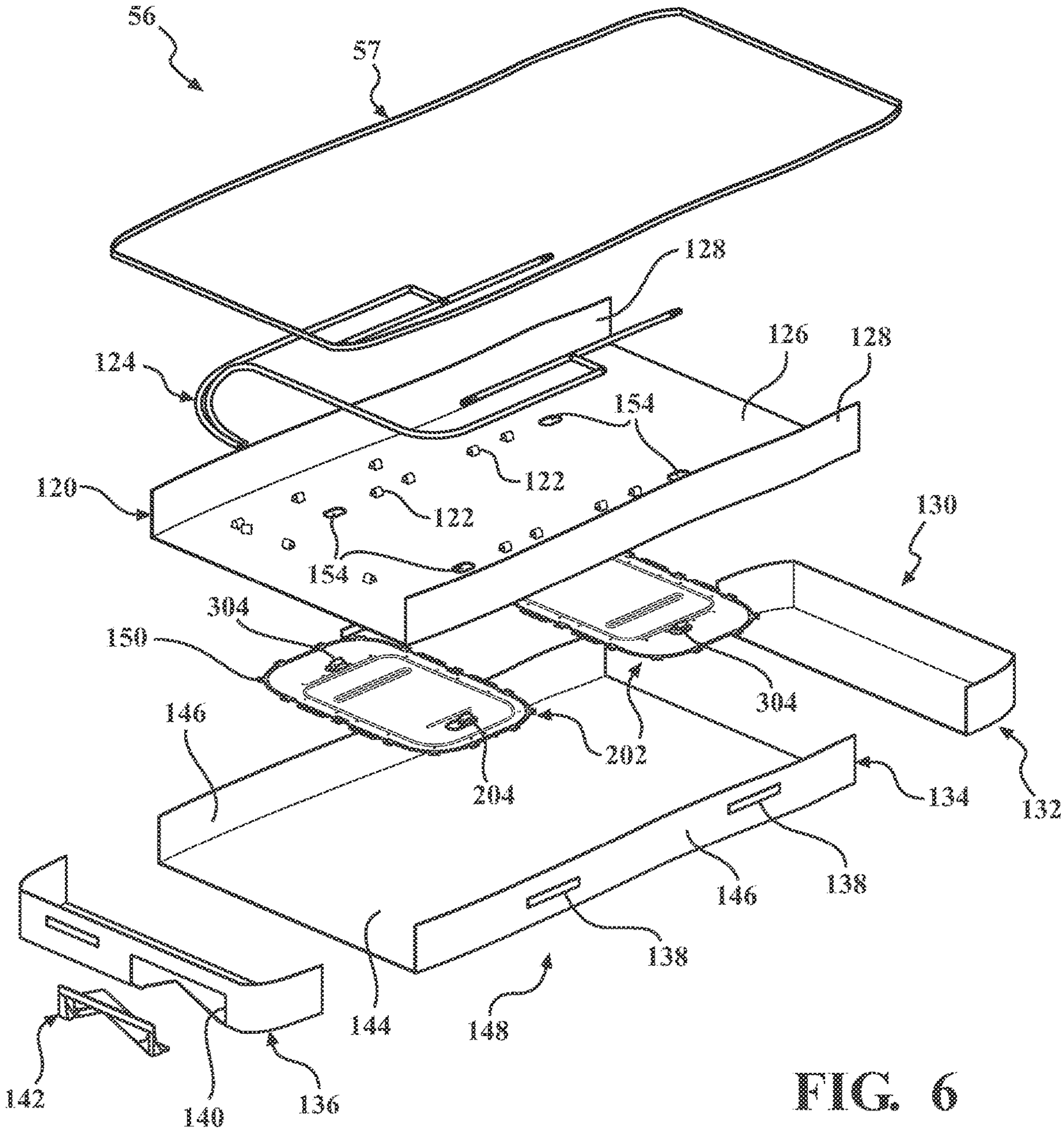
FIG. 6 is an exploded view of a bottom cover assembly.

With continued reference to FIG. 6 and concurrent reference to FIG. 4, the patient support 32 includes at least one of the patient turning devices 202 for moving the patient support surface 58, for example, during the movement therapy. The patient turning devices 202 are positioned between the carrier sheet 120 and the bottom cover 130. More particularly, the patient turning devices 202 are coupled to an underside of the carrier sheet 120 and may not be coupled to the bottom cover 130. The patient turning devices 202 include at least one inlet port 204, 304 configured to be arranged in fluid communication with the second conduit assembly 124, the ports (not shown) of the port connector 142, and the fluid source 111 (see FIG. 23). The carrier sheet 120 includes at least one aperture 154 sized and positioned such that, when the patient turning devices 202 are coupled to the carrier sheet 120, the inlet ports 204, 304 extend through the apertures 154. In manners to be described, at least one of the patient turning devices 202 is configured to be selectively inflated and deflated in order to move at least a portion of the patient support surface 58 and the crib assembly 50 away from or towards the patient support deck 38, respectively.

The patient turning devices 202 will now be described with reference to FIGS. 7-23. One of the patient turning devices 202 will be described in the interest of brevity, but it is understood that the patient support 32 may include more than one of the patient turning devices 202 with the same or similar features. For example, FIG. 4 shows two of the patient turning devices 202, and in particular, two patient turning devices 202 spaced apart lengthwise beneath the crib assembly 50 by a distance (D) such that a portion of the crib assembly 50 above the space supports the sacrum of the patient (see FIG. 24). In other words, the sacrum of the patient P "floats" over the patient support deck 38 of the patient support apparatus 30 when the patient turning devices 202 are inflated during the movement therapy. Likewise, the heels of the patient P may "float" over the patient support deck 38 of the patient support apparatus 30 when the patient turning devices 202 are inflated during the movement therapy. In other words, providing no patient turning device 202 positioned below the sacrum and the heels of the patient P facilitates creating "offloading zones" when the patient P is turned between sides during the movement therapy. More specifically, one of the offloading zones is created by the patient turning devices 202 being spaced apart by the distance D. The distance D by which the patient turning devices 202 are spaced apart may be based on, at least in part, the "rigidity" of the crib assembly 50 itself. Should the crib assembly 50 be formed of relatively plush or flexible materials with little internal stiffening, it may be appropriate to lessen the distance D and space the patient turning devices 202 closer together. By contrast, should the crib assembly 50 be formed of relatively stiff materials, it may be desirable to lengthen the distance D and space the patient turning devices 202 farther apart. The arrangement decreases the likelihood of discomfort to the patient and skin-related complications such as irritation and/or pressure ulcers.

Figure 7:
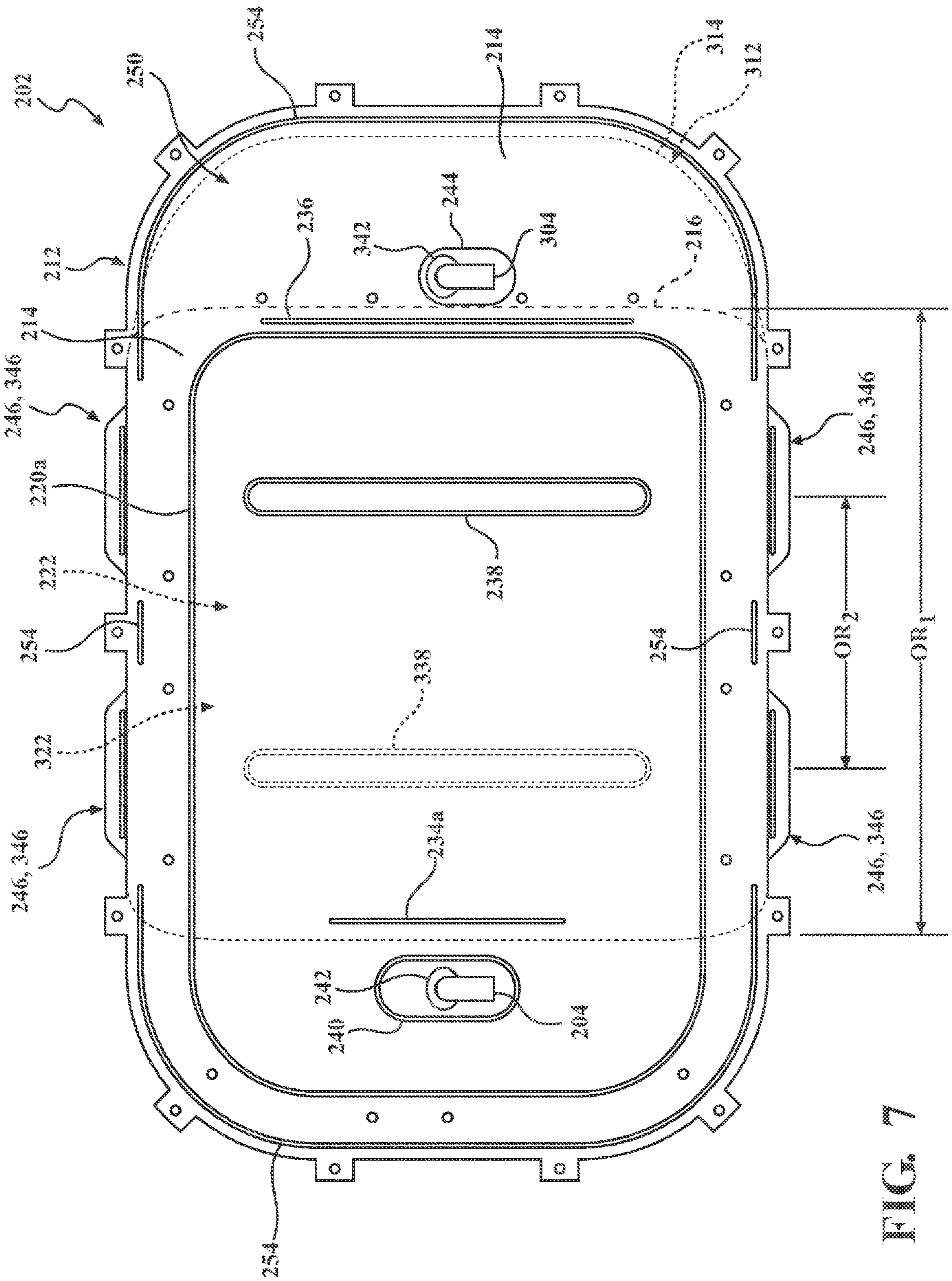
FIG. 7 is a top plan view of a patient turning device.
Figure 8:
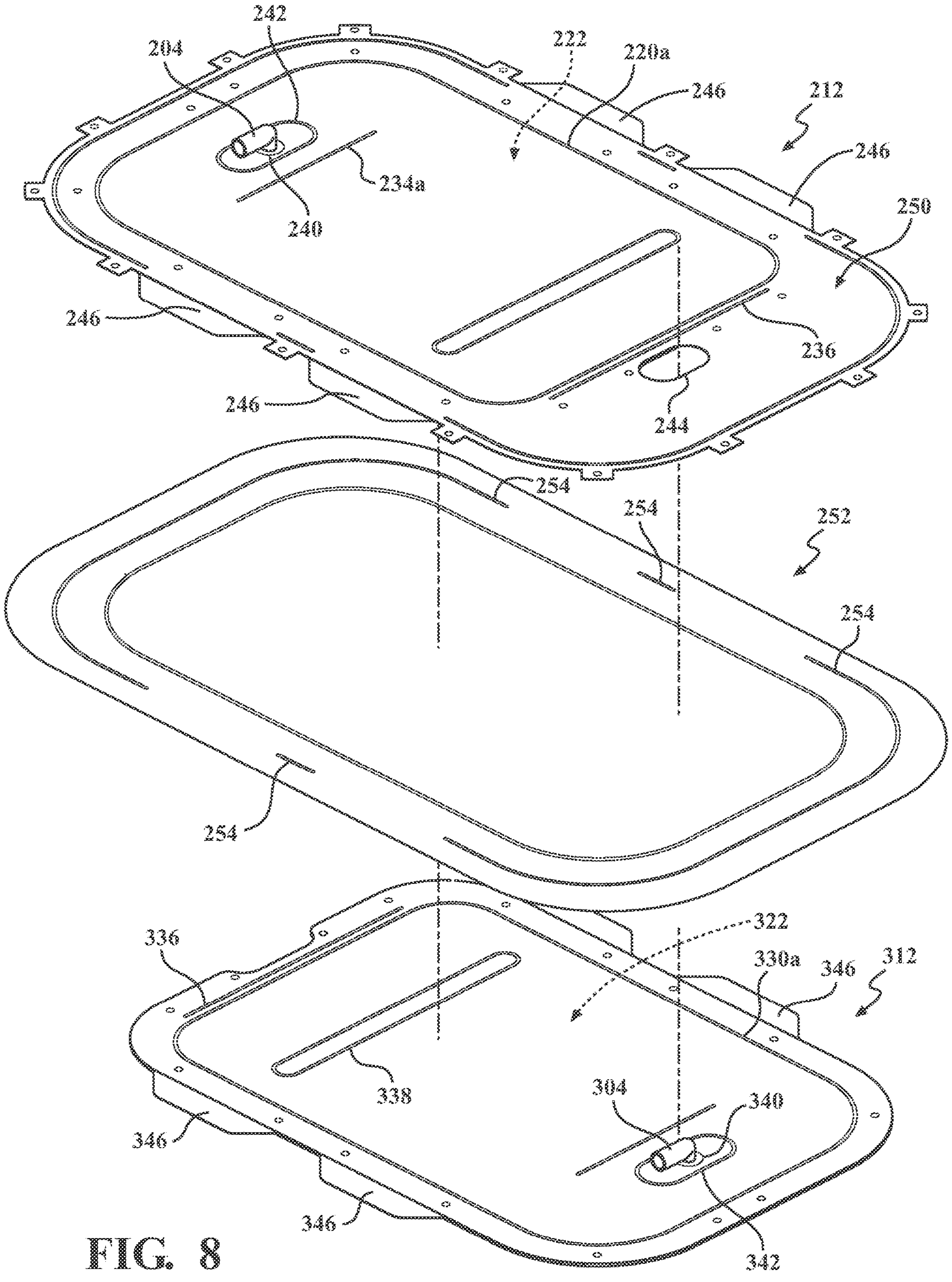
FIG. 8 is an exploded view of the patient turning device.
Figure 12:
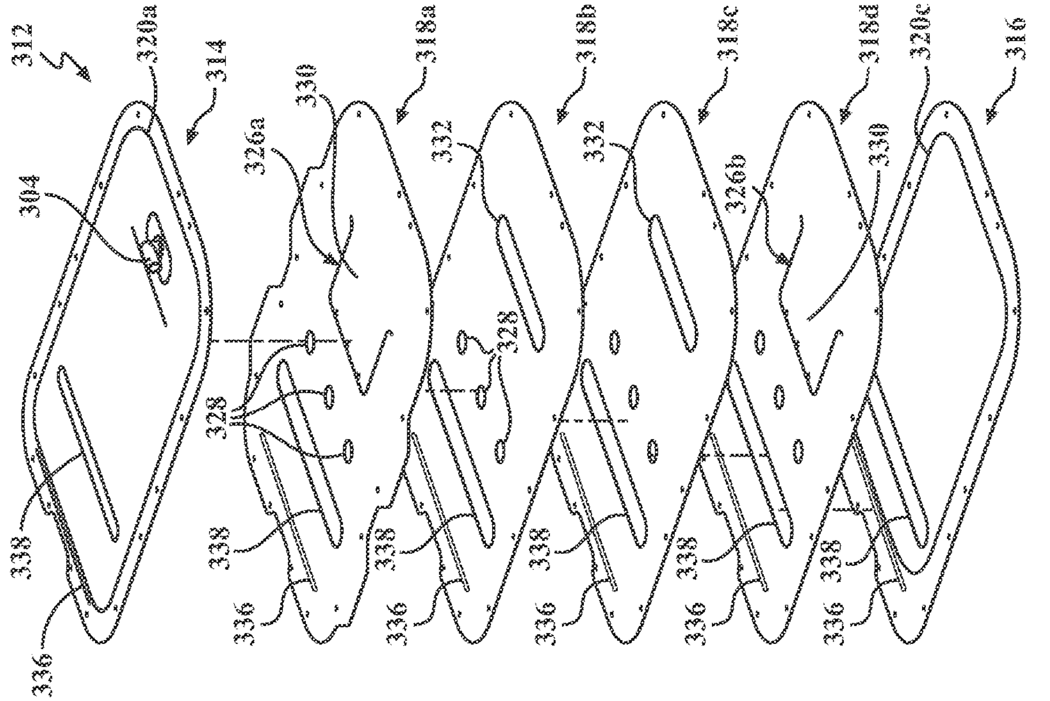
FIG. 12 is an exploded view of the second bladder assembly showing a plurality of layers.
Figure 11:
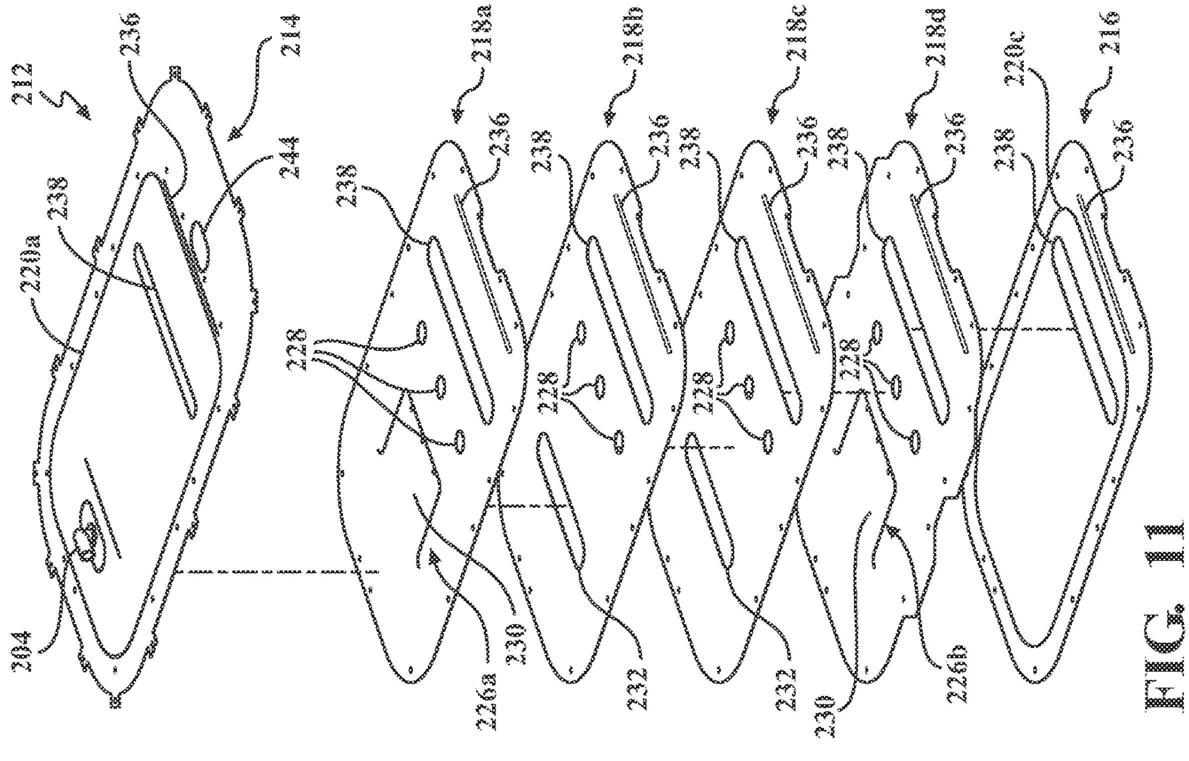
FIG. 11 is an exploded view of the first bladder assembly showing a plurality of layers.
Figure 14:
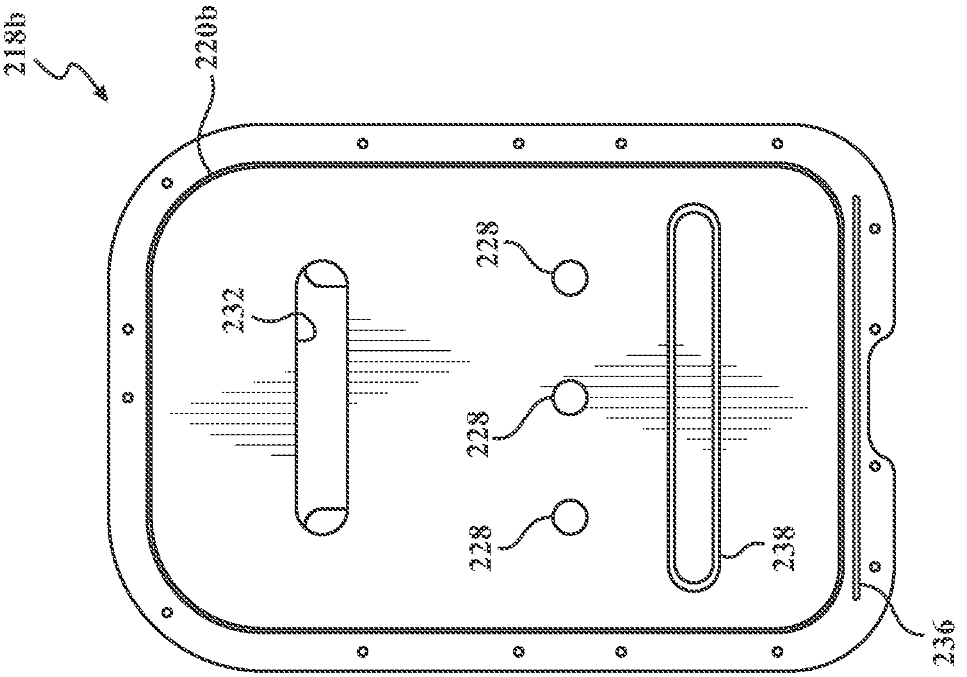
FIG. 14 is a top plan view of another interior layer of the plurality of layers of FIG. 11.

Referring first to FIGS. 7 and 8, the patient turning device 202 includes a first bladder assembly 212 and a second bladder assembly 312. Each of the first and second bladder assemblies 212, 312 are configured to be arranged in fluid communication with the fluid source 111 for selectively being inflated and deflated. The expanding of one or both of the first and second bladder assemblies 212, 312 moves a corresponding portion of the patient support surface 58 and the crib assembly 50 away from the patient support deck 38 to, for example, provide the movement therapy to the patient. As best shown in FIGS. 11 and 12, each of the first and second bladder assemblies 212, 312 may be constructed from a plurality of layers coupled together with seals to define a bladder volume. The layers may be constructed from a low-shear nylon fabric (e.g., TEK AIR 200 TPU) or any other suitable material, and the welds may be ultrasonic welds or any other suitable joining means. The material(s) forming the layers are preferably inelastic, but may exhibit at least some elastic characteristics, and may be substantially elastic in other embodiments. For convention when describing components of the first and second bladder assemblies 212, 312, the use of the term "first" relates to the first bladder assembly 212 and the use of the term "second" relates to the second bladder assembly 312.

Figure 9:
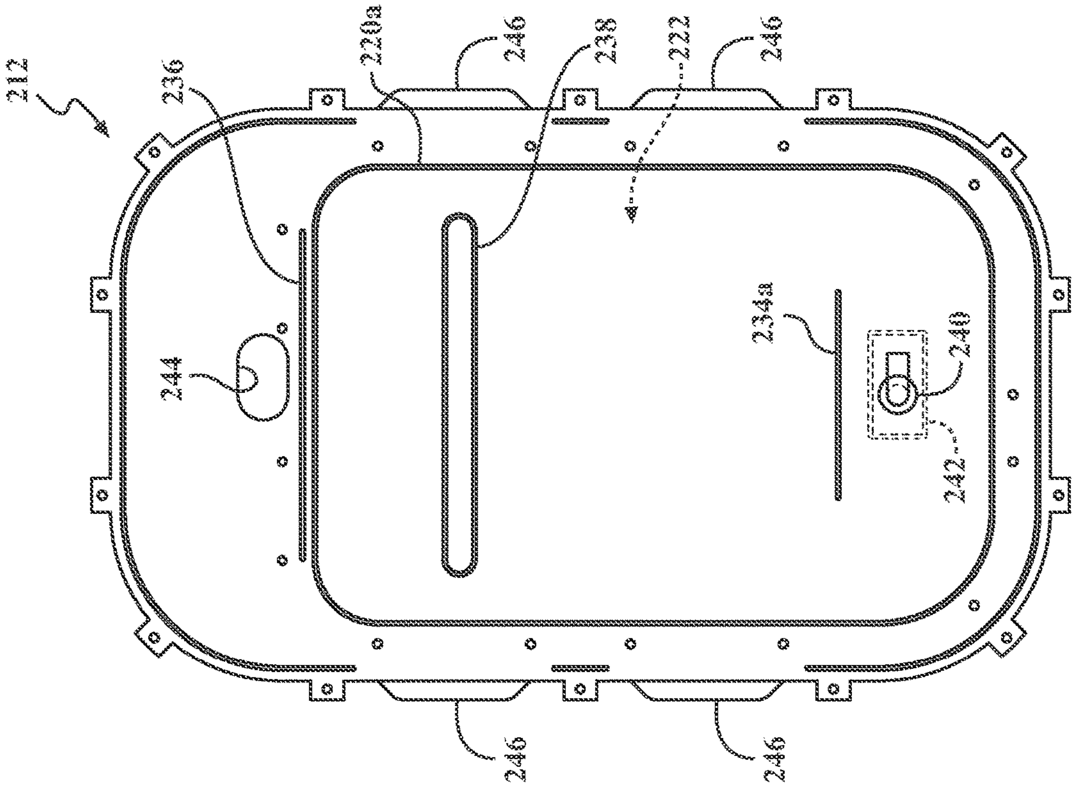
FIG. 9 is a top plan view of a first bladder assembly of the patient turning device.

FIGS. 8, 9, 11 and 13-16 are directed, at least partially, to the first bladder assembly 212. FIGS. 8, 9 and 11 show top perspective and plan views of the first bladder assembly 212, and FIGS. 13-16 are bottom plan views of interior layers 218*a-d* of the first bladder assembly 212. Thus, when describing the construction of the first bladder assembly 212, certain welds disposed on undersides of the layers and visible in FIGS. 13-16 may not be visible in, for example, the exploded view of FIG. 11 showing the upper sides of the layers. The first bladder assembly 212 includes a first upper layer 214 opposite a first lower layer 216, and the interior layers 218*a-d*. At least two of the plurality of layers 214, 216, 218*a-d* are coupled to one another with first outer perimeter seals 220*a-c* (see FIGS. 9, 14, 16) to define a first bladder volume 222 represented in phantom in FIGS. 7 and 8. Further, at least two of the plurality of layers 214, 216, 218*a-d* are coupled to one another with first inner perimeter seals 224*a-b* (see FIGS. 13, 15) to further define the bladder volume 222.

Figure 21:
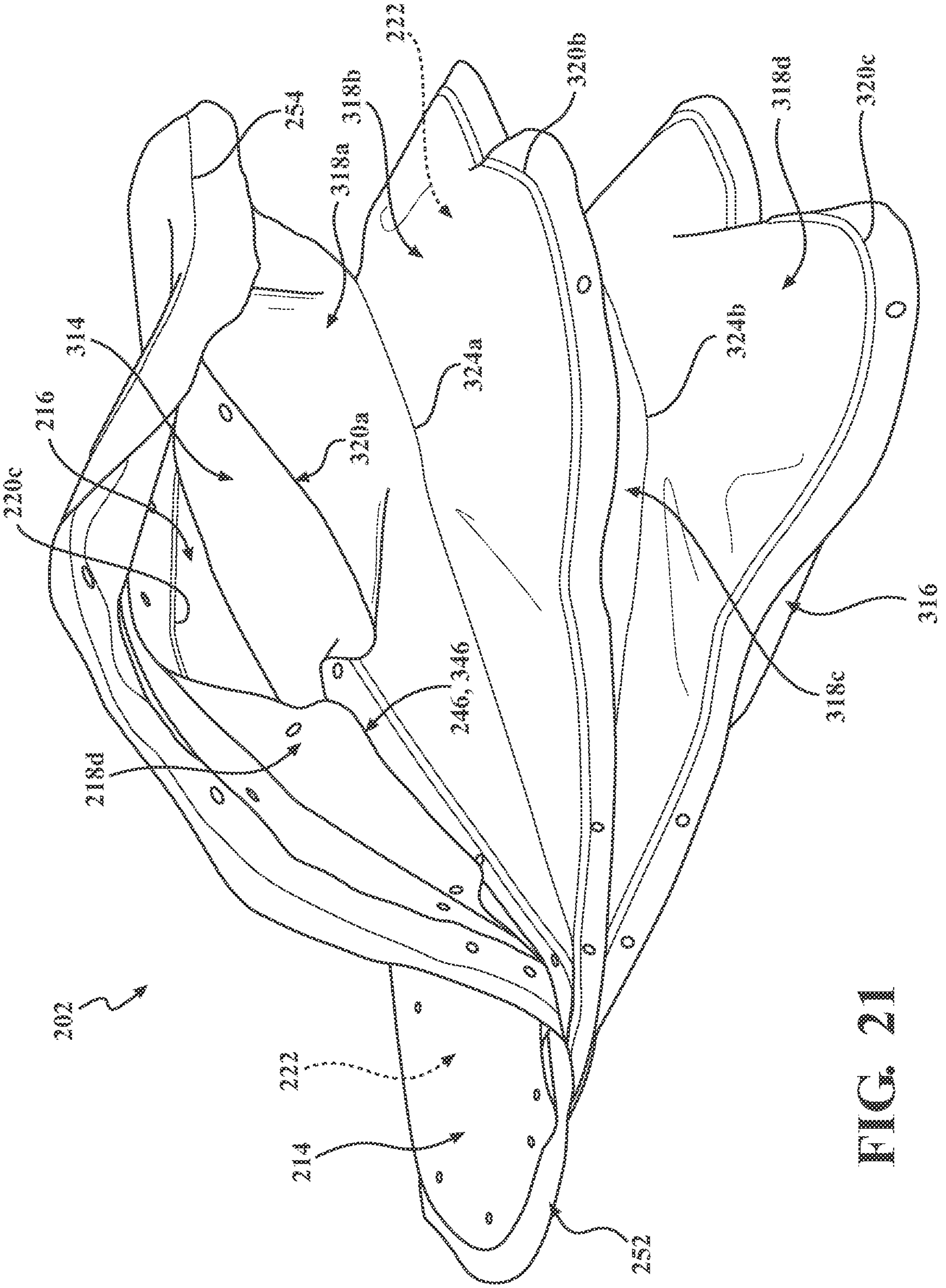
FIG. 21 is a perspective view of the patient turning device with the second bladder assembly expanded with fluid from a fluid source.

Outer perimeter seal 220*a* couples together the upper layer 214 and first interior layer 218*a* (see FIG. 9 in conjunction with FIG. 11). Another outer perimeter seal 220*b* couples together interior layer 218*b* and interior layer 218*c* (see FIG. 14 in conjunction with FIG. 11). Still another outer perimeter seal 220*c* couples together interior layer 218*d* and the lower layer 216 (see FIG. 16 in conjunction with FIG. 11). An inner perimeter seal 224*a* couples together interior layer 218*a* and interior layer 218*b*. Another inner perimeter seal 224*b* couples together interior layer 218*c* and interior layer 218*d*. In other words, the inner perimeter seals 224*a-b* couple together adjacent pairs of layers of the first bladder assembly 212 not coupled together with the outer perimeter seals 220*a-c*. As generally appreciated from FIGS. 13-16, the inner perimeter seals 224*a-b* define a smaller perimeter relative to the outer perimeter seals 220*a-c*; i.e., at least a portion of the inner perimeter seals 224*a-b* are positioned inwardly (e.g., inboard) relative to the outer perimeter seals 220*a-c*. As a result, with the interior layers 218*a-d* stacked in a vertical arrangement as shown in FIG. 11 and coupled together in the aforementioned manner, a side of the first bladder assembly 212 is concertinaed, as best shown in FIG. 21. Stated differently, the inner perimeter seals 224*a-b* are interleaved with the outer perimeter seals 220*a-c* such that the side(s) of the first bladder assembly 212 formed by the plurality of layers 214, 216, 218*a-d* are accordion-like in appearance and function. In one example, the concertinaed sides are formed by the inner perimeter seals 220*a-c* tapering outwardly from a midline of the first bladder assembly 212 from the inlet port 204 towards a crease seal 238 to be described. The outwardly tapering nature of the inner perimeter seals 220*a-c* provides structural integrity to the first bladder assembly 212 as well as facilitating a desired shape of the bladder volume 222 during expansion.

Within the boundaries defined by the outer and inner perimeter seals 220*a-c*, 224*a-b*, the spaces between each of the plurality of layers 214, 216, 218*a-d* are in fluid communication with one another to define the bladder volume 222. In particular, each of the interior layers 218*a-d* includes apertures 228 extending through the interior layers 218*a-d* to provide the fluid communication. FIGS. 11 and 13-16 show each of the interior layers 218*a-d* having three of the apertures 228 spaced apart laterally between opposing sides of the respective interior layer 218*a*-d. Moreover, the apertures 228 of each of the interior layers 218*a-d* are positioned in vertical alignment with the first bladder assembly 212 assembled, as appreciated from FIG. 11. As a result, when fluid is provided to the bladder volume 222 through the first inlet port 204, the fluid is efficiently distributed within the bladder volume 222 for substantially uniform expansion of the first bladder assembly 212.

Figure 13:
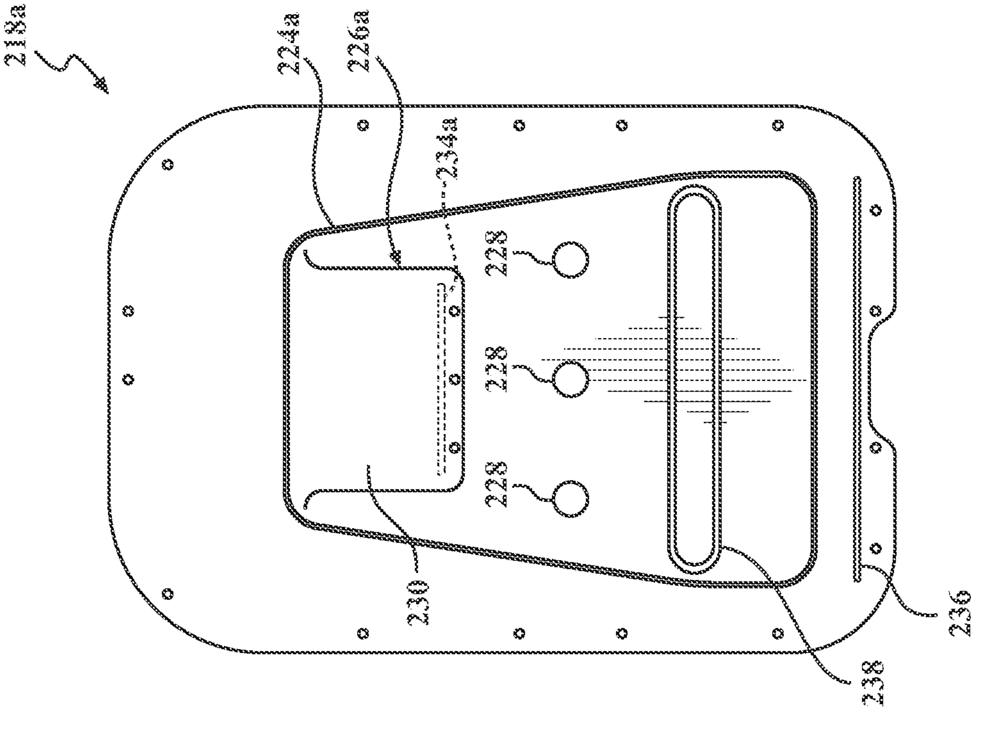
FIG. 13 is a top plan view of an interior layer of the plurality of layers of FIG. 11.
Figure 16:
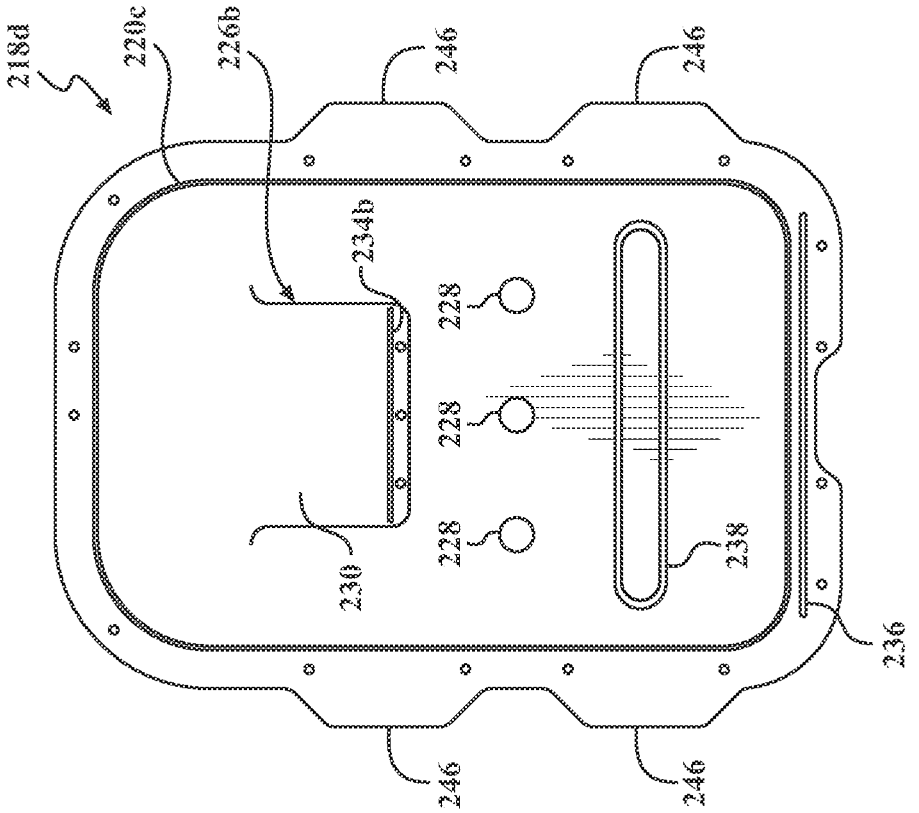
FIG. 16 is a top plan view of another interior layer of the plurality of layers of FIG. 11.
Figure 15:
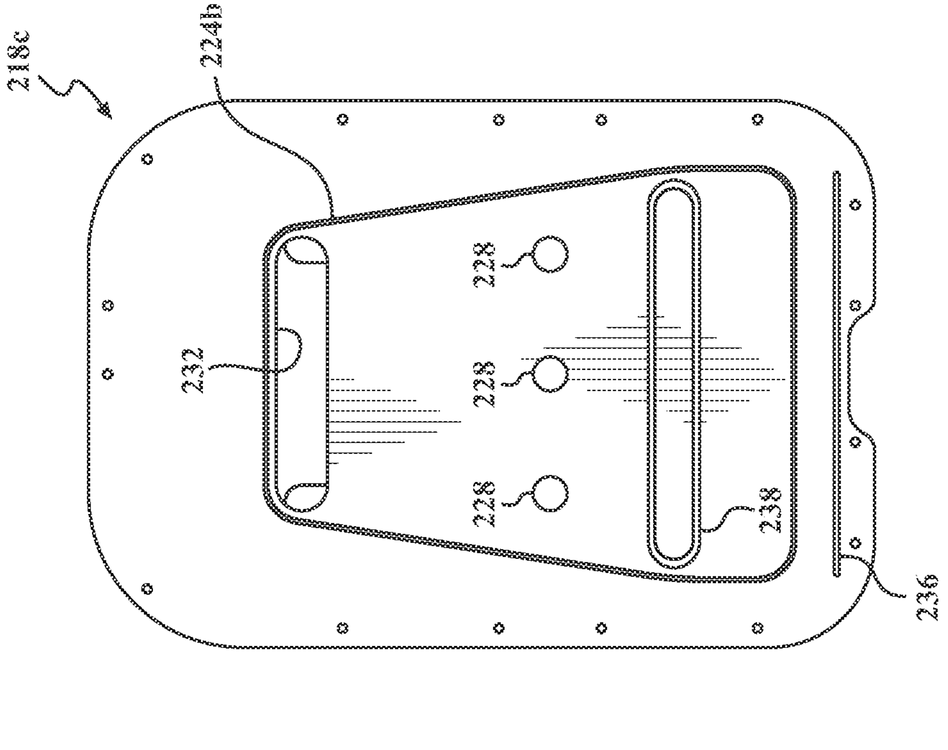
FIG. 15 is a top plan view of another interior layer of the plurality of layers of FIG. 11.
Figure 18:
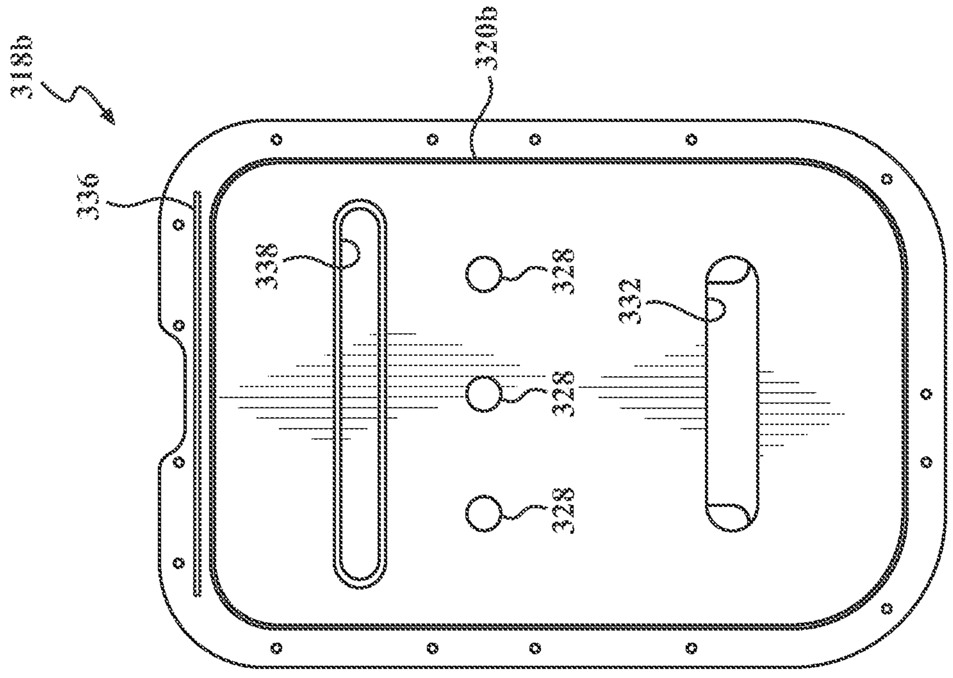
FIG. 18 is a top plan view of another interior layer of the plurality of layers of FIG. 12.

Fluid communication between certain layers of the bladder assembly 212 is further provided with first baffles 226*a-b*. FIGS. 11, 13 and 16 show that the interior layers 218*a*, 218*d* include the baffles 226*a-b*. The baffles 226*a-b* may include a flap 230 of material of the respective layer 218*a-d* defined by a cutout in the respective layer. One of the baffles 226*a* further provides fluid communication between the space between the upper layer 214 and the interior layer 218*a*, and the space between the interior layer 218*a* and the interior layer 218*b*. Likewise, another one of the baffles further provides fluid communication between the space between the interior layer 218*c* and the interior layer 218*d*, and the space between the interior layer 218*d* and the lower layer 216. Further fluid communication between the interior layers 218*b*, 218*c*, 218*d* may be provided with openings 232. Similar to the aforementioned apertures 228, the openings 232 are positioned in vertical alignment to facilitate efficient fluid distribution within the bladder volume 222.

The first bladder assembly 212, and more particularly the baffles 226*a-b*, further include a first baffle seal 234*a-b*. The baffle seals 234*a-b* couple certain adjacent layers 214, 216, 218*a-d* to facilitate uniform expansion of the first bladder assembly 212 as the bladder volume 222 is selectively inflated with the fluid from the fluid source 111. As best shown in FIGS. 13 and 16, the baffle seals 234*a-b* are positioned near a distal edge of the flap 230 forming the baffle 226*a-b*. The baffle seals 234*a-b* are coupled to an adjacent one of the layers 214, 216, 218*a-d*. For example, the baffle seal 234*a* of FIG. 13 is coupled to an underside of the upper layer 214. As a result, the baffle seal 234*a* is visible in the top views of FIGS. 7-9. Likewise, the baffle seal 234*b* of FIG. 16 is coupled to an upper surface of the lower layer 216. In certain embodiments, the flap 230 may be folded upon itself such that the baffle 226*a-b* has dimensions approximate the opening 232, and it is appreciated from FIG. 11 that the baffles 226*a-b* are positioned in vertical alignment with the openings 232 (i.e., to baffle the fluid through the openings 222) to facilitate the aforementioned uniform expansion. In effect, as the bladder volume 222 receives fluid from the fluid source 111, the baffle seals 234*a-b* flatten the profile of expansion of the first bladder assembly 212. Moreover, as the fluid is removed from the bladder volume 222 (i.e., deflating the first bladder assembly 212), the baffle seals 234*a-b* effectively "pull down" a highest point of the first bladder assembly 212 to avoid the first bladder assembly 212 collapsing upon itself.

The first bladder assembly 212 is configured to eccentrically expand when receiving the fluid from the fluid source 111. In other words, the layers 214, 216, 218*a-d* cooperate to form a generally triangular or wedge shape when expanded, as shown in FIG. 21 (the second bladder assembly 312 is shown as expanded). Among other advantages, the eccentric expansion tilts or acutely angles the patient support surface 58 and the crib assembly 50. The eccentric expansion is facilitated by a first wedge seal 236 and a first crease seal 238 to be described in turn. With reference to FIGS. 7-9 and 11-16, the wedge seal 236 may extend through the plurality of layers 214, 216, 218*a-d*. More specifically, the wedge seal 236 couples together the upper layer 214, the interior layers 218*a-d*, and the lower layer 216. The wedge seal 236 is positioned adjacent to a side of the outer perimeter seal 220*a-c* and opposite the bladder volume 222, as best shown in FIGS. 7-9. The wedge seal 236 is configured to constrain the corresponding side of the bladder volume 222 to provide for a wedge shape of the first bladder assembly 212 when the bladder volume 222 is selectively inflated with the fluid from the fluid source 111. In other words, absent the presence of the wedge seal 236, the upper layer 214 would move generally upwardly with constraints provided by the outer and inner perimeter seals 220*a-c*, 224*a-b*. With the wedge seal 236 positioned on one side of the bladder volume 222 near the outer perimeter seals 220*a-c*, expansion of the bladder volume 222 on that side is significantly constrained by the wedge seal 236 with the resulting shape of the expanded bladder volume 222 being wedge-like in form.

The crease seal 238 may extend through the plurality of layers 214, 216, 218*a-d*. More specifically, the crease seal 238 couples together the upper layer 214, the interior layers 218*a-d*, and the lower layer 216. The crease seal 238 is positioned within the boundary defined by the outer perimeter seal 220*a-c*, as best shown in FIGS. 7-9. Among other functions in relation to an overlapping region to be described, the crease seal 238 is configured to limit a maximum height to which the first bladder assembly 212 may assume when the bladder volume 222 is selectively inflated with the fluid from the fluid source 111. In other words, absent the presence of the crease seal 238, the first bladder assembly 212 assumes the wedge shape constrained by the aforementioned wedge seal 236 and the outer and inner perimeter seals 220*a-c*, 224*a-b*. With the crease seal 238 positioned closer to the primary expanding side of the first bladder assembly 212 relative to the wedge seal 238, expansion of the bladder volume 222 on that side is further constrained by the wedge seal 238.

As mentioned, the patient turning device 202 includes the inlet ports 204, 304 configured to be arranged in fluid communication with the second conduit assembly 124. The inlet ports 204, 304 may include tubular-shaped elbows of one-half inch diameter and formed from a suitable material. One of the inlet ports 204 is coupled to the upper layer 214 with a fitment seal 240. Further, a vacuum release seal 242 prevents the layers 214, 216, 218*a-d* from "sticking" when the bladder volume 222 is devoid of fluid and under vacuum, ensuring the interior layer 218*a* does not become vacuum sealed to the upper layer 214 to close off the inlet port 204.

Figure 10:
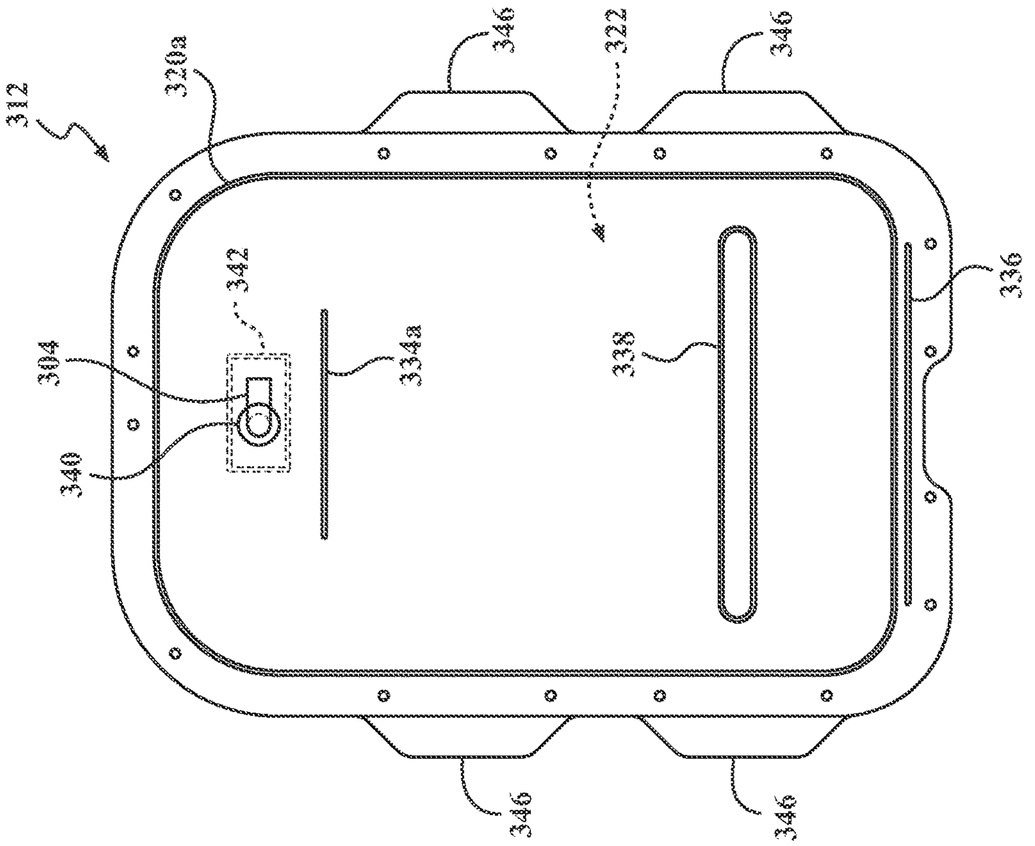
FIG. 10 is a top plan view of a second bladder assembly of the patient turning device.

The second bladder assembly 312 will now be described with reference to FIGS. 8, 10, 12 and 17-20. In many respects, it will be appreciated that the second bladder assembly 312 is similar in structure and function as the first bladder assembly 212, with like numerals plus one hundred (100) indicating like components. It is noted that any omitted description of the second bladder assembly 312 common to the first bladder assembly 212 is in the interest of brevity and should not be considered a feature absent from the second bladder assembly 312. FIGS. 8, 10 and 11 show top perspective and plan views of the second bladder assembly 312, and FIGS. 17-20 are bottom plan views of second interior layers of the second bladder assembly 312. Thus, when describing the construction of the second bladder assembly 312, certain welds disposed on undersides of the layers and visible in FIGS. 17-20 may not be visible in, for example, the exploded view of FIG. 12 showing the upper sides of the layers. The second bladder assembly 312 includes a second upper layer 314 opposite a second lower layer 316, and interior layers 318*a-d*. At least two of the plurality of layers 314, 316, 318*a-d* are coupled to one another with second outer perimeter seals 320*a-c* (see FIGS. 10, 18, 20) to define a second bladder volume 322 represented in phantom in FIG. 8. Further, at least two of the plurality of layers 314, 316, 318*a-d* are coupled to one another with second inner perimeter seals 324*a-b* (see FIGS. 17, 19) to further define the bladder volume 322.

Outer perimeter seal 320*a* couples together the upper layer 314 and interior layer 318*a* (see FIG. 10 in conjunction with FIG. 12). Another outer perimeter seal 320*b* couples together interior layer 318*b* and interior layer 318*c* (see FIG. 18 in conjunction with FIG. 12). Still another outer perimeter seal 320*c* couples together interior layer 318*d* and the lower layer 316 (see FIG. 20 in conjunction with FIG. 12). An inner perimeter seal 324*a* couples together interior layer 318*a* and interior layer 318*b*. Another inner perimeter seal 324*b* couples together interior layer 318*c* and interior layer 318*d*. In other words, the inner perimeter seals 324*a-b* couple together adjacent pairs of layers of the second bladder assembly 312 not coupled together with the outer perimeter seals 320*a-c*. As generally appreciated from FIGS. 17-20, the inner perimeter seals 324*a-b* define a smaller perimeter relative to the outer perimeter seals 320*a-c* such that one or more sides of the second bladder assembly 312 is concertinaed or accordion-like in appearance and function.

Figure 17:
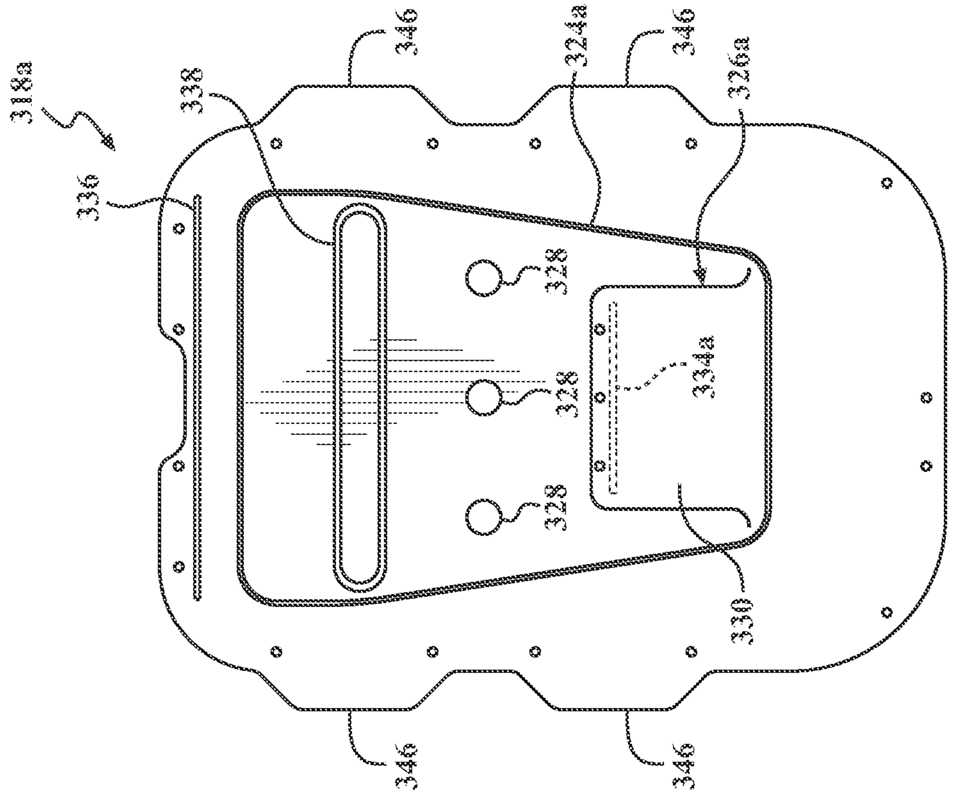
FIG. 17 is a top plan view of an interior layer of the plurality of layers of FIG. 12.
Figure 20:
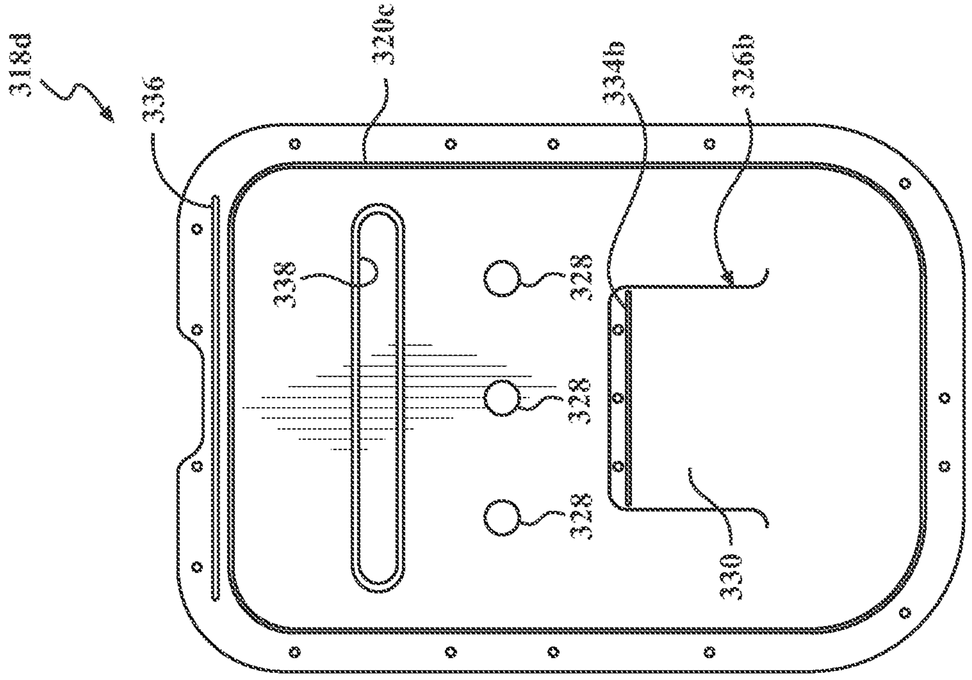
FIG. 20 is a top plan view of another interior layer of the plurality of layers of FIG. 12.
Figure 19:
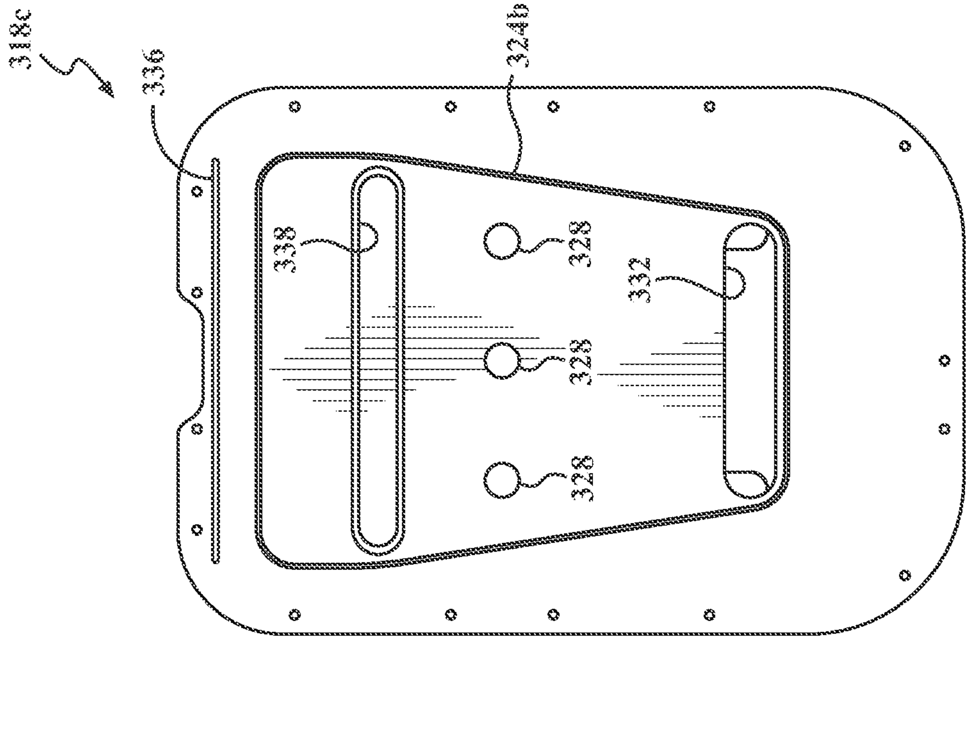
FIG. 19 is a top plan view of another interior layer of the plurality of layers of FIG. 12.

Within the boundaries defined by the outer and inner perimeter seals 320*a-c*, 324*a-b*, the spaces between each of the plurality of layers 314, 316, 318*a-d* are in fluid communication with one another to define the bladder volume 322. In particular, each of the interior layers 318*a-d* includes apertures 328 extending through the interior layers 318*a-d* to provide the fluid communication and positioned to efficiently distribute the fluid within the bladder volume 322 for substantially uniform expansion of the second bladder assembly 312. Fluid communication between certain layers of the bladder assembly 312 is further provided with second baffles 326*a-b*. FIGS. 12, 17 and 20 show the interior layers 318*a*, 318*d* including the baffles 326*a-b*, for example, including a flap of material 330 of the respective layer 318*a-d* defined by a cutout in the respective layer. One of the baffles 326*a* further provides fluid communication between the space between the upper layer 314 and the interior layer 318*a*, and the space between the interior layer 318*a* and the interior layer 318*b*, and, another one of the baffles 326*b* further provides fluid communication between the space between the interior layer 318*c* and the interior layer 318*d*, and the space between the interior layer 318*d* and the lower layer 316. Openings 332 may be positioned in vertical alignment to facilitate efficient fluid distribution within the bladder volume 322 between interior layers 318*b*, 318*c*, 318*d*.

The second bladder assembly 312, and more particularly the baffles 326*a-b*, further include a second baffle seal 334*a-b*. The baffle seals 334*a-b* couple an adjacent pair of the layers 314, 316, 318*a-d* to facilitate uniform expansion of the second bladder assembly 312 as the bladder volume 322 is selectively inflated with the fluid from the fluid source 111. The baffle seal 334*a* of FIG. 17 is coupled to an underside of the upper layer 314, and the baffle seal 334*b* of FIG. 10 is coupled to the lower layer 316. It is appreciated from FIG. 12 that the baffles 326*a-b* are positioned in vertical alignment with the openings 332 to facilitate the aforementioned uniform expansion. In effect, as the bladder volume 322 receives fluid from the fluid source 111, the baffle seals 334*a-b* facilitate flattening the profile of expansion of the second bladder assembly 312. Moreover, as the fluid is removed from the bladder volume 322 (i.e., deflating the second bladder assembly 312), the baffle seals 334*a-b* coupling adjacent layers 314, 316, 318*a-d* effectively "pull down" a highest point of the second bladder assembly 312 to avoid the second bladder assembly 312 collapsing upon itself.

The second bladder assembly 312 is configured to eccentrically expand when receiving the fluid from the fluid source 111 to form a generally triangular or wedge shape when expanded, as shown in FIG. 21. The eccentric expansion is facilitated by a second wedge seal 336 and a second crease seal 338. With reference to FIGS. 8, 10 and 17-20, the wedge seal 336 couples together the upper layer 314, the interior layers 318*a-d*, and the lower layer 316. The wedge seal 336 is positioned adjacent to a side of the outer perimeter seal 320*a-c* and opposite the bladder volume 322, as best shown in FIGS. 8 and 10. The wedge seal 336 is configured to constrain the corresponding side of the bladder volume 322 to provide for a wedge shape of the second bladder assembly 312 when the bladder volume 322 is selectively inflated with the fluid from the fluid source 111. Similarly, the crease seal 338 couples together the upper layer 314, the interior layers 318*a-d*, and the lower layer 316. The crease seal 338 is positioned within the boundary defined by the outer perimeter seal 320*a-c*, as best shown in FIGS. 8 and 10. The crease seal 338 is configured to limit a maximum height to which the second bladder assembly 312 may assume when the bladder volume 322 is selectively inflated with the fluid from the fluid source 111.

The inlet port 302 is coupled to the upper layer 314 with a fitment seal 340. Further, a vacuum release seal 342 prevents the layers 314, 316, 318*a-d* from "sticking" when the bladder volume 322 is devoid of fluid and under vacuum, ensuring the interior layer 318*a* does not become vacuum sealed to the upper layer 314 to close off the inlet port 304.

Referring to FIGS. 7 and 8, it is appreciated that at least a portion of the first lower layer 216 of the first bladder assembly 212 is positioned to overlap at least a portion of the second upper layer 314 of the second bladder assembly 312 to define a first overlapping region (OR1) and a second overlapping region (OR2). In other words, the first and second bladder assemblies 212, 312 may be at least partially stacked on top of one another to define the first and second overlapping regions. More specifically, it is appreciated that at least a portion of the first lower layer 216 of the first bladder assembly 212 is positioned to overlap at least a portion of the second upper layer 314 of the second bladder assembly 312 (see FIG. 7) to define the first overlapping region. FIG. 7 shows in phantom at least a portion of the outer periphery of the second bladder assembly 312 with the first bladder assembly 212 positioned above or atop of the second bladder assembly 312. A position of the crease seal 338 of the second bladder assembly 312 is also shown in phantom to illustrate relative positioning of certain structures.

The first and second bladder assemblies 212, 312 may be coupled to one another. Each of the first and second bladder assemblies 212, 312 may include complementary coupling features 246, 346 configured to couple the first and second bladder assemblies 212, 312 to one another. FIGS. 11 and 16 show the coupling features 246 of the first bladder assembly 212 including tabs or flaps extending outwardly from a periphery of the interior layer 218*d*. FIGS. 12 and 17 show the coupling features 346 of the second bladder assembly 312 including tabs or flaps extending outwardly from a periphery of the interior layer 318*a*. The coupling features 246, 346 are complementarily positioned about the respective layers so as to be coupled with a seal, as shown in FIG. 7, outwardly of the outer peripheries of the first and second bladder volumes 222, 322. In such an arrangement, the first lower layer 216 may be positioned atop and in direct contact with the second upper layer 314 to define the first and second overlapping regions. The coupling features 246, 346 being coupled to one another outward of the outer peripheries of the first and second bladder volumes 222, 322 permit unimpeded expansion of the first and second bladder volumes 222, 322 while preventing relative movement of the first and second bladder assemblies 212, 312.

With continued reference to FIG. 7, the first overlapping region (OR1) may include an entirety of the second bladder assembly 312 positioned beneath at least a portion of the first bladder assembly 212. At least a portion of the first upper layer 214 extends beyond the periphery of the second bladder assembly 312 to define a coupling region 250. An opening 244 may extend through the upper layer 214 of the first bladder assembly 212 with the opening 244 positioned within the coupling region 250. The second inlet port 304 may extend through the opening 244 (see also FIG. 8). The arrangement of the second inlet port 304 of the second bladder assembly 312 extending through the opening 244 of the first bladder assembly 212 provides for, among other advantages, a compact design with the first and second bladder assemblies 212, 312 overlapping in a manner that optimizes moving the patient support surface 58 in a desired fashion when one or both of the first and second bladder volumes 222, 322 are selectively inflated with the fluid from the fluid source 111. Moreover, the stacked arrangement of the first and second bladder assemblies 212, 312 results in the outer perimeter seals 220*a-c*, 320*a-c*, the inner perimeter seals 224*a-b*, 324*a-b*, and the baffle seals 234*a-b*, 334*a-b* being positioned within the first overlapping region of the patient turning device 202.

The second overlapping region (OR2) may be defined between the first crease seal 238 and the second crease seal 338, and more particularly the horizontal region between the first crease seal 238 and a vertical projection of the second crease seal 338, as shown in FIG. 7. The second overlapping region may include a portion of the first overlapping region. As previously described in detail, the first wedge and crease seals 236, 238 cooperate to impart a generally wedge shape to the first bladder assembly 212 when the first bladder volume 222 is inflated with the fluid from the fluid source 111. In the plan view of FIG. 7, inflating the first bladder volume 222 moves the left side of the first bladder assembly 212 upwardly (i.e., out of the paper) with the area to the right of the first crease seal 238 remaining substantially flat. Likewise, the second wedge and crease seals 336, 338 cooperate to impart a generally wedge shape to the second bladder assembly 312 when the second bladder volume 322 is inflated with the fluid from the fluid source 111. In the plan view of FIG. 7, inflating the second bladder volume 322 moves the right side of the second bladder assembly 312 upwardly (i.e., out of the paper) with the area to the left of the second crease seal 338 remaining substantially flat and uninflated. Taken together, the second overlapping region moves upwardly (i.e., out of the paper) with inflation of one or both of the first and second bladder assemblies 212, 312. Further, owing to the wedge-shaped nature of the first and second bladder assemblies 212, 312 defining the second overlapping region, the first and second bladder assemblies 212, 312 may be selectively inflated to provide a desired contour to the patient support surface 58 of the patient support apparatus 30. For example, both of the first and second bladder assemblies 212, 312 may be selectively inflated to move the patient support surface 58 and the crib assembly 50 upwardly relative to the patient support deck 38 while remaining substantially horizontal. For another example, should movement therapy be desired where the patient is partially turned to one side or side to side, one or both of the first and second bladder assemblies 212, 312 could be selectively inflated to move a respective portion the patient support surface 58 and the crib assembly 50 upwardly relative to the patient support deck 38. In doing so, the second overlapping region may provide a gradual inclination and adequate support for the weight of the patient across a width of the patient support surface 58, a benefit over known systems with two bladders in a side-by-side configuration that results in localized areas of inadequate support.

Figure 24:
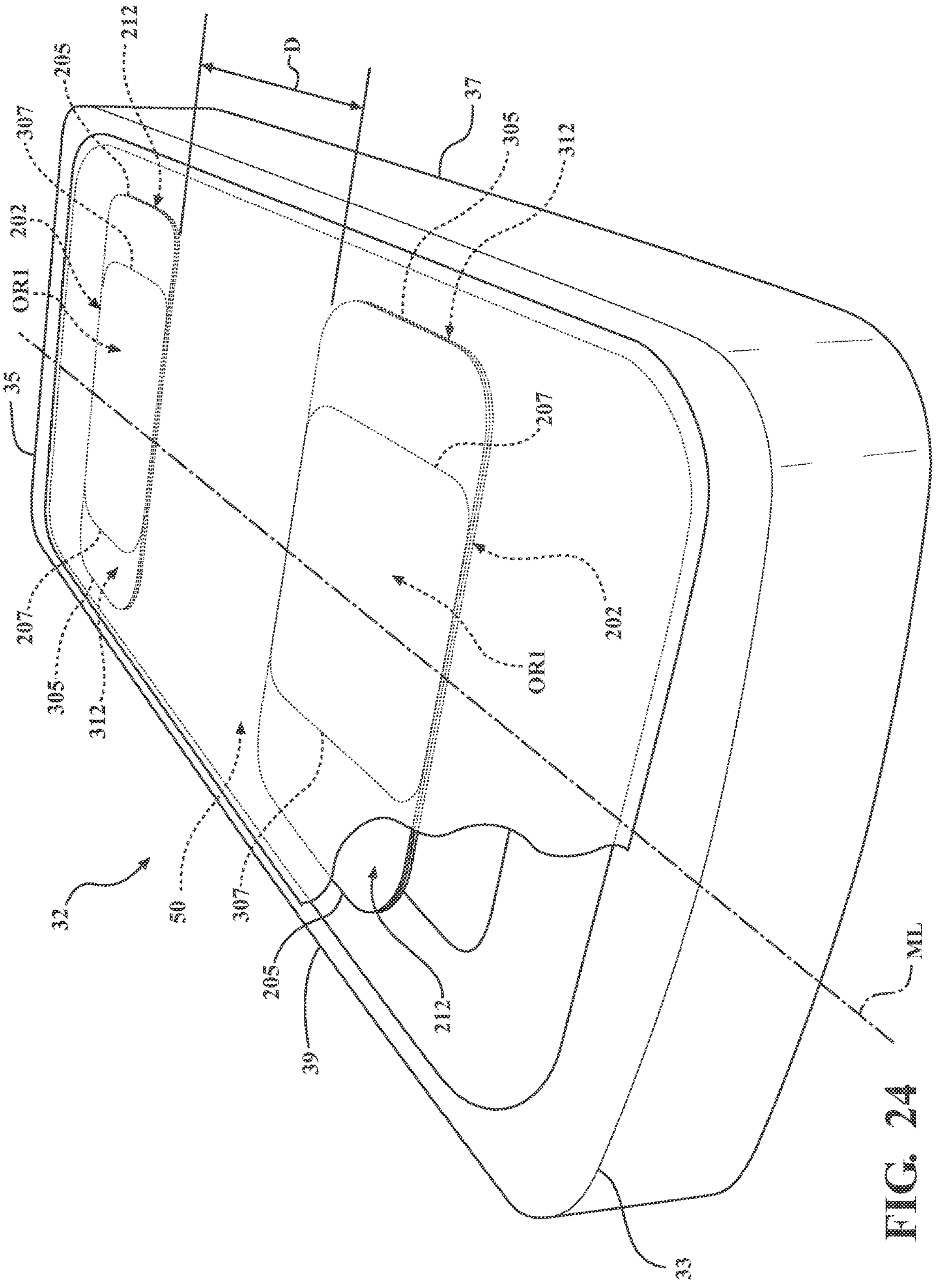
FIG. 24 is a bottom perspective view of the patient support with a schematic representation of the patient turning devices positioned relative to a midline between opposing widthwise sides of the patient support.

The aforementioned benefit may also be realized, in certain embodiments, with the portions of the first bladder assembly 212 and the second bladder assembly 312 positioned on each side of a midline (ML) extending longitudinally along the crib assembly 50. FIG. 24 shows a schematic representation of an underside of the patient support 32 including the crib assembly 50 to be positioned on the patient support deck 38 of the patient support apparatus 30 (see FIG. 1). The crib assembly 50 includes the opposing widthwise sides 37, 39 extending between the head end 33 and the foot end 35 (see also FIG. 3). The midline (ML) is between the opposing widthwise sides 37, 39, for example to approximately bifurcate the crib assembly 50 into two lengthwise halves. As previously explained, the patient turning device 202 positioned between the crib assembly 50 and the bottom cover assembly 56. The first bladder assembly 212 of the patient turning device 202 includes opposing widthwise sides 205, 207 positioned opposite the midline (ML) such that a portion of the first bladder volume 222 is disposed on each side of the midline (ML). Likewise, the second bladder assembly 312 of the patient turning device 202 includes opposing widthwise sides 305, 307 positioned opposite the midline (ML) such that a portion of the second bladder volume 322 is disposed on each side of the midline (ML). In the illustrated embodiment of FIG. 24, the portions of the first and second bladder volumes 222, 322 on each side of the midline (ML) define the first overlapping region (OR1), as previously described (see FIG. 7). The midline (ML) may bifurcate the first overlapping region (OR1) as shown. It is also contemplated, as shown in FIG. 24, that the opposing widthwise sides 205, 207, 305, 307 of each of the first and second bladder assemblies 212, 312 are spaced apart from the opposing widthwise sides 37, 39 of the crib assembly 50. In certain variants, the first and second bladder volumes 222, 322 need not overlap (e.g., positioned adjacent along the length of the crib assembly 50). Selectively inflating the first and second bladder volumes 222, 322 with the portions on each side of the midline (ML) facilitates providing the gradual inclination and adequate support for the weight of the patient across a width of the patient support surface 58.

Figure 30:
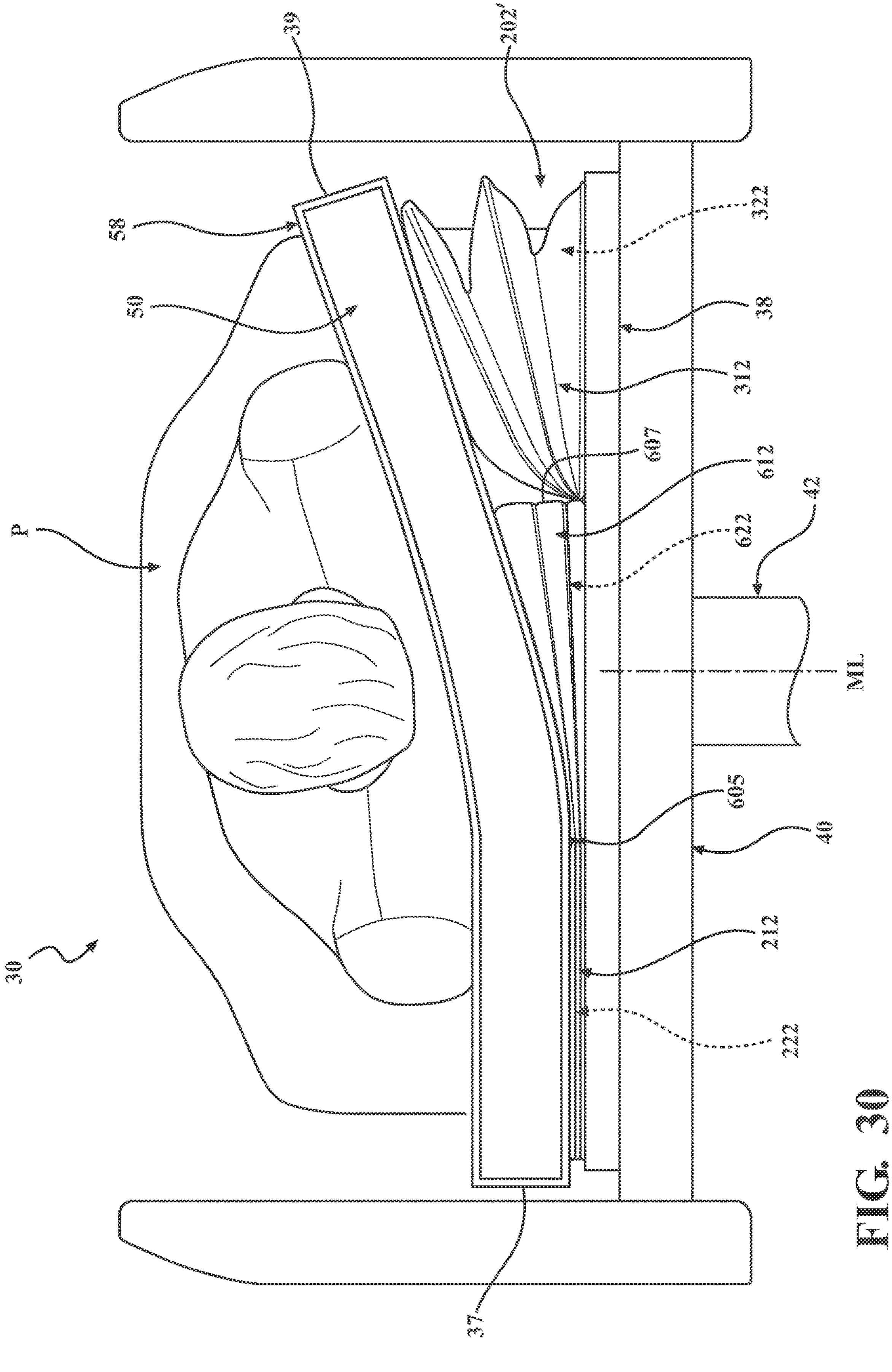
FIG. 30 is an elevation view of a portion of the patient support apparatus including a patient turning system in accordance with another exemplary embodiment of the present disclosure.

In one alternative embodiment illustrated in FIG. 30, the first bladder assembly 212 and the second bladder assembly 312 are positioned opposite the midline (ML) extending longitudinally along the crib assembly 50 between the opposing widthwise sides 37, 39. The first and second bladder assemblies 212, 312 may be positioned between the crib assembly 50 and the patient support deck 38 of the patient support apparatus 30. The patient turning device 202' further includes a third bladder assembly 612 positioned intermediate the first and second bladder assemblies 212, 312. As shown in FIG. 30, the third bladder assembly 612 is positioned between the first and second bladder assemblies 212, 312 in a generally side-by-side configuration. The third bladder assembly 612 includes comprising opposing widthwise sides 605, 607 positioned opposite the midline (ML) such that a portion of the third bladder assembly 612 is disposed on each side of the midline (ML). The third bladder assembly 612 defines at least one third bladder volume 622. In other words, the third bladder assembly 612 may include one bladder volume 622, as shown in the illustrated embodiment, or a plurality of bladder volumes (e.g., more than fluidly separate chambers) forming the third bladder assembly 612. The third bladder volume(s) 622 are configured to be arranged in fluid communication with the fluid source 111 for selectively receiving fluid from the fluid source 111 (see FIG. 23). Operation of the patient turning system 200 to selectively inflate the third bladder volume(s) 622 may be independent or related to the selective inflation of the first and/or second bladder volumes 222, 322.

In operation, the third bladder assembly 612 and a singular one of the first and second bladder assemblies 212, 312 concurrently receive the fluid from the fluid source 111 to move portions of the crib assembly 50 on each side of said midline (ML) away from the patient support deck 38. In the illustrated embodiment of FIG. 30, one of the portions on one side of the midline (ML) is moved by said third bladder assembly 612 by a lesser magnitude than another one of said portions opposite the midline (ML). The result includes providing the gradual inclination to the patient support surface 58 across the width of the patient support surface 58.

Figure 22:
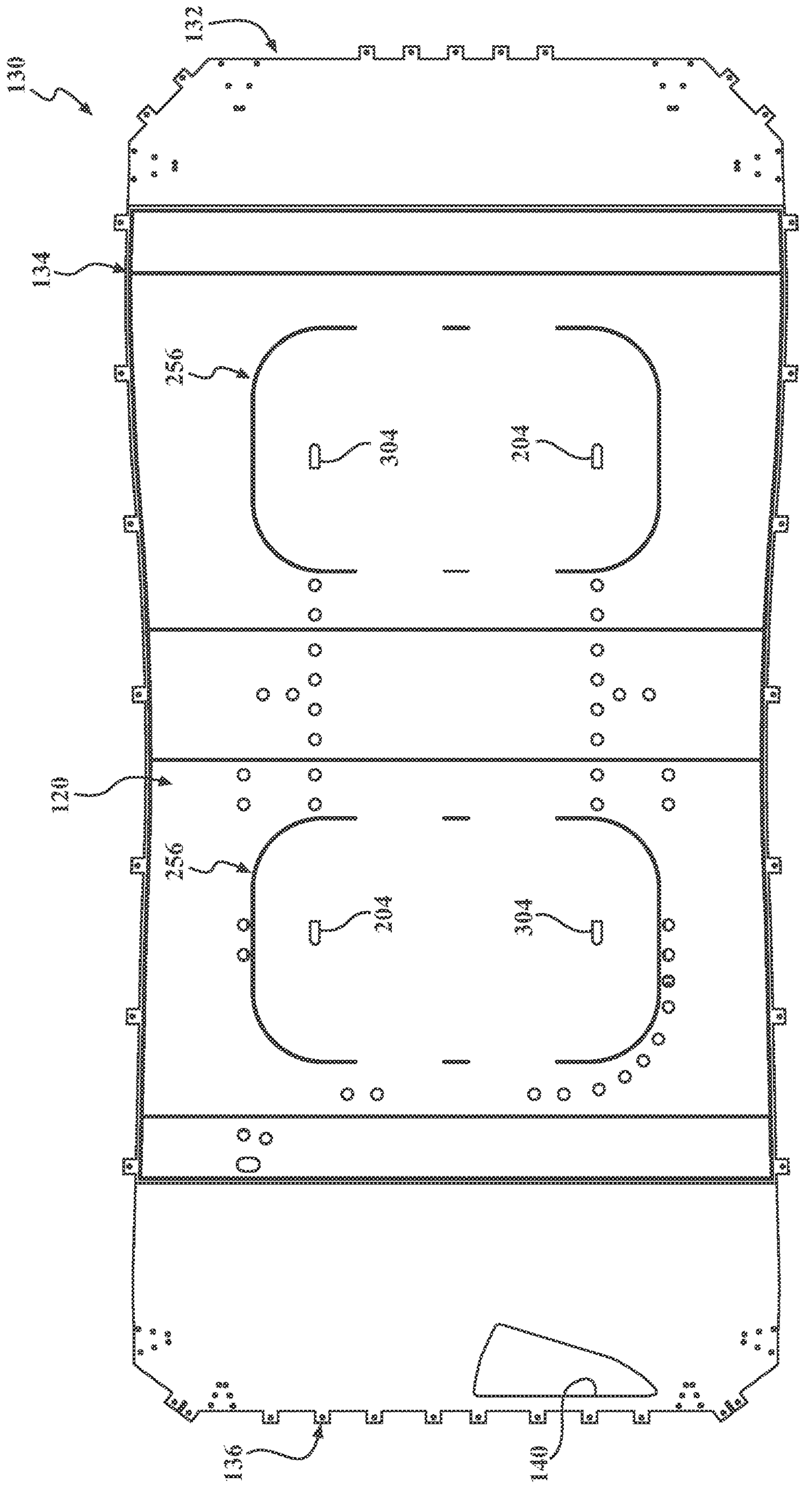
FIG. 22 is a top plan view of a carrier sheet and a bottom cover with the patient turning devices disposed therebetween.

Returning to FIG. 8, the first upper layer 214 may be coupled to a collar 252 at an edge seal 254. The collar 252 of the illustrated embodiment is ring-shaped and defines an opening sized approximate to the periphery of the first bladder assembly 212. The edge seal 254 couples the collar 252 to an underside of the first upper layer 214 such that an outer boundary of the collar 252 extends beyond the first bladder assembly 212. The collar 252 is adapted to be coupled to the carrier sheet 120, best shown in FIGS. 6 and 22. As previously described with reference to FIG. 6, the patient turning device 202 is coupled to an underside of the carrier sheet 120 and positioned between the carrier sheet 120 and the bottom cover 130. FIG. 22 shows a top plan view of the carrier sheet 120 and the bottom cover 130 with the patient turning devices 202 positioned therebetween. In particular, the first and second inlet ports 204, 304 of each of the patient turning devices 202 are shown extending through the apertures 154 (see FIG. 6) of the carrier sheet 120. FIG. 22 further shows a carrier seal 256 coupling the patient turning devices 202 to the carrier sheet 120, and more particularly, coupling the collar 252 (see FIG. 8) to the underside of the carrier sheet 120.

Figure 23:
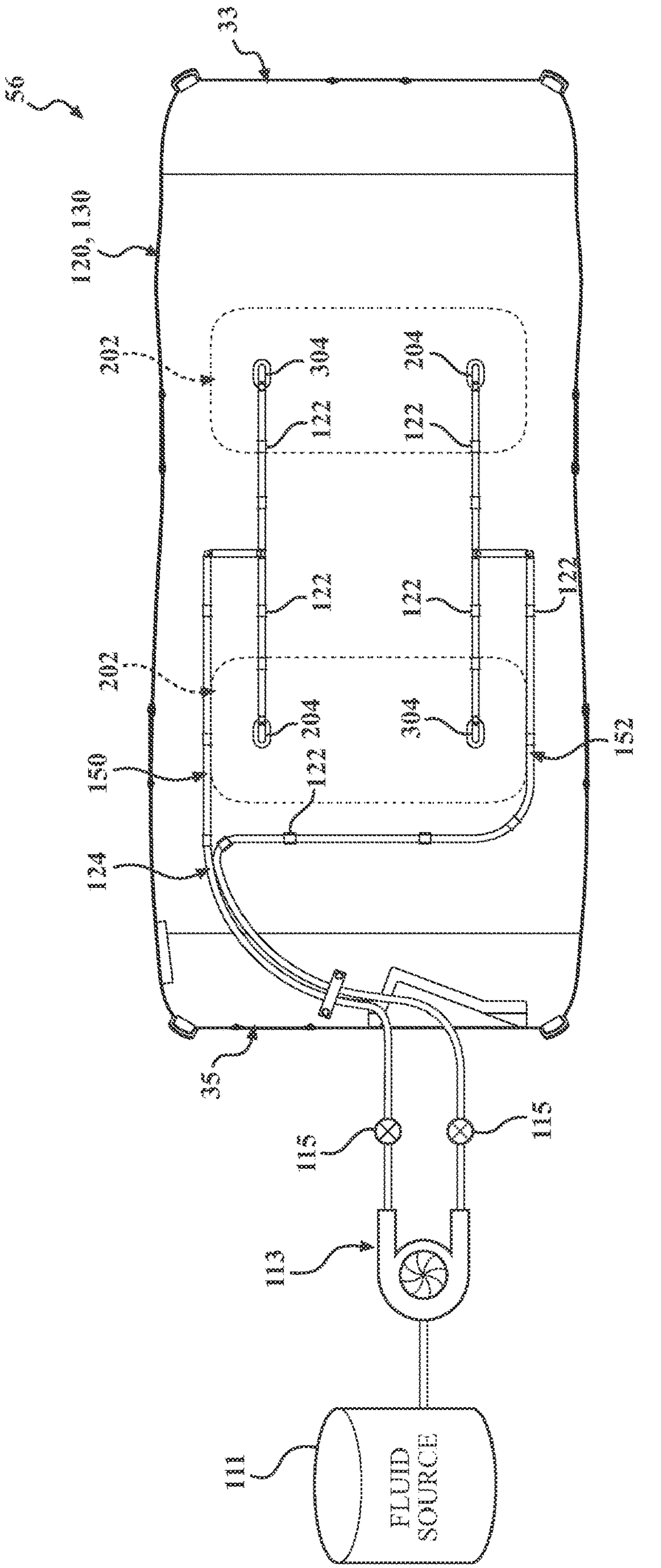
FIG. 23 is a top plan view of a bottom cover assembly including the carrier sheet, the bottom cover, and the patient turning devices with a conduit assembly coupled to the patient turning devices.

With further reference to FIG. 23, the second conduit assembly 124 is shown coupled to the first and second inlet ports 204, 304 of each of the patient turning devices 202. The second conduit assembly 124 may include at least two lines 150, 152 extending from the port connector 142 (see FIG. 6) to the first and second inlet ports 204, 304 of each of the patient turning devices 202. The lines 150, 152 may be secured to the carrier sheet 120 with the aforementioned couplers 152. Each of the lines 150, 152 may be bifurcated into segments with each of the segments being coupled to a respective one of the first and second inlet ports 204, 304. The lines 150, 152 may be coupled to a pump 113 and/or valves 115 in communication with the fluid source 111. The pump 113 is configured to direct the fluid from the fluid source 111 through the lines 150, 152 and into one or both of the patient turning devices 202. As a result, should the fluid from the fluid source 111 be directed down a first of the lines 150, the fluid inflates the first bladder volume 222 of one of the patient turning devices 202, and the second bladder volume 322 of the other one of the patient turning devices 202. Such an arrangement moves a right portion (relative to the head end 33 and the foot end 35) of the patient support surface 58 and the crib assembly 50 away from the patient support deck 38, thereby turning the patient to the left. Likewise, should the fluid from the fluid source 111 be directed down a second of the lines 152, the fluid inflates the first bladder volume 222 of one of the patient turning devices 202, and the second bladder volume 322 of the other one of the patient turning devices 202. Such an arrangement moves a left portion of the patient support surface 58 and the crib assembly 50 away from the patient support deck 38, thereby turning the patient to the right. It is further contemplated the second conduit assembly 124 may include more than two of the lines 150, 152 with each of the first and second inlet ports 204, 304 of each of the patient turning devices 202 receiving a dedicated line. Additionally or alternatively, one or more additional valves may be provided and configured to control the fluid of the fluid into each of the first and second inlet ports 204, 304 of each of the patient turning devices 202. As a result, fluid being directed to each of the first and second bladder volumes 222, 322 may be independent and selectively controlled. For example, the patient turning devices 202 near the head end 33 may be selectively expanded while the other patient turning device 202 near the foot end 35 remains unexpanded. For another example, one of the first and second bladder volumes 222, 322 from the patient turning devices 202 near the head end 33 may be selectively expanded while both the other bladder volume as well as the patient turning device 202 near the foot end 35 remain unexpanded. In certain embodiments, the patient turning devices 202 may be arranged in a same lateral direction (i.e., the first bladder volume 222 and the second bladder volumes 322 of each of the patient turning devices 202 may be positioned on same lateral sides) such that the first bladder volumes 222 are inflated to turn the patient in a first direction and the second bladder volumes 322 are inflated to turn the patient in a first direction opposite the first direction.

As mentioned, the patient turning device 202 is coupled to an underside of the carrier sheet 120 and positioned between the carrier sheet 120 and the bottom cover 130. Yet FIG. 6 shows the bottom cover 130 coupled to the carrier sheet 120, for example, at or near the opposing sides 128, 146 of each of the carrier sheet 120 and the bottom cover 130. It readily follows that the expansion of the patient turning devices 202 must be accommodated to prevent "hammocking" of the patient support surface 58, as mentioned. In other words, expansion of the patient turning devices 202 alters a thickness of the cover assembly 52 that may be substantially encasing the patient support 32. The aforementioned augmenting features 148 may include the opposing sides 146 of the bottom cover 130 to be at least partially formed from Neoprene and/or other suitably elastic or semi-elastic material(s). The augmenting feature 148 is configured to assume an expanded state when the augmenting feature 148 is in the deployed configuration, and a natural state when the augmenting feature 148 is in the stored configuration. The deployed configuration of the augmenting feature 148 is associated with expansion of the patient turning device 202, and the stored configuration of the augmenting feature 148 is associated with the patient turning device 202 being unexpanded. The augmenting feature 148 provides slack as the patient turning device(s) 202 are expanded, and returns to the natural state and provides for compact design and efficient design of the cover assembly 52. In alternative embodiments, the augmenting feature may include accordion-like, bellows-like, or concertinaed material, a fold of material, a resilient member (e.g., an inverted leaf spring), a securing member, among other features, including those disclosed in U.S. Provisional Application No. 62/611,215, filed on Dec. 28, 2017, the entire contents of which are hereby incorporated by reference.

Figure 25:
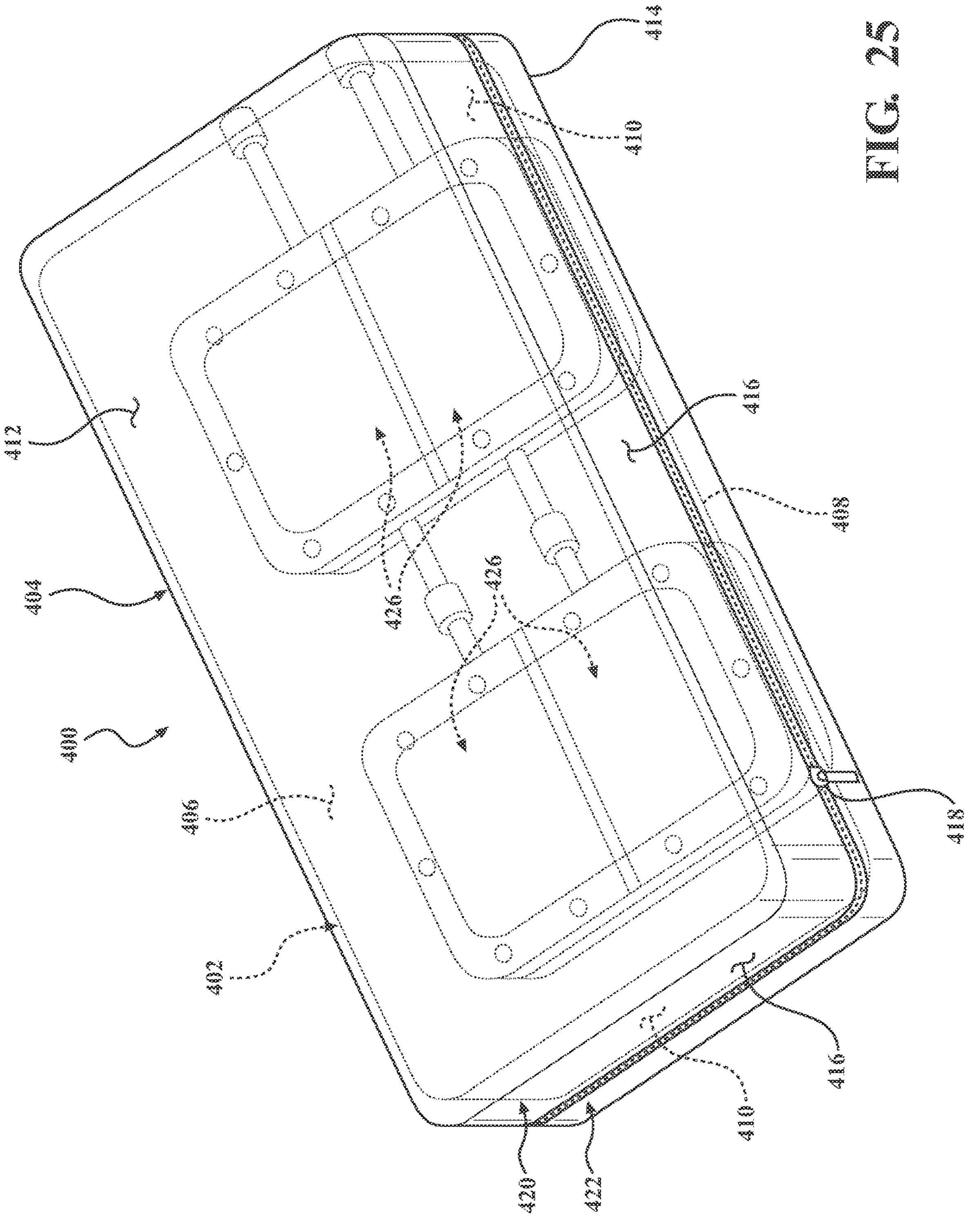
FIG. 25 is a perspective view of a patient turning system in accordance with another exemplary embodiment of the present disclosure with the patient turning system positioned within a cover assembly coupled to a crib assembly.
Figure 26:
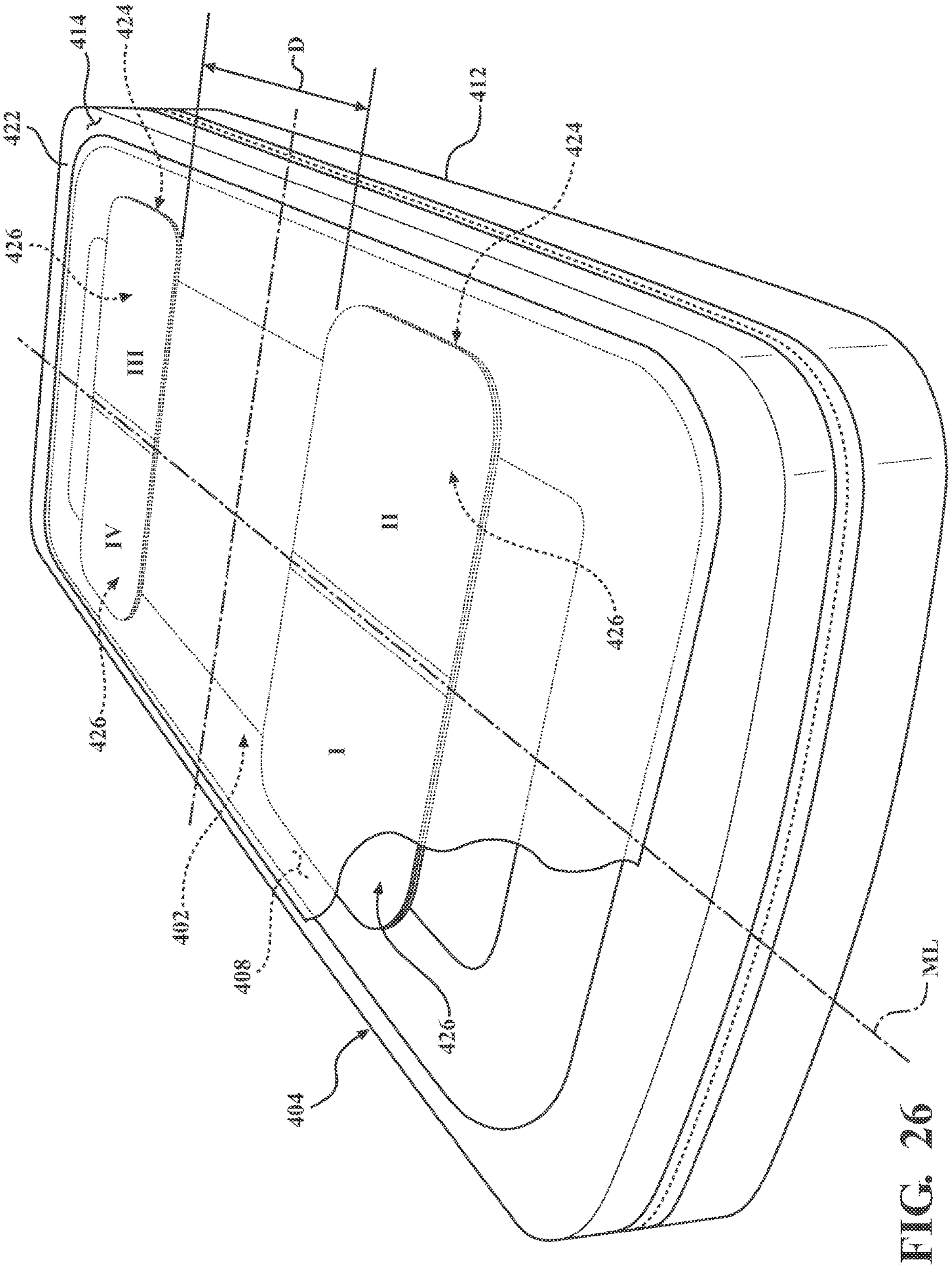
FIG. 26 is a bottom perspective view of the patient turning system of FIG. 25 with a schematic representation of the patient turning devices positioned relative to a midline between opposing widthwise sides of the patient support.

Referring now to FIGS. 25-28, a patient support having a patient turning system 400 in accordance with another exemplary embodiment is illustrated. The patient support may include a crib assembly 402 coupled to or supported on the patient support deck 38 of the patient support apparatus 30. FIGS. 25 and 26 show the crib assembly 402 (in phantom) within a cover assembly 404 to be described. The crib assembly 402 and the cover assembly 404 may be similar to or the same as the crib assembly 50 and cover assembly 52, respectively, of the previously described embodiment. Referring to FIG. 25, the crib assembly 402 includes an upper surface 406 and a lower surface 408 opposite the upper surface 406. The upper surface 406 is sized to support the patient during the movement therapy. The crib assembly 402 includes sides 410 that may extend between the upper and lower surfaces 406, 408. A patient support portion 412 supporting the patient P may be defined by either the cover assembly 404 or the crib assembly 402. As illustrated, the cover assembly 404 may be coupled to the crib assembly 402 with the patient support portion 412 defined by the cover assembly 404. Alternatively, in embodiments without a cover assembly, the patient support portion 412 is the upper surface 406 of the crib assembly 402. In such an embodiment, the patient P is supported by and in contact with the upper surface 406 of the crib assembly 402.

The cover assembly 404 is coupled to the crib assembly 402 with the patient support portion 412 covering the upper surface 406 of the crib assembly 402. The cover assembly 404 includes the patient support portion 412 sized so that a majority of the patient is supported on the patient support portion 412. Thus, absent bedding and the like, the patient P is supported by and in contact with the patient support portion 412 of the cover assembly 404. In certain embodiments, the cover assembly 404 may be coupled to the crib assembly 402 so as to substantially encase the crib assembly 402. In particular, the patient support portion 412 covers the upper surface 406 of the crib assembly 402, and a lower portion 414 of the cover assembly 404 coupled to the patient support portion 412 covers the lower surface 408 of the crib assembly 402. Peripheral portions 416 extending between the patient support portion 412 and the lower portion 414 may be positioned adjacent to and/or adapted to cover the sides 410 of the crib assembly 402. With the patient support portion 412, the lower portion 414, and the peripheral portions 416 covering the respective surfaces 406, 408 and sides 410 of the crib assembly 402, the cover assembly 404 of FIG. 25 substantially encases the crib assembly 402.

In certain embodiments, the cover assembly 404 includes a fastening device 418 coupling upper and lower sections 420, 422 of the cover assembly 404 such that the cover assembly 404 is removably coupled to the crib assembly 402. FIG. 25 shows the fastening device 418 including a zipper extending about at least a portion of the peripheral portions 416 of the cover assembly 404. Other fastening devices may include snaps, clips, tethers, hook and eye connections, adhesive, and the like. In other exemplary embodiments, the patient support portion 412, the lower portion 414, and/or the peripheral portions 416 may be integrally formed to provide the cover assembly 404 of unitary structure that is not removable from the crib assembly 402.

With continued reference to FIGS. 25-28, the patient turning system 400 includes at least one patient turning device 424 positioned external to the crib assembly 402 and below the lower surface 408 of the crib assembly 402. The bladder assemblies 426 are in fluid communication with a fluid source 111 (see FIGS. 23 and 29). The bladder assemblies 426 are selectively inflated with fluid from the fluid source 111 to move at least a portion of the crib assembly 402 away from the patient support deck 38 to provide the movement therapy. The fluid from the fluid source 111 may be a liquid, such as water, a gas, such as air, or other fluids. Alternatively, it is contemplated that mechanical and/or electromechanical means may be provided in order to effectuate the movement of the crib assembly 402 away from the patient support deck 38. For example, actuators (e.g., rotary actuators, linear actuators, springs, coils, and the like) may be positioned intermediate the lower surface 408 of the crib assembly 402 and the patient support deck 38 and operated by a controller to provide the movement therapy. For another example, components comprised of shape memory material (s) (e.g., Nitinol) may be coupled to the crib assembly 402 in a suitable manner. The shape memory material provides for a change in shape in response to application or removal of forced applied to the components with the change in shape resulting in corresponding movement of the crib assembly 402 away from the patient support deck 38 to provide the movement therapy.

Because the bladder assemblies 426 are positioned external to the crib assembly 402 and below the lower surface 408 of the crib assembly 402, patient supports of conventional shape and size may easily be retrofit to include the patient turning system 400 for performing patient turning operations. In other words, the patient turning system 400 may include the cover assembly 404 with the bladder assemblies 426 (without a crib assembly), after which a crib assembly with a size and shape corresponding to the cover assembly 404 can be easily installed. Furthermore, because the bladder assemblies 426 are positioned beneath and external to the crib assembly 402 and with the cover assembly 404 including an augmenting feature 428 to be described, the patient turning system 400 advantageously prevents "hammocking" of the patient support portion 412 during the movement therapy (i.e., localized alteration or stretching of the patient support portion 412 to a generally concave or arcuate contour that results in localized pressure points).

A portion of the crib assembly 402 moved away from the patient support deck 38 in response to inflation of the bladder assemblies 426' may include a right half or a left half of the crib assembly 402. The movement therapy may also be defined by inflation of more than one of the bladder assemblies 426 such that more than one portion of the upper surface 406 of the crib assembly 402 is moved or positioned away from the patient support deck 38 at the same instant. More specifically, more than one portion of the upper surface 406 of the crib assembly 402 moves away from the patient support deck 38 with one portion to a greater extent than another portion. The upper surface 406 assumes a generally U-shaped or V-shaped configuration. For example, one of the bladder assemblies 426' inflated with the right portion of the upper surface 406 moved away from the patient support deck 38, the other bladder assembly 426 may be inflated to a greater or lesser extent than the inflated one of the bladder assemblies 426'. With the weight of the patient P generally centered along the width of the upper surface 406, the upper surface 406 proximate the sides 410 of the crib assembly 402 are moved away from the patient support deck 38 to assume a generally U-shaped or V-shaped configuration.

The movement therapy may be further defined by deflating the inflated one or more of the bladder assemblies 426' through release of the fluid by, for example, a vacuum or an actuated valve permitting the fluid to escape due to compression on the bladder assemblies 426 by the weight of the crib assembly 402 and the patient P supported thereon. As the bladder assemblies 426 are deflated, the elevated portion of the upper surface 406 of the crib assembly 402 moves towards the patient support deck 38. The downward movement of the crib assembly 402 tilts, turns, or otherwise moves the patient P in a corresponding manner, in particular towards a generally horizontal position.

Before, during, or after the deflation of the inflated one or more of the bladder assemblies 426', an uninflated one or more of the bladder assemblies 426 may be inflated with fluid from the fluid source 111. The concurrent or sequential inflation and/or deflation of the bladder assemblies 426 may be performed in a coordinated manner based on the needs of the application. The iterative and alternative inflation of the bladder assemblies 426 upwardly moving the right and left portions of the crib assembly 402 may be performed at fixed or varied intervals for any suitable period of time to achieve the desired clinical results. The concurrent or sequential inflation may be repeated as many iterations as desired to provide the movement therapy. Other manners of concurrently or sequentially inflating the bladder assemblies 426 are considered within the scope of the present disclosure.

In the exemplary embodiment of FIGS. 25 and 26 where the cover assembly 404 is removably coupled to the crib assembly 402, the cover assembly 404 may include the upper section 420 defining the patient support portion 412 and covering the upper surface 406 of the crib assembly 402, and the lower section 422 defining the lower portion 414 and covering the lower surface 408 of the crib assembly 402. Each of the upper and lower sections 420, 422 may be removably coupled to one another with the fastening device 418 to substantially encase the crib assembly 402 in the manner previously described. The upper and lower sections 420, 422 cooperate to define the peripheral portions 416 when coupled to one another. The lower section 422 of the cover assembly 404 may include one or more openings defined within the lower portion 414 corresponding to the positioning of the bladder assemblies 426 beneath the lower portion 414. The cover assembly 404 includes a bottom portion 434 (see FIG. 28) coupled to the lower portion 414 of the lower section 422. In certain embodiments, the bottom portion 434 may be considered the surface of the patient turning system 400 that is situated on the patient support deck 38 (or other stationary structure on which the system is disposed). The lower portion 414 is movable relative to the bottom portion 434 in manners to be described. The bladder assemblies 426 may be coupled to the lower section 422, and more particularly, to the lower portion 414 such that the bladder assemblies 426 are positioned between the lower portion 414 and the bottom portion 434. In certain embodiments, the bladder assemblies 426 are fixedly coupled to the lower portion 414 and positioned in abutment with the bottom portion 434. The bladder assemblies 426 may be encased within the cover assembly 404 (see FIG. 28) between the lower portion 414 and the bottom portion 434.

The exemplary embodiment of the patient turning system 400 may include two patient turning devices 424 each having a pair of the bladder assemblies 426 coupled to one another and disposed between the lower surface 408 of crib assembly 402 and the patient support deck 38, and more particularly between the lower and bottom portions 414, 434 of the cover assembly 404. As shown in FIG. 26, the patient turning device 424 when coupled to the lower portion 414, may be centered on a midline ML bifurcating a width of the lower section 422. As a result, one of the bladder assemblies 426 of each patient turning device 424 is positioned on one side of the midline ML, and the other one of the bladder assemblies 426 of each patient turning device 424 is positioned on the other side of the midline ML. The selective inflation of the bladder assemblies 426 may cause the crib assembly 402 to tilt, pivot, or otherwise move about the midline ML.

Figure 27:
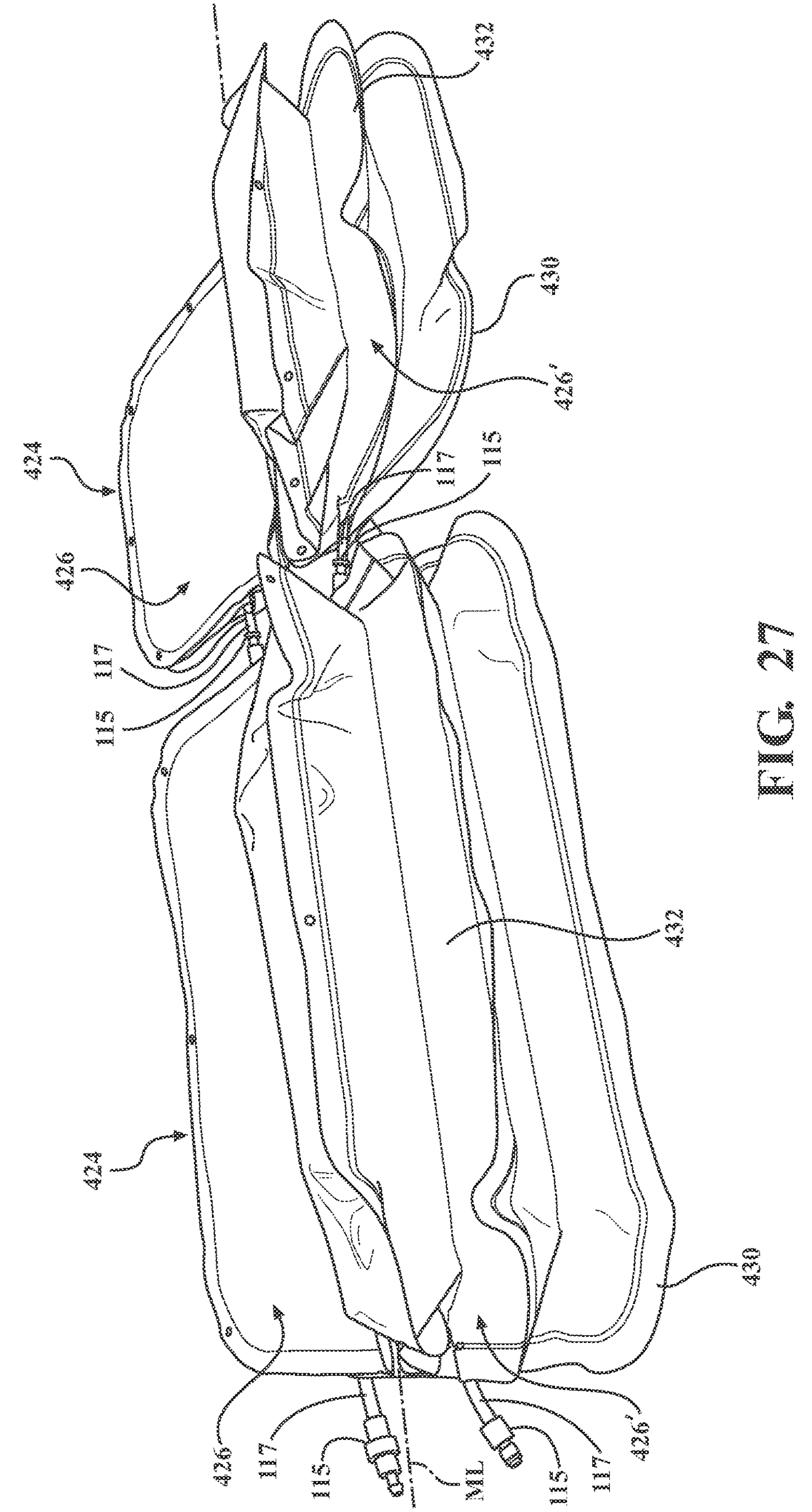
FIG. 27 is a perspective view of patient turning devices of the patient turning system of FIG. 25 with an inflatable bladder from each patient turning device shown inflated.

With reference to FIGS. 26 and 27, the bladder assemblies 426 of the patient turning devices 424 may be fixedly coupled to the lower section 422. Each of the bladder assemblies 426 may include a base feature 430 and a movable feature 432 coupled to the base feature 430. The base feature 430 of the patient turning device 424 generally extends outwardly from the movable feature 432 to be secured to the lower portion 414 of the cover assembly 404 through rivets, snaps, ultrasonic welding, durable sewing, or other suitable fastener or joining means, with the movable feature 432 secured to the base feature 430. It is contemplated that in certain embodiments the patient turning devices 424 coupled directly to an underside of the lower portion 414 with fasteners or other suitable joining means. The movable feature 432 is positioned in abutment with the bottom portion 434 such that, when the bladder assemblies 426 are inflated with the fluid from the fluid source 111, the movable feature 432 of the bladder assemblies 426 provide a force against the bottom portion 434 that moves the lower portion 414 away from the bottom portion 434 to provide the movement therapy. More specifically, the bladder assemblies 426 provides an equal force against the lower and bottom portions 414, 434 when inflated with the fluid. The bottom portion 434 of the patient turning system 400 may be positioned on the patient support deck 38 rigidly coupled to the base 36 supported on the floor surface. The constraint provided to the bottom portion 434 by the patient support deck 38 results in the expansion of the bladder assemblies 426 forcing at least a portion of the lower portion 414 away from the bottom portion 434, and thus forcing the upper surface 406 of the crib assembly 402 to move away from the patient support deck 38 to provide the movement therapy.

In the exemplary embodiment of FIG. 27, the movable feature 432 is concertinaed material adapted to expand in a bellows-like configuration. The concertinaed material may be formed from non-porous polymeric material to prevent egress of the fluid when inflated. Suitable examples include thermoplastic and thermoset polymers. In certain instances, the concertinaed material is formed to be substantially inelastic. In such an example, the extent by which the bladder assembly 426 expands when inflated is limited to a preformed size of the substantially inelastic concertinaed material forming the movable feature 432. In another example, the concertinaed material is at least partially formed from elastic material adapted to resiliently expand. In such an example, the concertinaed material forming the movable feature 432 may expand after the bladder assembly 426 is fully expanded. Other suitable constructions of forming the movable feature 432 of the bladder assembly 426 are within the scope of the present disclosure.

The movable feature 432 is positioned away from the midline ML and adapted to move or expand to a greater extent than a portion of the bladder assembly 426 adjacent to the midline ML such that the bladder assembly 426 achieves a generally triangular shape when inflated with fluid from the fluid source 111. The generally triangular shape of one of the bladder assemblies 426' inflated with the fluid is shown in FIG. 27. The generally triangular shape of the bladder assemblies 426 results in a corresponding portion (e.g., left or right) of the crib assembly 402 being moved upwardly to tilt, pivot, or otherwise move about the midline ML. For example, FIG. 27 shows a counterpart pair of bladder assemblies 426 (e.g., the bladder assemblies 426' to the right of the midline ML when viewed in plan) from each of the patient turning devices 424 inflated, and the other of the counterpart pairs of bladder assemblies 426 from each of the patient turning devices 424 uninflated. In such a configuration, the portion of the crib assembly 402 within the cover assembly 404 positioned above the inflated bladders 60' is moved upwardly to provide the movement therapy.

Figure 29:
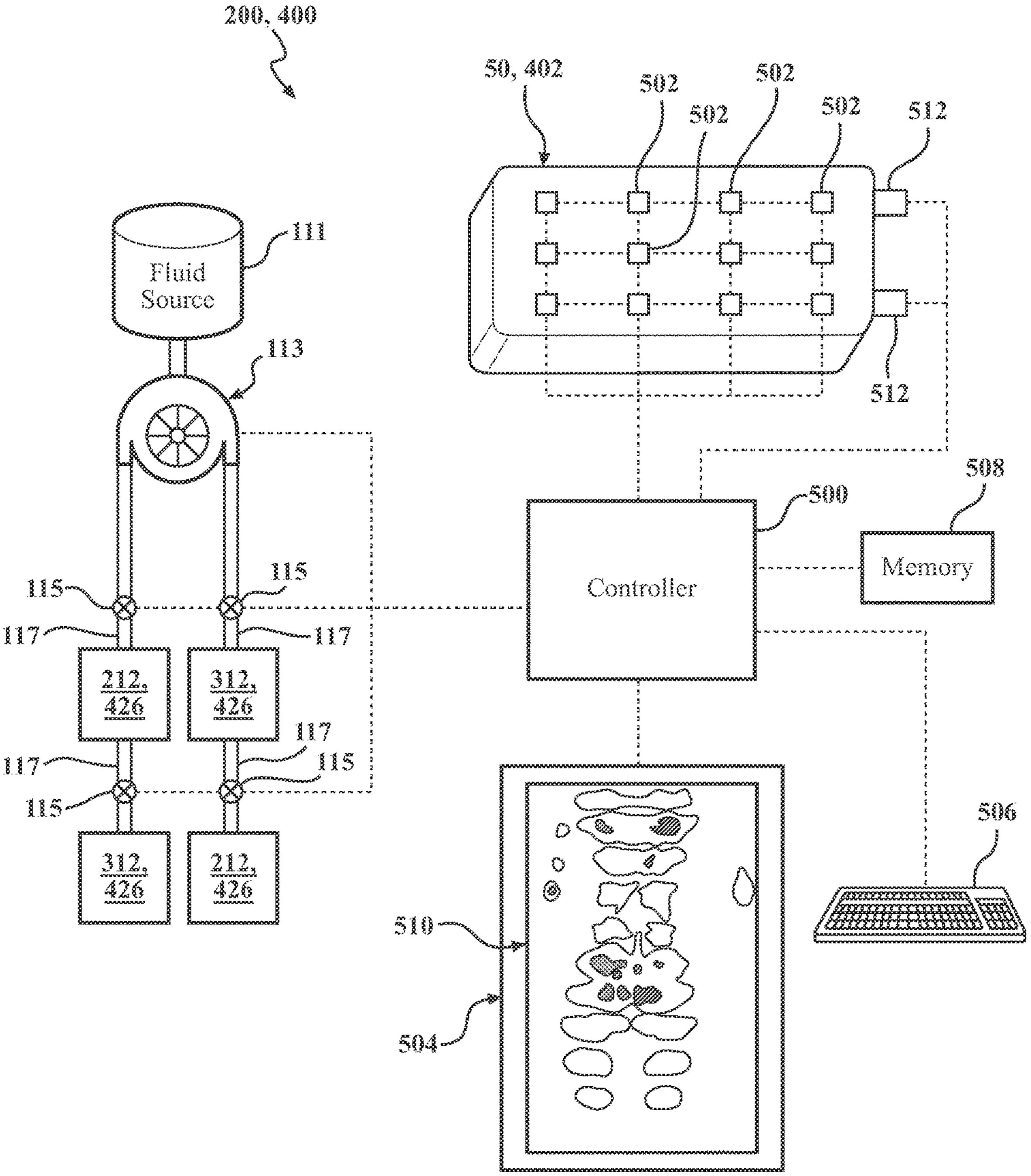
FIG. 29 is a representation of the patient turning system of FIG. 1 or 25 with a fluid source, a pump, valves, and electronic components represented schematically.

The counterpart pair of the bladder assemblies 426 may be in fluid communication with one another, such as shown in the exemplary embodiment of FIGS. 27 and 29. In other words, the bladder assemblies 426 positioned on the same side of the midline ML are in fluid communication with one another, and further in fluid communication with the fluid source 111. In certain embodiments, the fluid communication is provided by flexible tubing 117 or rigid piping coupling the bladder assemblies 426 positioned on the same side of the midline ML. In other embodiments, the fluid communication may be provided by a passageway defined by or within the crib assembly 402 and/or the cover assembly 404. The bladder assemblies 426 positioned on one side of the midline ML may not be in fluid communication with the bladder assemblies 426 positioned on the other side of the midline ML to provide independent control of movement to the left and right portions of the crib assembly 402 above the bladder assemblies 426 in manners described throughout the present disclosure.

FIG. 29 show a pump 113 in fluid communication with the bladder assemblies 426. The fluid communication may be provided by the flexible tubing 117 or rigid piping, or by passageways defined by or within other structures of the patient turning system 400. The pump 113 is in fluid communication with the fluid source 111 and the bladder assemblies 426. The pump 113 may provide positive or negative pressure to inflate or deflate the bladder assemblies 426, respectively. One or more valves 115 may be suitably disposed within the fluid path. A set of valves 115 positioned within the fluid path intermediate the pump 113 and one of the patient turning device 424, and another set of valves 115 positioned within the fluid path intermediate the patient turning device 424. The valves 115 are coupled to the flexible tubing 117 and adapted to selectively restrict flow of the fluid within the flexible tubing 117. The valves 115 are in electronic communication with and adapted to be controlled by a controller 500 to be described to provide selective and precise inflation of the bladder assemblies 426. It is contemplated that the set of valves 115 may be positioned within the fluid path intermediate the pump 113 and one of the patient turning devices 424 without the second set of valves 115 positioned within the fluid path intermediate the patient turning devices 424 (i.e., one valve 115 controls the flow of the fluid to both of the bladder assemblies 426 on one side of the midline ML). It is further understood that in certain other embodiments, each individual one of the bladder assemblies 426 may be in fluid communication with the fluid source 111 and not with one another. In those embodiments, additional pumps and/or valves may be required depending on the configuration of the fluid path.

The bottom perspective view of FIG. 26 shows the lower surface 408 of the crib assembly 402 defined by quadrants I, II, III, IV. As previously mentioned, the patient turning system 400 may comprise four of the bladder assemblies 426 with two patient turning devices 424 each comprising a pair of the bladder assemblies 426. In certain embodiments, each of the four bladder assemblies 426 are positioned below the lower surface 408 of the crib assembly 402 in one of the quadrants I, II, III, IV. In embodiments with the cover assembly 404, each of the four bladder assemblies 426 may be fixed to the lower portion 414 within one of the quadrants I, II, III, IV. Each of the patient turning devices 424 of FIG. 26 may be centered on the midline ML, and thus each of the patient turning devices 424 extends between an adjacent two of the quadrants I, II and III, IV. Further, for reasons previously expressed, the patient turning devices 424 are spaced apart by the distance D to improved support and reduced pressure on the sacrum of the patient P and decrease localized pressure points while also providing improved control over the movement therapy.

In certain embodiments, the cover assembly 404 substantially encases the crib assembly 402 with the bladder assemblies 426 positioned between the lower and bottom portions 414, 434 of the cover assembly 404. When the bladder assemblies 426 are inflated, the cover assembly 404 must expand or otherwise provide slack to prevent the cover assembly 404 from impeding the upward movement the crib assembly 402 encased by the cover assembly 404. In certain embodiments, the cover assembly 404 includes the augmenting feature 428 (see FIG. 28). The augmenting feature 428 is adapted to expand or move between a stored configuration in the absence of the movement therapy, and a deployed configuration in response to the crib assembly 402 moving away from the patient support deck 38 during the movement therapy. The augmenting feature 428 moves from the stored configuration towards the deployed configuration to permit the cover assembly 404 to expand during the movement therapy. Likewise, the augmenting feature 428 moves from the deployed configuration towards the stored configuration in response the crib assembly 402 moving towards the patient support deck 38, such as during deflation of the bladder assemblies 426. The augmenting feature 428 returns to the stored configuration in the absence of the movement therapy.

Figure 28:
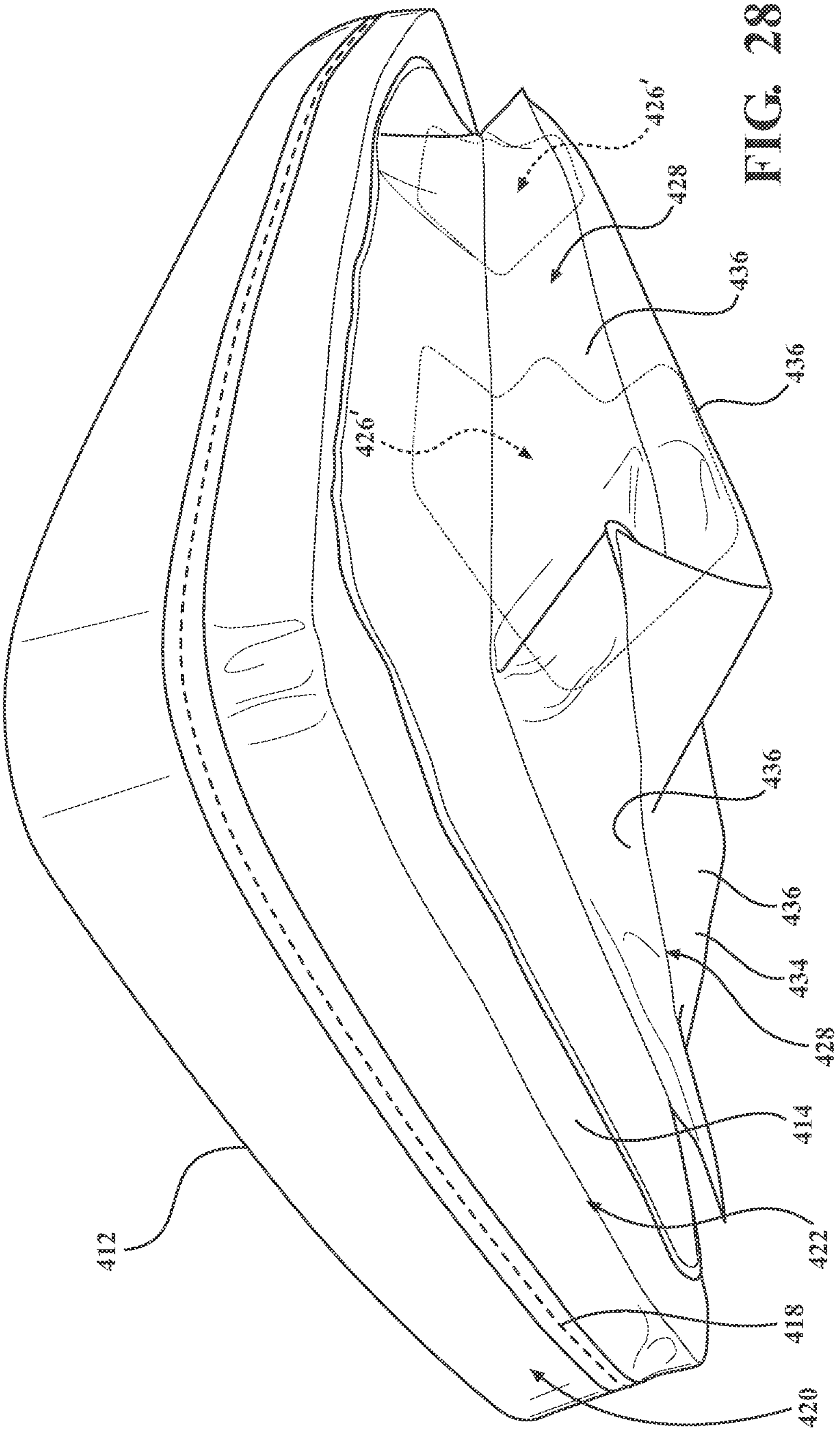
FIG. 28 is a perspective view of the patient turning system of FIG. 25 shown in a position for providing the movement therapy.

Referring to FIG. 28, the augmenting feature 428 of the cover assembly 404 may include or be formed of resilient fabric, a coated fabric, and/or concertinaed material 436 adapted to move in an accordion-like or bellows-like manner. The concertinaed material 436 is adapted to assume an expanded state when the augmenting feature 428 is in the deployed configuration, and a natural state when the augmenting feature 428 is in the stored configuration. More specifically, the concertinaed material 436 and/or the resilient fabric is adapted to expand to the expanded state as the crib assembly 402 moves away from the bottom portion 434 and revert towards the natural state when the crib assembly 402 moves towards the bottom portion 434. In certain embodiments, the augmenting feature 428 may comprise a fold of material (not shown) adapted to be positioned adjacent the cover assembly 404 when the augmenting feature 428 is in the stored configuration, and extend away from the cover assembly 404 when the augmenting feature 428 is in the deployed configuration. Complementary couplers may be provided to maintain the fold of material adjacent to the cover assembly 404 with the augmenting feature 428 in the stored configuration. The couplers may include snaps, clips, hook and eye connections, adhesive, magnets, and the like. In other exemplary embodiments, the augmenting feature 428 of the cover assembly 404 may include a resilient member (e.g., an elastic band, pretension transverse rod, etc.) adapted to bias the fold of material towards the stored configuration. As the augmenting feature 428 is moved from the stored configuration to the deployed configuration, the forces associated with moving the upper surface 406 of the crib assembly 402 away from the patient support deck 38 during the movement therapy are sufficient to overcome the biasing forces provided by the resilient member. In certain embodiments, the augmenting feature 428 may comprise a mechanical system (e.g., spring-loaded roller) adapted to permit controlled movement of and provide retraction of the cover assembly 404 to movement of the crib assembly 402 during the movement therapy.

The augmenting feature 428 may be coupled to and extending between the lower portion 414 and the bottom portion 434 of the cover assembly 404. FIG. 28 shows the augmenting feature 428 comprising the concertinaed material 436 having one edge fixedly coupled to the lower portion 414 via durable sewing, and another edge formed integrally with the bottom portion 434 of the cover assembly 404. The augmenting feature 428 is adapted to permit the patient support portion 412 and the lower portion 414 to move relative to the bottom portion 434 as the crib assembly 402 moves away from the bottom portion 434 during the movement therapy. The expansion of the bladder assemblies 426 results in the patient support portion 412 and the lower portion 414 moving away (i.e., upwardly) from the bottom portion 434 with the bottom portion 434 constrained by the patient support deck 38 of the patient support apparatus 30. The concertinaed material 436 forming the augmenting feature 428 expands in a corresponding manner. In one example, the concertinaed material 436 is fabricated from polymeric material with suitable materials including thermoplastic and thermoset polymers. The concertinaed material 436 may be formed to be substantially inelastic, or at least partially formed with elastic material, such as the resilient fabric, to resiliently expand as the augmenting feature 428 moves between the stored and deployed configurations. The concertinaed material 436 is adapted to flex at the folds and generally straighten (i.e., move from the natural state to the expanded state) as the augmenting feature 428 moves from the stored configuration to the deployed configuration. As the augmenting feature 428 moves from the deployed configuration to the stored configuration, the resiliency of the concertinaed material 436 causes the concertinaed material 436 to return from the expanded state to the natural state. In other words, in the exemplary embodiments including the concertinaed material 436, the concertinaed material 436 is in the natural state when the augmenting feature 428 is in the stored configuration, and the concertinaed material 436 is in the expanded state when the augmenting feature 428 is in the deployed configuration. In certain embodiments, the concertinaed material 436 generally remains nested or stacked within the movable feature 432 of the patient turning device 424 as the bladder assembly 426 is inflated and deflated. In other words, each one of the inward folds of concertinaed material 436 tends to remain positioned between two adjacent folds of the movable feature 432 of the patient turning device 424. As the patient support portion 412 and the lower portion 414 move towards the bottom portion 434, such as during deflation of the bladder assemblies 426, the concertinaed material 436 returns to the natural state and provides for compact design of the augmenting feature 428 and the peripheral portion 416 of the cover assembly 404. In the absence of movement therapy with the augmenting feature 428 in the stored configuration, the concertinaed material 436 does not extend beyond the sides 410 of the crib assembly 402.

In order to facilitate reducing localized pressure points, exemplary embodiments of the patient turning system 200, 400 include electronic components to be described. Operation of the electronic controls will be described with reference to the patient turning system 400, but it is understood the similar operation may be provided with the patient turning system 200. Referring to FIG. 29, the patient turning system 200, 400 may comprise the controller 500, sensors 502, a display 504, and/or a user input device 506. The upper surface 406 of the crib assembly 402 may be divided into or defined by a plurality of zones. The zones may be areas of the upper surface 406 subject to forces from the patient P. In one example, the zones may be four zones corresponding to the four quadrants I, II, III, IV previously described. In the exemplary embodiment illustrated in FIG. 29, the upper surface 406 is defined by twelve zones each associated with one of the sensors 502. Any number and/or arrangement of the zones defining the upper surface 406 of the crib assembly 402 (and/or the patient support portion 412 of the cover assembly 404) is contemplated.

The sensors 502 are associated with each of the zones. FIG. 29 shows twelve of the sensors 502 arranged in an array with one of the sensors 502 associated with each of the zones. The sensors 502 may be load cells, strain gauges, or any other suitable transducer adapted to generate force signals based on sensed forces from the patient P supported on the upper surface 406 of the crib assembly 402. More specifically, the weight distribution of the patient P results in varying forces across the zones defining the upper surface 406 of the crib assembly 402. The sensors 502 associated with each of the zones is adapted to sense the forces within each of the zones, and generate a force signal to be supplied to the controller 500. The controller 500 is in communication with the sensors 502 and receives the force signals from the sensors 502. Through suitable algorithms, protocols, or other preprogrammed conventions stored in a memory 508 in communication with the controller 500, the controller 500 determines whether movement therapy is required to reduce or eliminate any localized areas of pressure within one or more of the zones.

If the controller 500 determines movement therapy is required based on the force signals received from the sensors 502, the controller 500 generates and transmits an inflation signal to selectively inflate one or more of the bladder assemblies 426. The inflation of the bladder assemblies 426 reduces the sensed forces within the one or more of the zones. For example, one of the sensors 502 is associated with the zone positioned approximately beneath the sacrum of the patient P (identified as reference numeral 502' in FIG. 29) and may sense a force that exceeds a predetermined pressure threshold to be described as stored in the memory 508. The sensor 502 transmits the force signal to the controller 500, which compares the force signal to the pressure threshold. In order to reduce the forces within the zone, the controller 500 determines which one or more of the bladder assemblies 426 should be inflated. The controller 500 transmits the inflation signal to one or more of the pump 113 and the valves 115 to direct the fluid from the fluid source 111 to the desired one or more of the bladder assemblies 426. In the present example, the bladder assemblies 426 positioned below the lower extremities of the patient P (e.g., the bladder assemblies 426 located in quadrants III and IV of FIG. 26) may be inflated simultaneously and/or with substantially the same amount of the fluid in order to move the portion of the crib assembly 402 near the foot end away from the patient support deck 38. The result shifts the weight of the patient P towards the head end of the crib assembly 402, thereby alleviating pressure near the foot end including the sacrum. For another example, one of the sensors 502 is associated with the zone positioned approximately beneath the right side of the patient P and may sense a force that exceeds the pressure threshold. The sensor 502 transmits the force signal to the controller 500, which compares the force signal to the pressure threshold. The controller 500 transmits the inflation signal to one or more of the pump 113 and the valves 115 to direct the fluid from the fluid source 111 to the desired one or more of the bladder assemblies 426. In the present example, the bladder assemblies 426 positioned to the right of the midline ML (e.g., the bladder assemblies 426 located in quadrants II and III of FIG. 26) may be inflated simultaneously and/or with substantially the same amount of the fluid in order to move the right portion of the crib assembly 402 away from the patient support deck 38. The resulting arrangement shifts the weight of the patient P towards the left portion of the crib assembly 402, thereby alleviating pressure along the right side of the patient P. Other similar manners of operation or reducing pressure points within one or more of the zones are considered within the scope of the present disclosure. For example, the controller 500 may achieve a target pressure setting by utilizing a preprogrammed pressure setting stored in the memory 508. The preprogrammed pressure setting may be indicated for each of the bladder assemblies 426, or for each pair of the bladder assemblies 426 on the same side of the midline ML.

The pressure threshold is similarly one exemplary manner by which the controller 500 determines whether or which one or more of the bladder assemblies 426 are to be inflated. The pressure threshold may be static or dynamic, and may be selected or input by a caregiver actuating the user input 506. Additionally or alternatively, the caregiver may input to the user input 506 the height, weight, body habitus, and/or additional metrics, from which the controller 500 may determine the pressure threshold to be stored in the memory 508. In certain embodiments, the controller 500 receives the force signals from the sensors 502 and generates a pressure map 510. The pressure map 510 may be displayed on the display 504 as shown in FIG. 29. In a general sense, the pressure map 510 is a schematic representation of the sensed forces within the zones defining the upper surface 406 of the crib assembly 402 as sensed by the sensors 502. The pressure map 510 may be color coded (e.g., a heat map) with areas or zones of elevated or relatively higher pressures represented in colors such as red and orange, and areas or zones of relatively lower pressures represented in colors such as blue and green. For example, the pressure map 510 of FIG. 29 indicates relatively higher pressures near the shoulders and sacrum S of the patient P.

The controller 500 may be adapted to selectively inflate one or more of the bladder assemblies 426 based on the areas or zones of elevated or relatively higher pressures. Additionally or alternatively, the pressure map 510 may be displayed on the display 504 for the caregiver to take remedial action if desired. The caregiver may actuate the user input 506 to initiate the patient turning operation. Additionally or alternatively, the patient turning operation in compliance with the Q2H protocol may be initiated with the patient P turned from side to side every two hours.

Certain patients, such as obese individuals or those having poor cardiopulmonary systems, may require to be rotated by larger magnitudes in order to increase blood flow and reduce pressure ulcers. The patient turning system 400 may provide for control of the extent to which the bladder assemblies 426 are inflated to move the crib assembly 402 away from the patient support deck 38. The patient turning system 400 may include one or more angular detection sensors 512 in communication with the controller 500 and adapted to sense an angle of one or more portions or an entirety of the upper surface 406 of the crib assembly 402 relative to horizontal. The angular detection sensors 512 are represented schematically in the exemplary embodiment of FIG. 29. With the bladder assemblies 426 are positioned intermediate the lower portion 414 and the bottom portion 434 such that a portion of the crib assembly 402 moves relative to the patient support deck 38, another portion of the crib assembly 402 may remain stationary or horizontal. The angles of the portions of the patient support portion 412 of the cover assembly 404, the upper surface 406 of the crib assembly 402, or another suitable reference surface relative to horizontal is sensed by the angular detection sensor 512. In certain embodiments, the angle may be deduced or calculated from a distance of the portion of the upper surface 406 of the crib assembly 402, for example, proximate to the sides 410 of the crib assembly 402. In another example, the angle may be deduced or calculated from a volume or pressure of the fluid within the inflatable bladder(s) 60. Inputting or customizing the angularity of the portion(s) of the crib assembly 402 may comprise a portion of the movement therapy protocol.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient turning system for a patient support apparatus, the patient turning system comprising: a mattress comprising an upper surface opposite a lower surface, the mattress adapted to be supported on a patient support deck of the patient support apparatus with the upper surface sized to support a patient during movement therapy; a mattress cover including: a patient support portion adapted to cover the upper surface of the mattress, the patient support portion sized so the patient is supported on the patient support portion during movement therapy, a lower portion coupled to the patient support portion and adapted to cover at least a portion of the lower surface of the mattress, and a bottom portion coupled to the lower portion; and inflatable bladders fixedly coupled to the lower portion and positioned in abutment with the bottom portion, the inflatable bladders being positioned external to the mattress and below the lower surface of the mattress with the inflatable bladders adapted to be in communication with a fluid source and adapted to be selectively inflated with fluid from the fluid source to move a portion of the mattress away from the patient support deck to provide the movement therapy.

2. The patient turning system of claim 1, wherein the mattress further comprises a head end opposite a foot end with the inflatable bladders comprising a pair of inflatable bladders spaced apart between the head end and the foot end such that, when the patient is supported on the mattress, a portion of the upper surface intermediate the pair of inflatable bladders is adapted to offload a sacrum of the patient.

3. The patient turning system of claim 1, wherein the lower surface of the mattress is defined by quadrants with the inflatable bladders comprising four inflatable bladders each of the four inflatable bladders positioned below the lower surface in one of the quadrants.

4. The patient turning system of claim 1, further comprising:

a plurality of zones defining the upper surface of the mattress;

sensors associated with each of the zones and adapted to generate force signals based on sensed forces from the patient on the upper surface and within each of the zones; and a controller in communication with the sensors and adapted to receive the force signals from the sensors and transmit an inflation signal to selectively inflate one or more of the inflatable bladders to reduce the sensed forces within one or more of the zones.

5. The patient turning system of claim 1, wherein the mattress cover substantially encases the mattress and the inflatable bladders with the mattress cover comprising an augmenting feature adapted to expand as the mattress moves away from the patient support deck during the movement therapy.

6. The patient turning system of claim 5, wherein the augmenting feature includes one of a concertinaed thermoformed material and a fabric.

7. The patient turning system of claim 1, further comprising an angular detection sensor coupled to one of the mattress, the mattress cover, and the inflatable bladders with the angular detection sensor adapted to sense an angle of the upper surface of the mattress relative to horizontal.

8. A patient turning system for a mattress having an upper surface opposite a lower surface, the patient turning system comprising: a mattress cover for coupling to the mattress, the mattress cover comprising: a patient support portion adapted to cover the upper surface of the mattress, the patient support portion sized so a patient is supported on the patient support portion during movement therapy; a lower portion coupled to the patient support portion and adapted to cover at least a portion of the lower surface of the mattress; and a bottom portion coupled to the lower portion; and a plurality of inflatable bladders positioned between the lower portion and the bottom portion with the inflatable bladders in fluid communication with a fluid source and adapted to be selectively inflated to move the mattress away from the bottom portion of the mattress cover to provide the movement therapy, wherein the inflatable bladders are fixedly coupled to the lower portion and positioned in abutment with the bottom portion.

9. The patient turning system of claim 8, wherein the mattress cover further comprises an augmenting feature coupled to the lower portion and the bottom portion with the augmenting feature adapted to permit the patient support portion and the lower portion to move relative to the bottom portion as the mattress moves away from the bottom portion during the movement therapy.

10. The patient turning system of claim 9, wherein the augmenting feature is comprised of concertinaed thermoformed material adapted to expand to an expanded state as the mattress moves away from the bottom portion and revert towards a natural state as the mattress moves towards the bottom portion.

11. The patient turning system of claim 10, wherein the augmenting feature includes a fabric adapted to expand to an expanded state as the mattress moves away from the bottom portion and revert towards a natural state as the mattress moves towards the bottom portion.

12. The patient turning system of claim 8, wherein the inflatable bladders comprises four inflatable bladders with each of the four inflatable bladders fixedly coupled to the lower portion within one of four quadrants defining the lower portion.

13. The patient turning system of claim 8, wherein one of the inflatable bladders is adapted to be positioned below the mattress such that, when the patient is supported on the patient support portion of the mattress cover, the one inflatable bladder is positioned below an upper torso of the patient, and further wherein another one of the inflatable bladders is adapted to be positioned below the mattress such that, when the patient is supported on the patient support portion of the mattress cover, the another one inflatable bladder is positioned below lower extremities of the patient.

14. The patient turning system of claim 8, wherein the inflatable bladders comprise a pair of inflatable bladders adapted to be positioned below the mattress and spaced apart from one another such that, when the patient is supported on the patient support portion of the mattress cover, a portion of the patients support portion intermediate the pair of inflatable bladders is adapted to support a sacrum of the patient.

15. The patient turning system of claim 8, wherein the mattress cover further comprises peripheral portions coupled to and extending between the patient support portion and the lower portion, and a fastening device coupled to the peripheral portions with the fastening device removably coupling at least a portion of the patient support portion with the bottom portion such that the mattress cover is adapted to be removably coupled to the mattress; and wherein the patient support portion, the peripheral portions, the lower portion, and the bottom portion are configured to substantially encase the mattress and the inflatable bladders.

16. A method for providing movement therapy to a patient supported on a mattress with a first pair of inflatable bladders positioned below a lower surface of the mattress near a head end of the mattress, and a second pair of inflatable bladders positioned below the lower surface of the mattress near a foot end of the mattress and spaced apart from the first pair of inflatable bladders, and a mattress cover substantially encasing the mattress and the inflatable bladders with the mattress cover comprising a patient support portion opposite a bottom portion, the method comprising:

inflating at least one of the inflatable bladders with fluid from a fluid source in fluid communication with the inflatable bladders to move a portion the patient support portion of the mattress cover and the mattress away from the bottom portion of the mattress cover to provide the movement therapy when the patient is supported on the patient support portion of the mattress cover with the patient positioned such that a sacrum of the patient is positioned intermediate to the first and second pairs of the inflatable bladders;

sensing with sensors forces from the patient on the patient support portion within a plurality of zones defining the patient support portion;

determining with a controller in communication with the sensors whether the sensed forces exceed a pressure threshold; and inflating or deflating one or more of the inflatable bladders to reduce the sensed forces below the pressure threshold.

17. The method of claim 16, further comprising:

expanding an augmenting feature of the mattress cover as the patient support portion of the mattress cover and the mattress move away from the bottom portion during the movement therapy, wherein the augmenting feature is located between the patient support portion and the bottom portion of the mattress cover on each of four sides of the mattress; and inflating all of the inflatable bladders with the fluid from the fluid source to expand the augmenting feature on the four sides of the mattress.

18. The method of claim 16, further comprising altering an amount of inflation of less than all of the inflatable bladders with the fluid from the fluid source to reposition the patient on the patient support portion and relieve pressure on the sacrum and/or heels of the patient.

* * * * *